(12) United States Patent
von Kraus et al.

(10) Patent No.: US 11,891,294 B2
(45) Date of Patent: Feb. 6, 2024

(54) CUSTOM BEVERAGE CREATION DEVICE, SYSTEM, AND METHOD

(71) Applicant: Be the Change Labs, Inc., New York, NY (US)

(72) Inventors: Lee von Kraus, Brooklyn, NY (US); Sunjay Guleria, New York, NY (US); Mohini Guleria, Amsterdam (NL); Neil Guleria, Williamsburg, VA (US); Will McLeod, Hoboken, NJ (US); Christian von Heifner, New York, NY (US)

(73) Assignee: BE THE CHANGE LABS, INC., New York, NY (US)

( * ) Notice: Subject to any disclaimer, the term of this patent is extended or adjusted under 35 U.S.C. 154(b) by 162 days.

(21) Appl. No.: 17/448,304

(22) Filed: Sep. 21, 2021

(65) Prior Publication Data
US 2022/0002135 A1 Jan. 6, 2022

Related U.S. Application Data

(63) Continuation of application No. 17/029,655, filed on Sep. 23, 2020, now Pat. No. 11,124,404, which is a
(Continued)

(51) Int. Cl.
*B67D 1/00* (2006.01)
*B67D 1/08* (2006.01)
(Continued)

(52) U.S. Cl.
CPC .......... *B67D 1/0074* (2013.01); *B67D 1/0021* (2013.01); *B67D 1/0039* (2013.01);
(Continued)

(58) Field of Classification Search
CPC .. B67D 1/0074; B67D 1/0021; B67D 1/0039; B67D 1/0078; B67D 1/0804; B67D 1/10; B67D 1/0431; B67D 2001/0811
(Continued)

(56) References Cited

U.S. PATENT DOCUMENTS 1,525,674 A 2/1925 Thomas
1,945,489 A 1/1934 Manley
(Continued)

FOREIGN PATENT DOCUMENTS

CN 103690049 B 12/2015
CN 107427162 A 12/2017
(Continued)

OTHER PUBLICATIONS

International Search Report with Written Opinion, International Patent Application No. PCT/US2019/012769, dated Jun. 27, 2019.
(Continued)

*Primary Examiner* — Lien M Ngo
(74) *Attorney, Agent, or Firm* — Husch Blackwell LLP

(57) ABSTRACT

A system for dispensing fluid. The system includes a fluid cartridge having a fluid outlet spout, a carbonated fluid outlet, a still water outlet, and a non-contact drop sensor for detecting a number of drops dispensed from the fluid outlet spout. The fluid outlet spout, the carbonated fluid outlet, and the still water outlet are configured to dispense fluid into a beverage vessel.

19 Claims, 33 Drawing Sheets

Related U.S. Application Data continuation of application No. 16/242,828, filed on Jan. 8, 2019, now Pat. No. 10,829,359.

(60) Provisional application No. 62/688,750, filed on Jun. 22, 2018, provisional application No. 62/631,590, filed on Feb. 16, 2018, provisional application No. 62/614,772, filed on Jan. 8, 2018, provisional application No. 62/614,786, filed on Jan. 8, 2018, provisional application No. 62/614,783, filed on Jan. 8, 2018.

(51) Int. Cl.
  *B67D 3/00* (2006.01)
  *B67D 1/04* (2006.01)
  *B67D 1/10* (2006.01)

(52) U.S. Cl.
  CPC ......... *B67D 1/0078* (2013.01); *B67D 1/0804* (2013.01); *B67D 3/0048* (2013.01); *B67D 1/0431* (2013.01); *B67D 1/10* (2013.01); *B67D 2001/0811* (2013.01)

(58) Field of Classification Search
  USPC .... 222/129.1–129.4, 132, 23–26, 62, 94, 97
  See application file for complete search history.

(56) References Cited

U.S. PATENT DOCUMENTS

| | | | |
|---|---|---|---|
| 2,081,029 A | 5/1937 | Young | |
| 2,408,439 A | 10/1946 | Muehlhofer | |
| 4,251,473 A | 2/1981 | Gilbey | |
| 4,518,541 A | 5/1985 | Harris | |
| 4,520,950 A | 6/1985 | Jeans | |
| 4,636,337 A | 1/1987 | Gupta et al. | |
| 4,764,315 A | 8/1988 | Brusa | |
| 4,951,719 A | 8/1990 | Wiley et al. | |
| 5,124,088 A * | 6/1992 | Stumphauzer | B67D 1/0057 261/DIG. 7 |
| 5,303,846 A * | 4/1994 | Shannon | B67D 1/0871 222/54 |
| 5,543,087 A | 8/1996 | Lee et al. | |
| 5,592,867 A | 1/1997 | Walsh et al. | |
| 6,240,829 B1 | 6/2001 | McGarrah | |
| 6,767,009 B2 | 7/2004 | Ziesel | |
| 6,872,306 B2 | 3/2005 | Shen | |
| 7,318,581 B2 | 1/2008 | Robards, Jr. et al. | |
| 7,439,072 B2 * | 10/2008 | Shvets | G01F 22/00 436/150 |
| 7,458,315 B2 | 12/2008 | Hart et al. | |
| 8,523,440 B2 | 9/2013 | Walker et al. | |
| D691,420 S | 10/2013 | McIntire | |
| 8,757,222 B2 | 6/2014 | Rudick et al. | |
| 8,808,775 B2 | 8/2014 | Novak et al. | |
| 8,833,241 B2 | 9/2014 | Santoiemmo | |
| D729,344 S | 5/2015 | Colussi | |
| 9,427,105 B2 | 8/2016 | Hansen et al. | |
| D782,611 S | 3/2017 | Plihal | |
| 9,630,826 B2 | 4/2017 | Green et al. | |
| D789,135 S | 6/2017 | Green | |
| D792,941 S | 7/2017 | Rummel et al. | |
| D796,245 S | 9/2017 | Plihal | |
| 9,932,217 B2 * | 4/2018 | Perrelli | B65D 47/0857 |
| 11,517,141 B1 * | 12/2022 | Zeira | A47J 31/4496 |
| 2003/0020769 A1 * | 1/2003 | Sarmast | B41J 2/195 347/7 |
| 2007/0034084 A1 | 2/2007 | Shertok et al. | |
| 2008/0260907 A1 | 10/2008 | Mazur | |
| 2009/0242075 A1 | 10/2009 | Busick et al. | |
| 2011/0079317 A1 | 4/2011 | Olson et al. | |
| 2011/0079612 A1 | 4/2011 | Knoll et al. | |
| 2013/0037169 A1 | 2/2013 | Volino et al. | |
| 2013/0037969 A1 | 2/2013 | Ring et al. | |
| 2013/0112648 A1 | 5/2013 | Cohen et al. | |
| 2013/0139927 A1 | 6/2013 | Jungclaus et al. | |
| 2013/0202747 A1 | 8/2013 | Kopel et al. | |
| 2013/0227481 A1 | 8/2013 | Keys et al. | |
| 2013/0251862 A1 * | 9/2013 | Short | A23P 10/30 426/231 |
| 2013/0333492 A1 | 12/2013 | Wochele et al. | |
| 2013/0334259 A1 | 12/2013 | White | |
| 2014/0190928 A1 | 7/2014 | Nakayama | |
| 2014/0331868 A1 | 11/2014 | Novak et al. | |
| 2015/0125578 A1 | 5/2015 | Hatherell | |
| 2015/0135965 A1 | 5/2015 | Lo Foro et al. | |
| 2016/0220970 A1 | 8/2016 | James et al. | |
| 2016/0251208 A1 | 9/2016 | Tansey, Jr. | |
| 2017/0156540 A1 | 6/2017 | Wheatley et al. | |
| 2018/0168388 A1 * | 6/2018 | Kim | A47J 31/4475 |

FOREIGN PATENT DOCUMENTS

| | | |
|---|---|---|
| EP | 2071205 A1 | 6/2009 |
| EP | 2570059 A1 | 3/2013 |
| EP | 3028988 A1 | 6/2016 |
| JP | H0721338 A | 1/1995 |
| JP | 2013241209 A | 12/2013 |
| KR | 1020170101916 A | 9/2017 |
| RU | 128977 U1 | 6/2013 |
| RU | 2520928 C2 | 6/2014 |
| RU | 2586824 C1 | 6/2016 |
| RU | 169830 U1 | 4/2017 |
| WO | 9842612 A2 | 10/1998 |
| WO | 0228241 A1 | 4/2002 |
| WO | 03045818 A1 | 6/2003 |
| WO | 2013050185 A1 | 4/2013 |
| WO | 2015022692 A2 | 2/2015 |
| WO | 2016086864 A1 | 6/2016 |

OTHER PUBLICATIONS

Extended European Search Report; European Application No. 19736017.5, dated Oct. 26, 2021, 9 pages.

Office Action issued for Chinese Patent Application No. 201980017744.5 dated Sep. 26, 2022, 11 pages.

* cited by examiner

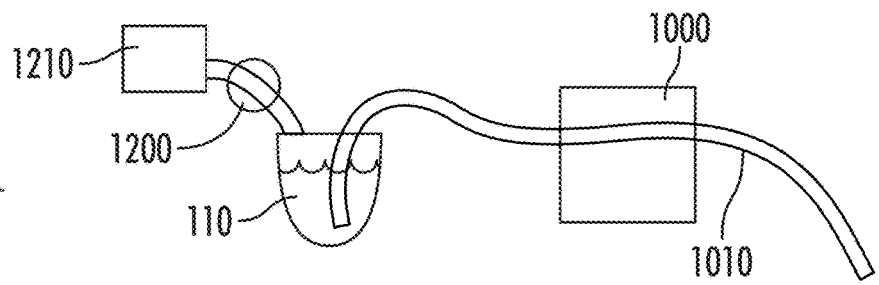
*FIG. 12A*
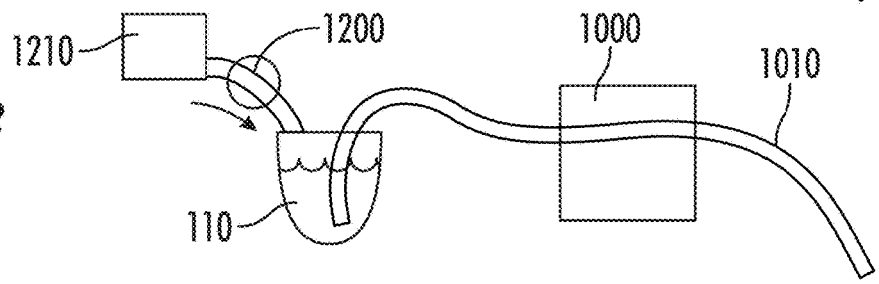
*FIG. 12B*
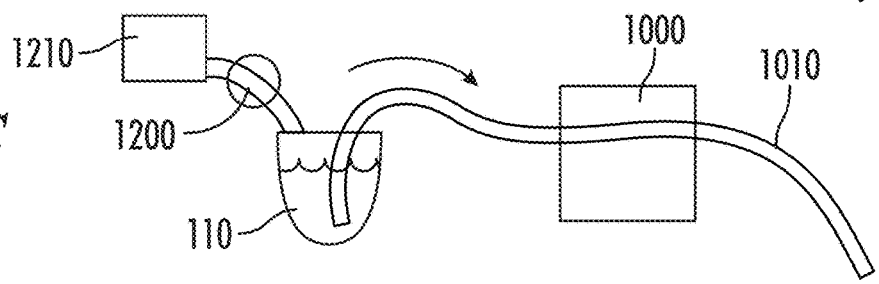
*FIG. 12C*
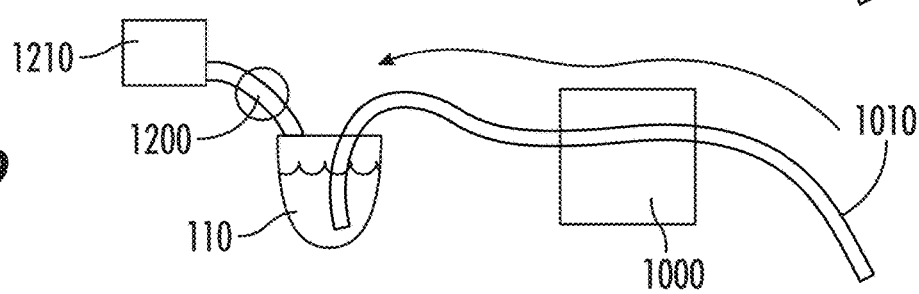
*FIG. 12D*
*FIG. 13*
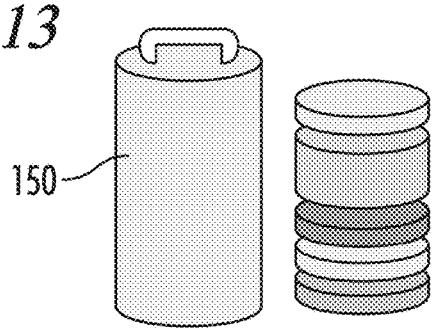
PURIFIES
Sediment
Carbon Block
UF Hollowfiber
ACSD-17 Fluoride Filter
Alkaline Mineralizer
Removes:
Lead, Mercury, Microorganisms, Chlorine, THMs, Fluride, and More...
Adds:
Essential minerals that increase water pH
Lasts 200 gallons | Easy snap-in design
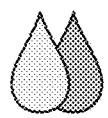

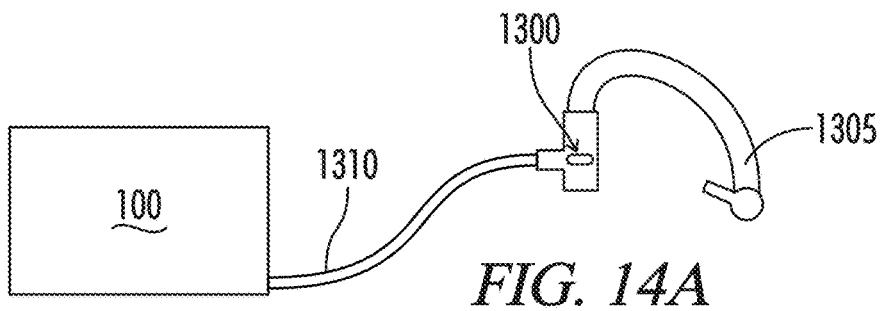
FIG. 14A
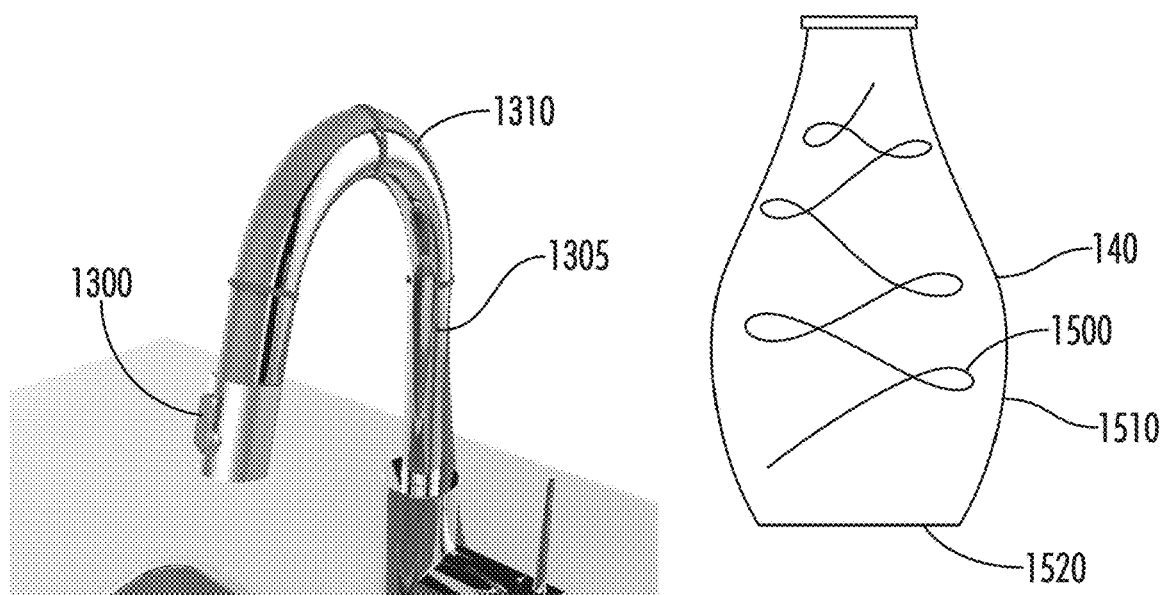
FIG. 14B
FIG. 15A
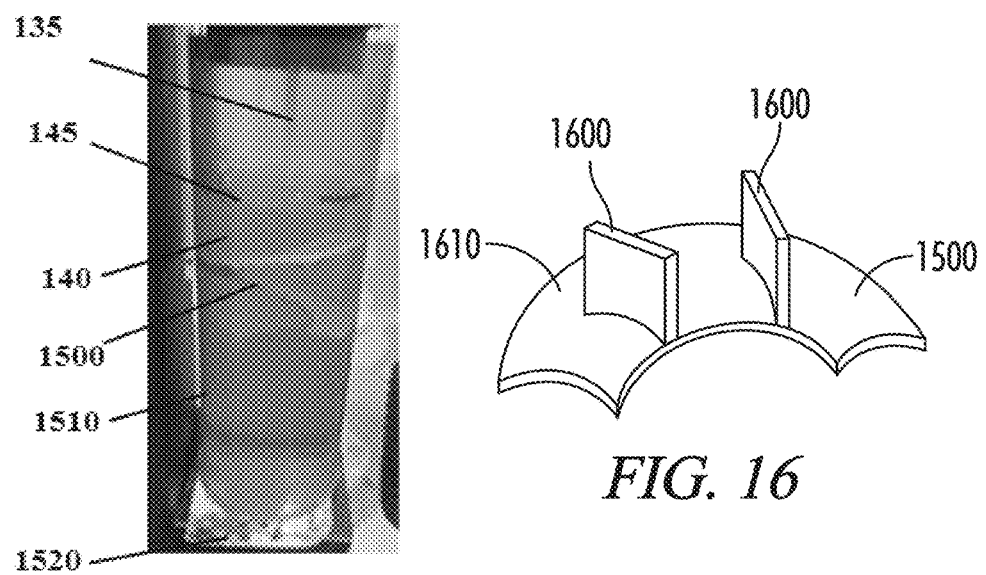
FIG. 15B
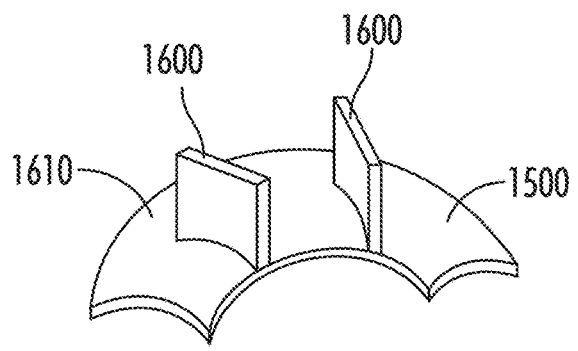
FIG. 16

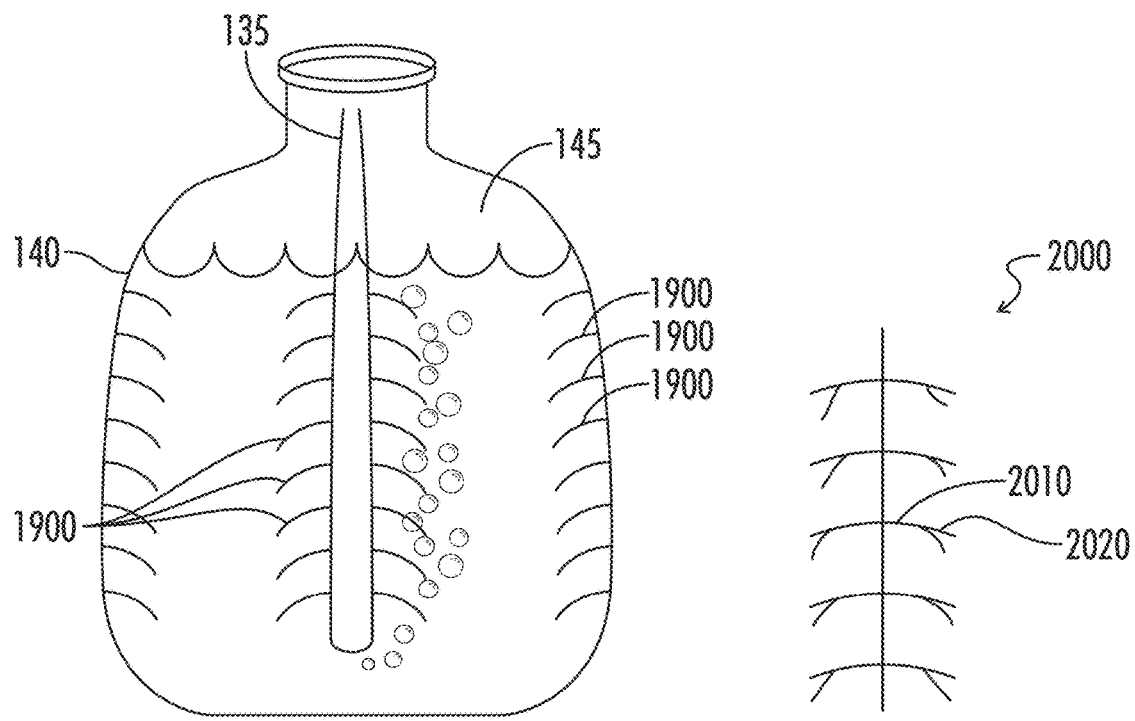
FIG. 20B
FIG. 20C
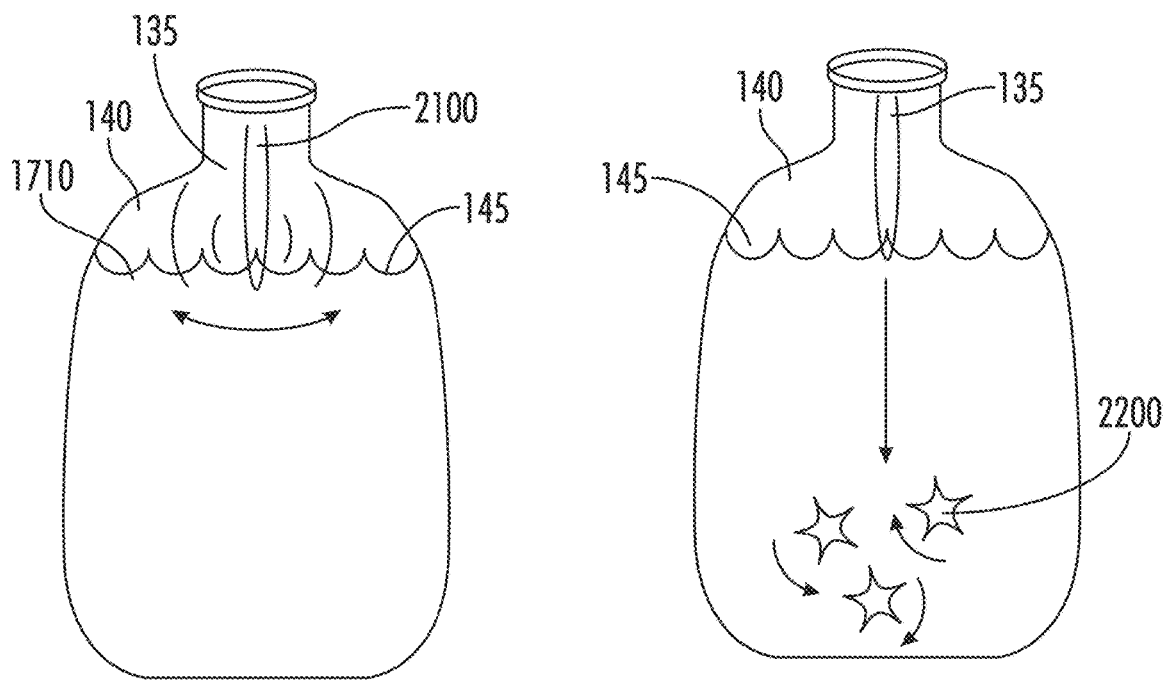
FIG. 21
FIG. 22

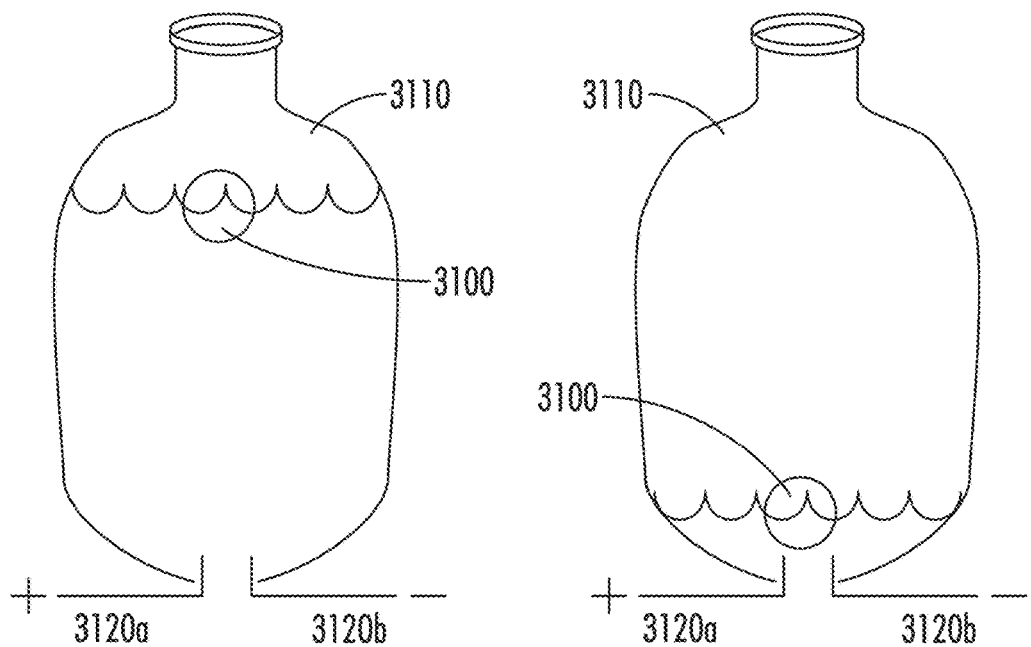
FIG. 31A  FIG. 31B
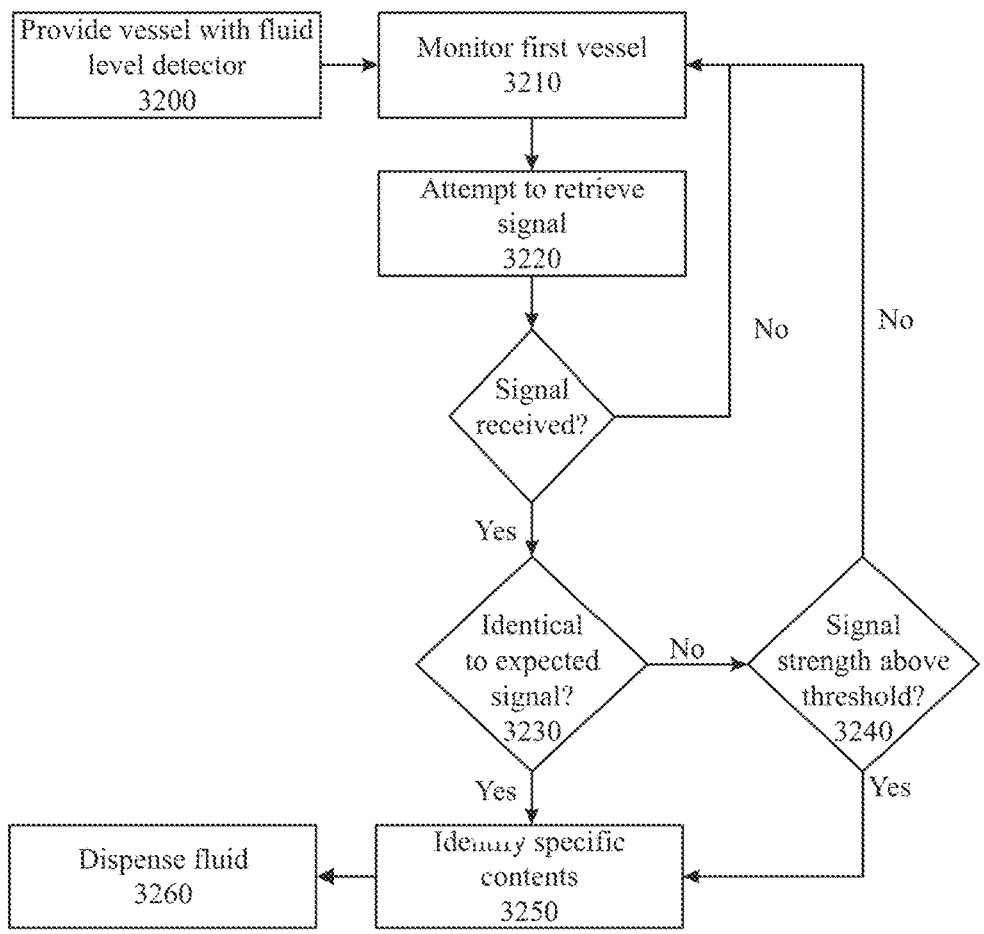
FIG. 32

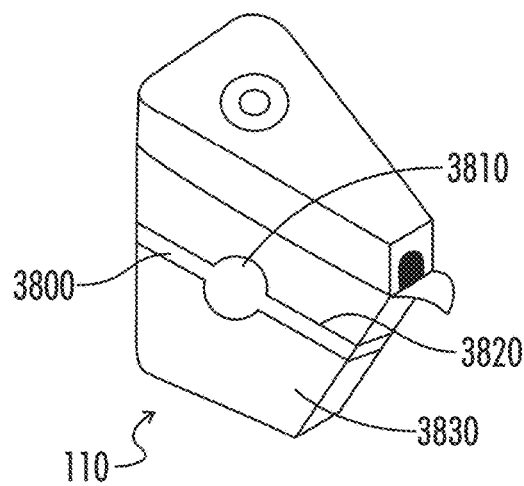 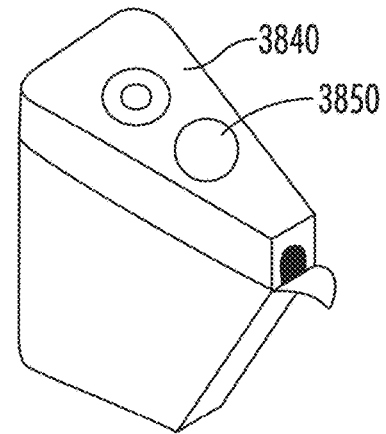
*FIG. 38A*  *FIG. 38B*
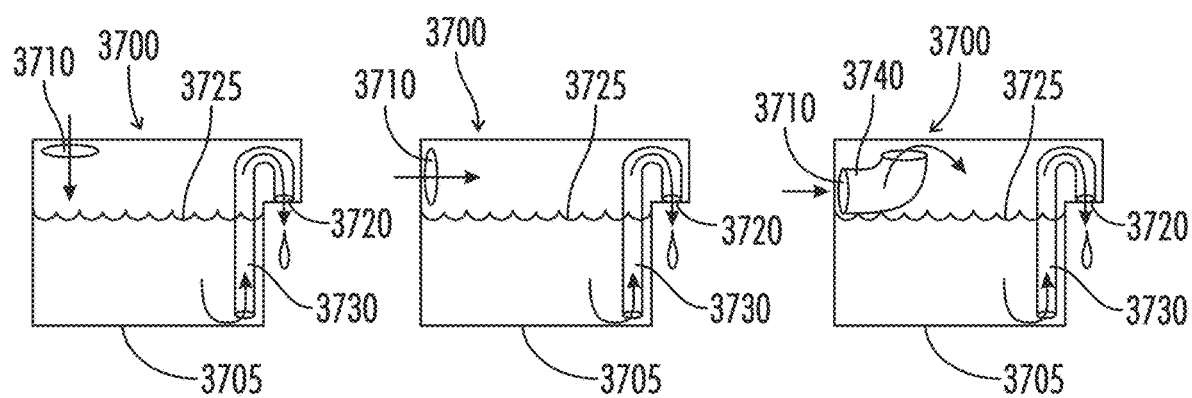
*FIG. 39A*  *FIG. 39B*  *FIG. 39C*

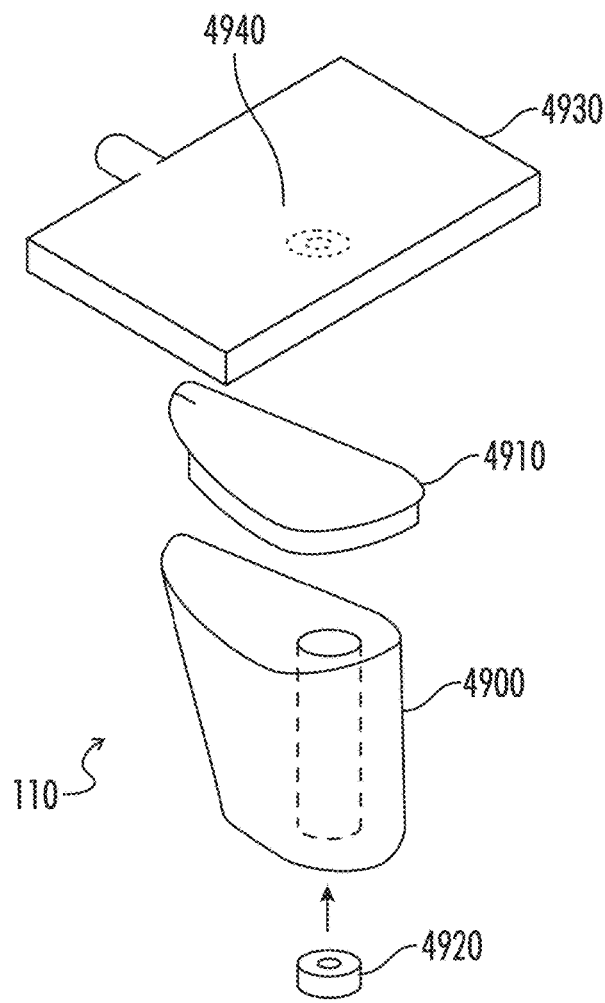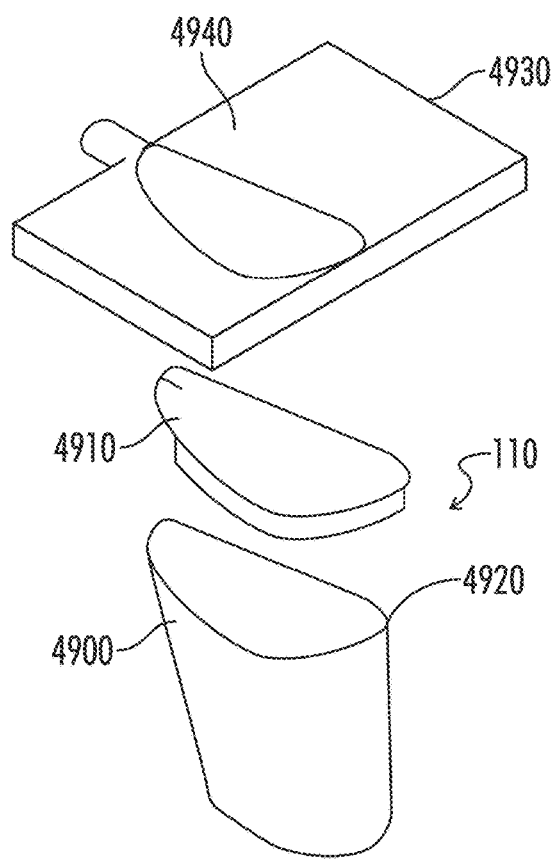
FIG. 49A
FIG. 49B

CUSTOM BEVERAGE CREATION DEVICE, SYSTEM, AND METHOD

CROSS-REFERENCE TO RELATED APPLICATION

This application is a continuation of U.S. patent application Ser. No. 17/029,655, filed Sep. 23, 2020, which is a continuation of U.S. patent application Ser. No. 16/242,828, filed Jan. 8, 2019, which claims the benefit of each of U.S. Provisional Patent Application No. 62/614,772, filed Jan. 8, 2018, U.S. Provisional Patent Application No. 62/614,783, filed Jan. 8, 2018, U.S. Provisional Patent Application No. 62/614,786, filed Jan. 8, 2018, U.S. Provisional Patent Application No. 62/631,590, filed Feb. 16, 2018, and U.S. Provisional Patent Application No. 62/688,750, filed Jun. 22, 2018, the contents of each of which are incorporated by reference herein in its entirety.

FIELD OF THE INVENTION

The invention relates to custom beverage creation devices, systems, and methods including such devices for flavoring, filtering, and carbonating beverages.

BACKGROUND

Traditionally, people buy beverages from a local store, or more recently, via online delivery services. Such beverages can include flavored drinks, carbonated drinks, and even something as basic as filtered water. These drinks are sometimes purchased in large quantities of vessels. These vessels can be bottles, each of which may hold, for example, 1 liter of water, or larger containers. When the contents of one vessel have been consumed, another vessel is retrieved and opened for consumption. This process is quite convenient, requiring only occasional trips to the store (or online clicks in the instance of online-ordered beverages), and occasional disposal and replacement of empty vessels. While this method of beverage acquisition is simple, it generates a significant amount of waste (usually plastic waste, since vessels are usually made of plastic). As such, the development of an at-home beverage creation system holds promise for reducing waste.

In the development of an at-home beverage creation system, the convenience of beverage creation is ideally close to, or better than, the convenience of existing methods of beverage acquisition, which have been described above. In particular, to further reduce the effort involved in existing beverage acquisition methods, one could further eliminate at least some of the problems of 1) needing to go to the store to restock on beverage vessels, 2) needing to dispose of empty vessels, and needing to store crates of full vessels. These problems should be solved while also 3) avoiding the introduction of significant new inconveniences. Further, a beverage creation system may introduce new advantages, such as the consistent creation of custom beverages at lower cost than traditional beverage purchasing.

Each of these problems can be solved by creating an at-home beverage-creation device which allows a user to create beverages with water from their tap, or from another water source, such as a dedicated line or tank, which can be filtered, flavored, and carbonated to the user's specifications. There are several existing devices which attempt to accomplish this, however in doing so they introduce new inconveniences to the user. We here propose a novel form of custom beverage-creation device which has unique features to avoid inconveniences introduced by other existing devices.

Generally, the device described, in various embodiments, is designed to make possible, or ease the implementation of, one or more of the preparation, personalization, or purification of water and flavored beverages.

For water and beverage preparation, current processes are time consuming and tedious, and require the cleaning of bottles, the chilling of water, and the filtering, carbonation, and flavoring of water through different processes. Users often ultimately resort to plastic disposable bottles to avoid the tediousness of preparing beverages.

For water and beverage personalization, members of a household or customers of a commercial establishment may prefer different types of water and slightly different recipes for flavored beverages. For example, users may prefer beverages with different levels of carbonation, at different temperatures, or with different flavoring. Even where recipes are repeatable, it is difficult to precisely dispense ingredients, such as flavoring syrups. Accordingly, tailoring beverages repeatably is difficult, if not impossible, without proper equipment.

Purification of water using existing systems is typically either expensive, wasteful, tedious, and/or requires large equipment. Such purification may further remove beneficial minerals. Consumer oriented filters, such as pitchers, are unreliable and inconsistent, and are low volume. The pitcher you are using may run out of water just when you need it.

Further, users of such a system may prefer carbonated beverages. Several methods exist for the mixing of water and CO2 to create carbonated water. In one method, pressurized CO2 (at, for example ~1000 PSI) is released directly from a pressurized tank into a thin tube which carries the CO2 to a thin 'injection straw' (~3 mm inner diameter). CO2 is able to escape out the bottom of the injection straw through a very small opening (~200 microns) into a vessel filled to ~85% of its volume with water (i.e. 15% of the internal volume of the vessel is 'headspace'). The tip of the injection straw through which the CO2 escapes is just barely below the surface of the water contained in the vessel. In this way, the CO2 is ejected at extremely high velocity from the straw's tip directly into the water to be carbonated. This high velocity ejection causes extreme agitation of the water, thereby facilitating the mixing and dissolution of the ejected CO2 with the water, resulting in carbonated water. Although the CO2 is ejected directly from the pressurized CO2 tank, without any pressure regulation, into the water at a high velocity, its flow rate is slowed by the injection straw's tiny exit hole, such that it takes some time for the vessel to reach high pressures (~3 seconds to reach 150 PSI). This extended mixing time allows the agitation and mixing of the liquid to continue for a sufficient amount of time necessary for adequate carbonation to occur. The injection straw's restriction of the CO2 flow rate also serves to increase the amount of time that it takes for the carbonation vessel to reach dangerous PSI levels, thereby allowing the use of a carbonation vessel with a lower PSI rating than that of the pressurized CO2 tank in which the CO2 is stored, despite there being no pressure regulator in the flow path between the two.

The high velocity of CO2 injection into the water in the carbonation vessel acts as a method to physically push, and thereby mix the water. However, the physical orientation of the injection straw relative to the water is also important. By being pointed downwards into the water, instead of upwards from below, or from the side, such a system makes use of CO2 gas's natural tendency to want to rise up through water (since CO2 gas is lighter than water). Because of this natural tendency of CO2 gas, a downward injection of CO2 into water will get approximately twice as much contact time between the CO2 bubbles and the water (i.e. on the gas's downward injection path, and on its upward floating path), and twice as much mixing (i.e. the bubbles pushing water on its downward and upward path).

After an initial CO2 injection, the pressure within the carbonation chamber is increased (i.e. greater than the atmospheric pressure at which it started). This pressure also assists in the carbonation process, since it is essentially forcing the CO2 molecules into closer contact with the water molecules. If the pressure in the carbonation vessel is reduced back to atmospheric pressure by means of a 'pressure relief valve' opening, some of the CO2 that has dissolved into the water will immediately begin the process of separating from the water, thereby reducing carbonation of the mixture. If such a pressure relief valve were to remain open indefinitely, over time all the CO2 would escape from the water, and the water would no longer be carbonated. A day to day illustration of this concept is how soda will go flat if left long enough in an open bottle. If all the CO2 has separated from the water, and floated out into the atmosphere, neither re-pressurizing, re-agitation, nor refrigerating the carbonation vessel (or soda bottle) will do anything to re-carbonate the water, since the CO2 will no longer be present to re-mix with the water.

This concept can cause problems for any bottle of a carbonated beverage that is used over time (hours or days), thereby involving multiple openings and closings of the vessel (e.g. a typical soda bottle). Each time the cap of the vessel is opened for a drink, any CO2 that has escaped from the water, and is therefore residing in the 'headspace' above the liquid level, is able to escape through the vessel's upper opening into the atmosphere. This means that each time the bottle is opened, CO2 that has accumulated in the bottle's headspace is lost, and as stated previously, any subsequent re-pressurization, re-agitation, or refrigeration of the bottle will not assist in returning any of the carbonation. Furthermore, even if a vessel is remained capped, bottle cap seals are imperfect, and allow a constant slow leak of CO2 to escape, even if left capped, thereby ensuring that carbonated water placed into a bottle and manually sealed will inevitably lose its carbonation over time. One imperfect solution that some users of carbonated beverages have used is to invert their bottles when placing them in the refrigerator, thereby moving the non-gas-proof cap from the highest point in the bottle, where the CO2 gas would accumulate in the headspace, to the lowest point, where only water is in contact with the cap (since CO2 floats upward). This limits CO2 loss to only that amount which may be able to diffuse through the vessel's walls.

There is a need for beverage creation devices, systems, and methods that can repeatably flavor beverages and increase the absorption of CO2 in a liquid and/or allow the fluid to retain CO2 at a higher rate than existing devices.

SUMMARY

Some embodiments provide a system for dispensing fluid. The system includes a fluid cartridge having a fluid outlet spout and a non-contact drop sensor for detecting a number of drops dispensed from the fluid outlet spout. The fluid cartridge is electrically isolated from the non-contact drop sensor.

Some embodiments provide another system for dispensing fluid. The system includes a fluid cartridge having a fluid outlet spout, a carbonated fluid outlet, a still water outlet, and a non-contact drop sensor for detecting a number of drops dispensed from the fluid outlet spout. The fluid outlet spout, the carbonated fluid outlet, and the still water outlet are configured to dispense fluid into a beverage vessel.

Some embodiments provide another system for dispensing fluid. The system includes a plurality of fluid cartridges, each of which have a fluid outlet spout configured to dispense fluid droplets at a dispensing location. The system also includes a non-contact drop sensor for detecting a number of drops dispensed from the fluid outlet spouts. The non-contact drop sensor is located adjacent the dispensing location to detect droplets formed at, and dispensed from, any of the fluid outlet spouts of the plurality of fluid cartridges.

BRIEF DESCRIPTION OF THE DRAWINGS

FIGS. 12A-D shows various steps in a cleaning protocol for use in the pump implementations of FIGS. 10 and 11.

FIG. 13 shows a schematic diagram of a filter usable in the device of FIG. 1.

FIG. 14A shows a schematic diagram of a water source connection for the device of FIG. 1.

FIG. 14B shows a perspective view of an implementation of the water source connection of FIG. 14A.

FIGS. 15A and 15B show a carbonation vessel for use with the device of FIG. 1.

FIG. 16 shows a surface feature of a portion of the carbonation vessel of FIG. 15A.

FIGS. 20A-B show alternative embodiments of a carbonation vessel for use with the device of FIG. 1.

FIG. 20C shows an insert for use in a carbonation vessel for use with the device of FIG. 1.

FIG. 21 shows a nozzle for use in a carbonation module in the device of FIG. 1.

FIG. 22 shows additional features for use in a carbonation vessel for use with the device of FIG. 1.

FIGS. 31A and 31B show an alternative embodiment of a fluid level detector in use in a beverage vessel in two states.

FIG. 32 is a flowchart showing a method for delivering fluid to a vessel using the device of FIG. 1.

FIGS. 38A-B are implementations of additive cartridges for use with the device of FIG. 1.

FIGS. 39A-C show alternative implementations of additive cartridges for use with the device of FIG. 1.

FIGS. 49A-B show alternative embodiments of magnetic seals for use with a cartridge.

DETAILED DESCRIPTION OF THE PREFERRED EMBODIMENTS

Figure 1:
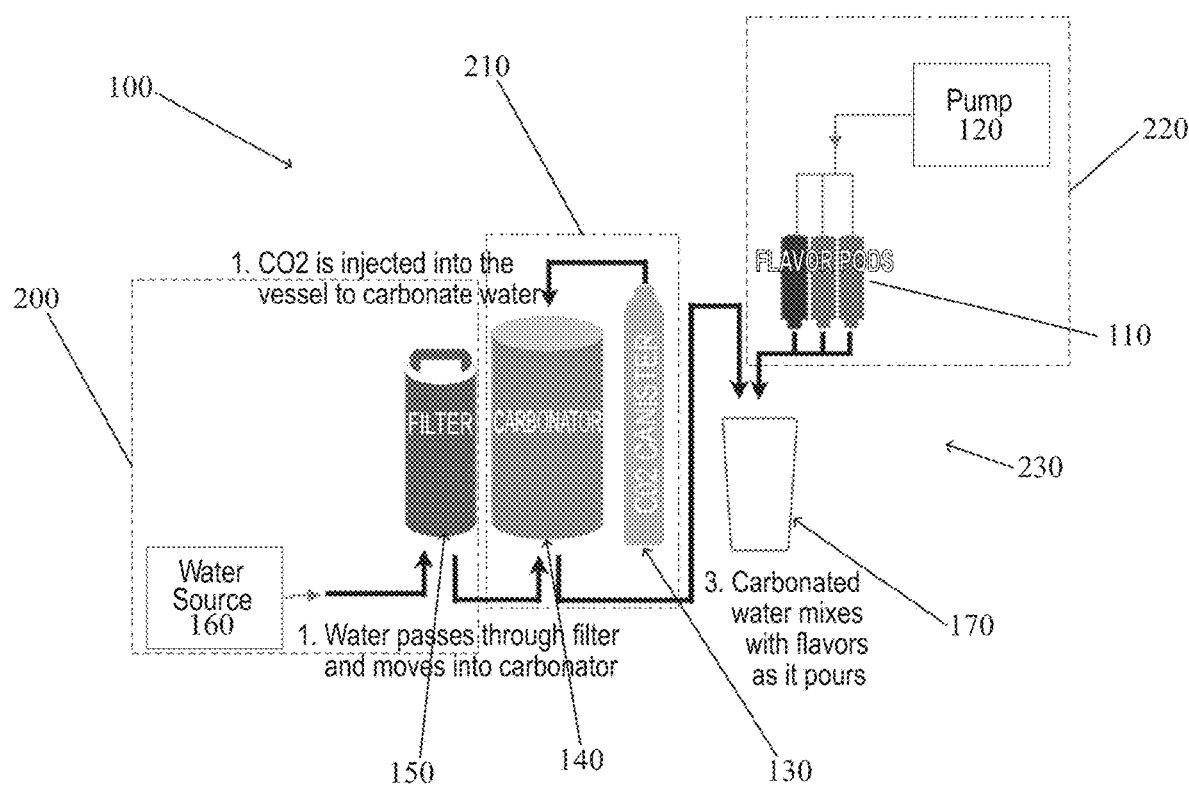
FIG. 1 is a block diagram of a custom beverage creation device.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 2:
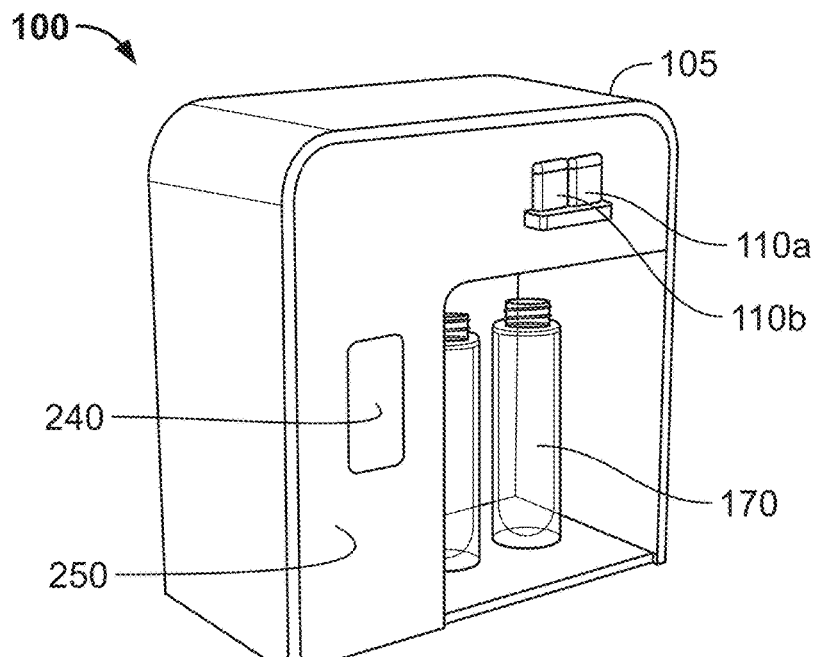
FIG. 2 is a perspective view of a custom beverage creation device implementing the features of FIG. 1.
Figure 3:
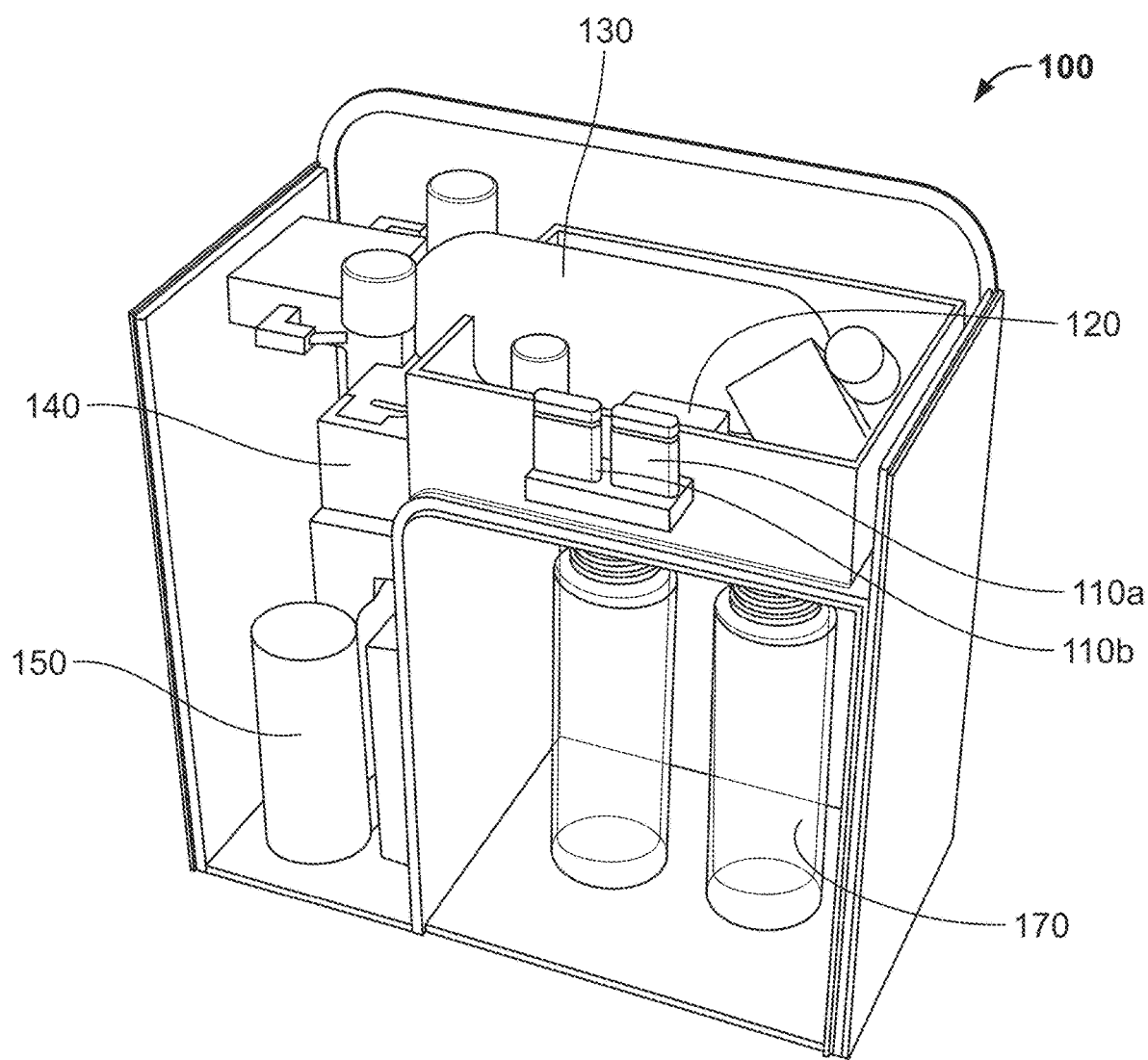
FIG. 3 is a perspective view of the device of FIG. 2 with a cover removed.
Figure 4A:
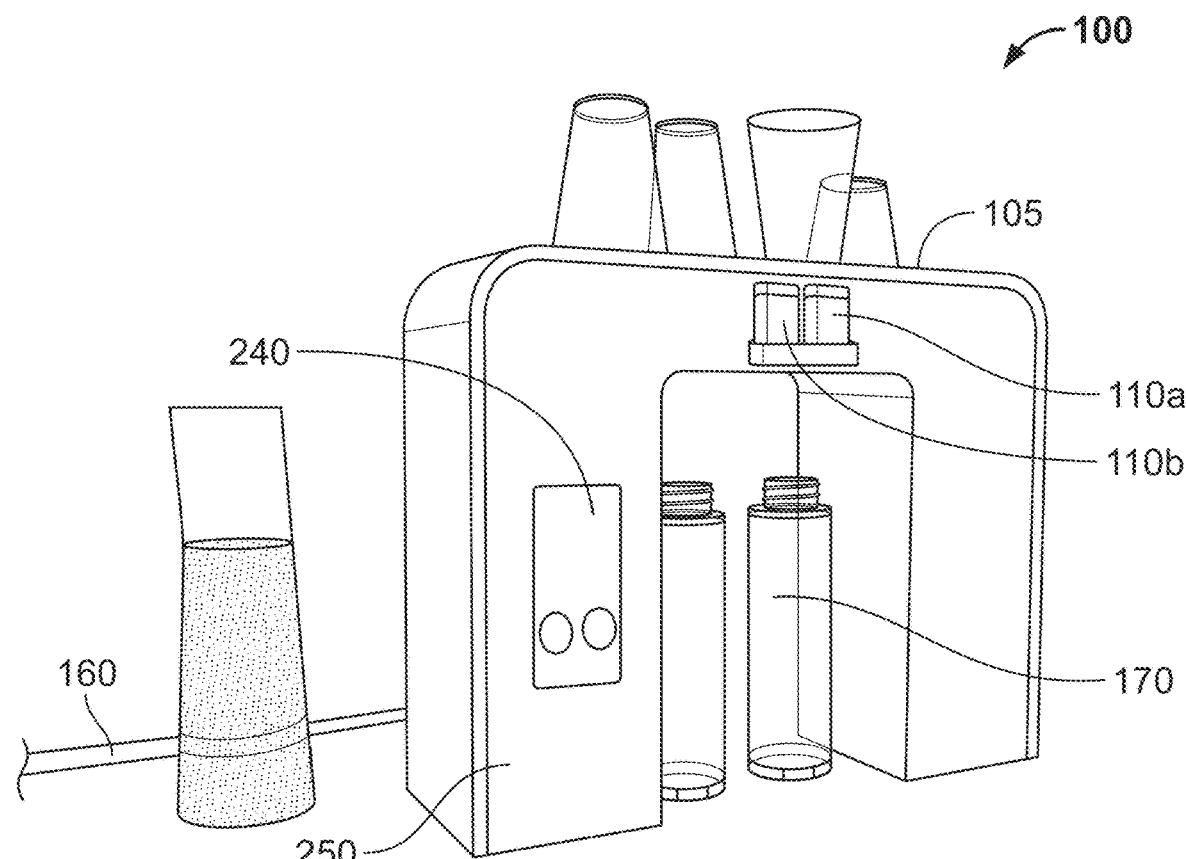
FIGS. 4A-C are perspective views of three embodiments of a custom beverage creation device.
Figure 4B:
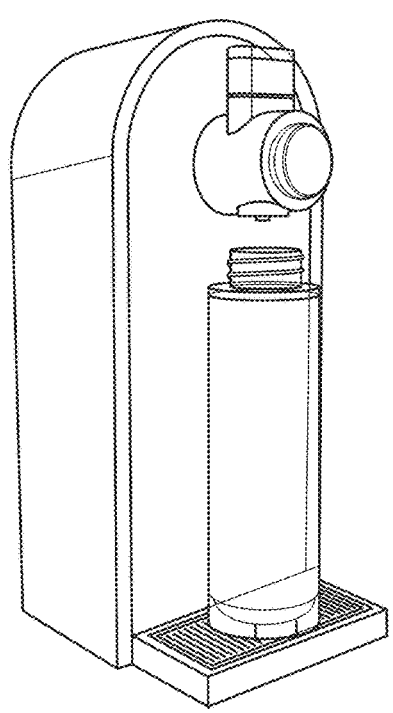
Figure 4C:
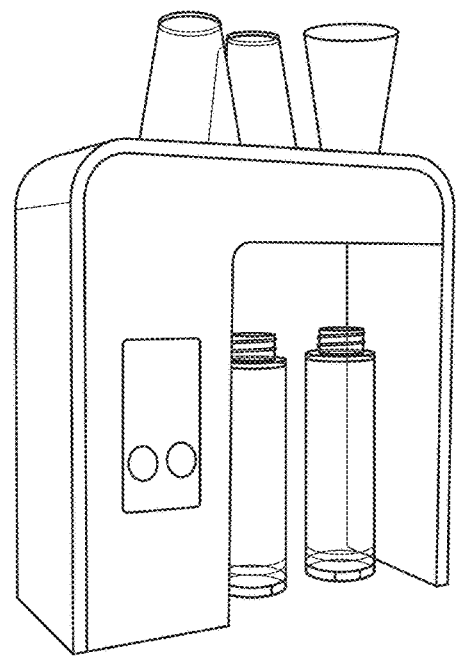

FIG. 1 is a block diagram of a custom beverage creation device 100, FIG. 2 is a perspective view of the device with a housing 105 in place, and FIG. 3 shows the device with the housing removed. FIGS. 4A-C are perspective views of three embodiments of the custom beverage creation device 100, shown with covers in place. As shown, the custom beverage creation device typically includes a filtration module, 200, a carbonation module 210, a flavor addition module 220, and an automated refill module 230. Each of these modules are discussed in more detail below.

The entirety of the device may be controlled by appropriate circuitry, including a microcontroller to control sequence and coordination of events in the operation of the device 100. Such circuitry may include memory for retaining programs for operating the device 100 and recipes for forming drinks as discussed below.

The flavor addition module 220 comprises additive cartridges 110, occasionally referred to herein as "syrup pods," and a pump 120 or pumping system for pumping an additive out of the additive cartridges 110. The carbonation module 210 comprises a carbonation gas tank 130 and a carbonation vessel 140, and the filtration module 200 comprises a water filter 150, and a water source 160. The device shown creates custom beverages and then deposits the beverage into an exterior beverage vessel 170, such as a cup or a bottle, which beverage may be selected by a user, and which refill may be initiated by the automated refill module 230.

It will be understood that while a full featured embodiment is shown and described, beverage creation devices 100 in accordance with this disclosure may be provided with only one or several of the modules shown and described. Accordingly, while the description that follows is in the context of a device 100 having the various modules described, a standalone additive dispensing system may be provided to allow a user to add customized amounts of various additives, typically in the form of syrups, to a solution to create a custom beverage.

This system would typically comprise, for example, only the flavor addition module 220, thereby including an air pump 120, which pumps air into one or more cartridges 110. Air pumped into the cartridges 110 pushes the additive out of the cartridge and into a user's beverage.

Such a system may be mounted on a stand or attached to a ferromagnetic surface, such as a refrigerator door, by magnets, and could be powered from a wall outlet or by battery power.

The dispensation of additive from each cartridge 110 may be carefully monitored using any of the methods described in more detail below, thereby allowing a user to have a high level of control over the exact amount of additive dispensed, and also high resolution control over the mixture ratios between the additives drawn from multiple cartridges 110. In this way, the standalone device bay may allow for use of specific user specified or software based recipes to replicate known beverages or user-designed recipes.

Figure 5:
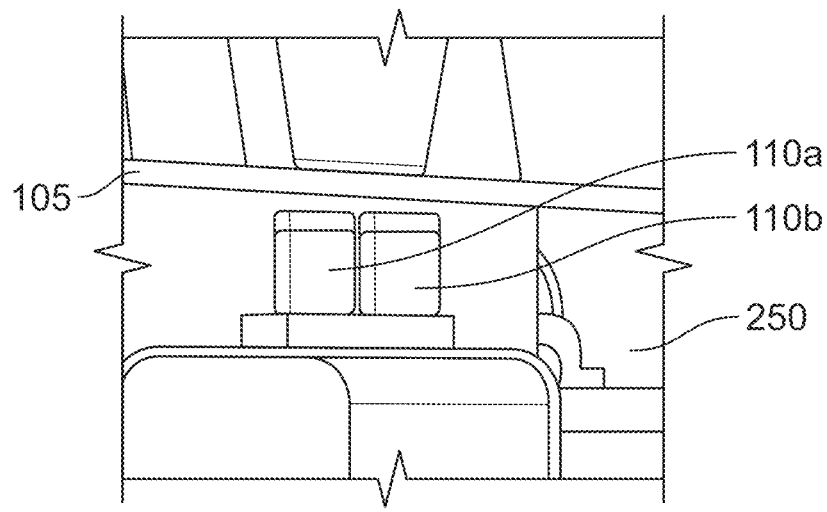
FIG. 5 is a close-up view of additive cartridges incorporated into the custom beverage creation device of FIG. 4A.

As shown in FIGS. 2 and 5, among others the additive cartridges 110 may be mounted in a docking location on a front surface of the housing 105, and a display 240 may be included with the housing. The display may be, for example, a touch screen for implementing control of the device 100. As shown in FIG. 3, the housing 105 may include a front faceplate 250 showing an aesthetic design. Such a faceplate 250 may be removable and exchangeable with different designs. A wide variety of docking locations may be implemented, several of which are shown and described below.

FIG. 5 is a close-up view of multiple additive cartridges 110a, b incorporated into the custom beverage creation device 100 of the embodiment shown in FIG. 4A. During use, the pumping system 120 extracts additives, typically in syrup form, from the additive cartridges 110 and deposits them into the exterior beverage vessel 170 as part of a custom beverage created by the device 100.

Figure 6:
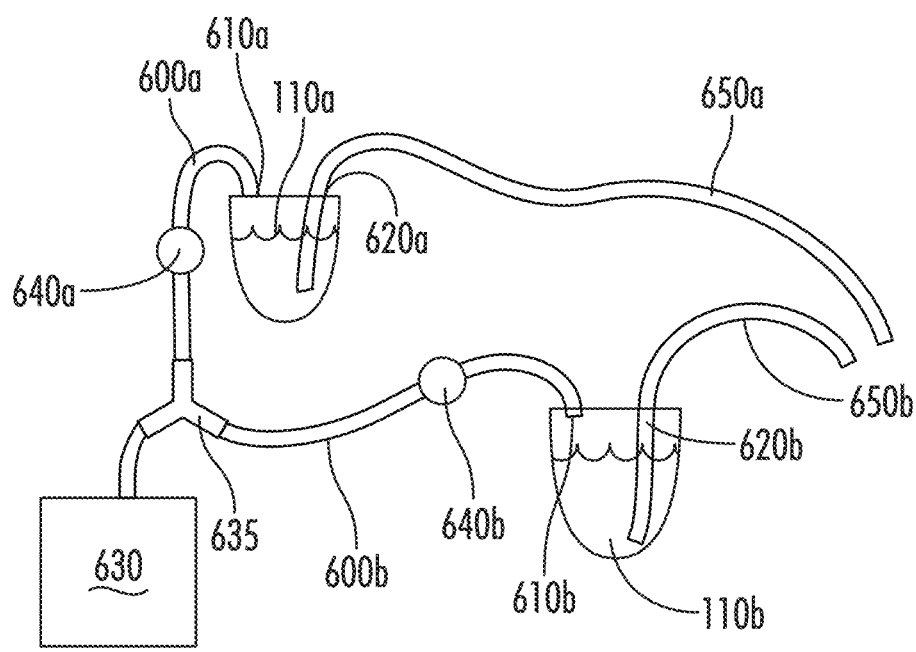
FIG. 6 is a schematic diagram of a pump implementation for dispensing additives from additive cartridges into beverages created by the custom beverage creation device of FIG. 1.

FIG. 6 is a schematic diagram of the flavor addition module 220 of FIG. 1. As shown, the module comprises a pump 630 for dispensing additives from additive cartridges 110a, b into beverages as part of a fluid delivery system of the custom beverage creation device 100 of FIG. 1.

Typically, the machine 100 will be able to deliver a concentrated additive solution from an additive cartridge 110, occasionally referred to herein as a "pod," into water to create custom beverages. It will be further understood that in some places, the additive is referred to as a "syrup," and that while the additive is a syrup in a typical embodiment, it may be any additive, including a powder or liquid with appropriate modifications to the mechanisms described. For example, in some embodiments, the additive may be provided as a powder and water may be added to the cartridge prior to first use to form a syrup.

Accordingly, it would be possible for the cartridges 110 to also dispense powder-based additives (in addition to aqueous additives). This could be achieved by having either the machine or the consumer add water to the cartridge 110, thereby dissolving it and transforming it to an aqueous form, which could then be dispensed via the previous method described. For the device 100 to accomplish this would simply require the addition of a water-input line to the cartridge itself, which could be achieved in the same way as the air input line, either through a dedicated port, or through the same port as used by the air.

The pumping of the syrup from the additive cartridge 110 may be achieved by use of a pump 630, typically an air pump, such as a diaphragm or peristaltic pump, to pump the syrup from the cartridge into a vessel. This may be by pressurizing the air inside of the cartridge, thereby displacing the additive solution out of the pod and into a user's vessel. To allow one pump to control the flow of syrup from several different additive cartridges 110a, b, the pump may be connected to the additive cartridges via a pressurized conduit, such as tubing, split into separate pressurized conduits, such as tubes 600a, b for each additive cartridge by a Y connector 635. Between the pump 630 and each cartridge 110a, b is a controllable valve 640a, b, which could be a solenoid valve, servo pinch valve, etc. By selectively opening and closing these valves 640a, b, the device 100 and system are thus able to direct the pumps 630 effects to individual additive cartridges 110a, b as desired. By pumping air into an additive cartridge 110, the pump 630 can force the syrup out of the cartridge, through the output tubing 650a, b, and into the beverage mixture. Meanwhile, by reverse pumping air back out of the additive cartridge 110a, b, syrup can be drawn back into the cartridge from the output tubing 650a, b.

Further, while output tubing 650 is shown, some embodiments do not incorporate output tubing and additive may be output directly from an output port of the cartridge. Such implementations are discussed at length below. The drawing of syrup, or any other additive, back into the cartridge 110, may thereby prevent unwanted dripping from the cartridge's output port or output tubing 650.

As shown, the fluid delivery system has at least one pressurized conduit 600, shown as tubing connected to the additive cartridges 110a, b. Air pressure in the pressurized conduit 600 may then be applied to an inlet 610a, b of a corresponding additive cartridge 110a, b in order to force the contents of the corresponding additive cartridge out through an outlet 620a, b.

In some embodiments, the pressurized conduit 600 is maintained in a pressurized manner, and a controllable valve 640 is provided in association with the additive cartridge 110 in order to control whether the cartridge should be exposed to the pressure of the conduit 600. In other embodiments, the conduit 600 is pressurized by the pump 630 on demand in order to force contents out of the relevant additive cartridge 110.

In some embodiments, such as that shown in FIG. 6, multiple additive cartridges 110a, b are provided, each typically providing distinct additives. In such embodiments, the pressurized conduit 600 may be split into multiple conduits 600a, b, each corresponding to a single additive cartridge 110a, b. In such an embodiment, each additive cartridge 110a, b, may be provided with a corresponding controllable valve 640a, b, such that the valves can be used to determine which of the additive cartridges 110a, b are exposed to the pressure in the corresponding conduit 600a, b. In some alternative embodiments, instead of a single pump pressurizing all cartridges 110a, b by way of the valves 640a, b as shown, a single pump could be paired with each cartridge.

The additive cartridges 110a, b, may contain minerals, flavoring, or coloring for beverages, among other potential additives, typically in some concentrate form, such as a syrup. Typically, when multiple cartridges 110a, b are provided, the valves 640a, b may be opened either simultaneously or consecutively in order to add precise amounts of the additives from each cartridge in order to create a custom drink. In such a manner, the device 100 can incorporate, for example, flavoring from one cartridge 110a and minerals from a second cartridge 110b. Further, the valves 640a, b may be calibrated to allow for the precise application of additives to drinks by, for example, partially open or open for a precise amount of time. In some embodiments, multiple identical additives cartridges 110 may be incorporated so as to increase the speed of the depositing of additives into a beverage.

While the precise amount of syrup dispensed may be tracked by determining how much fluid is pumped into a cartridge 110, the amount of syrup dispensed may also be tracked by determining how much syrup, or how many drops of syrup, have been dispensed from the cartridge. This is discussed in more detail below with respect to FIGS. 52A-49.

In some embodiments, the additive cartridges 110a, b, may be available in a wide variety of user selectable options, such as different drink flavors, colors, or other additives. The additive cartridges 110a, b may then be encoded with recipes, instructions, or general information, readable by the device 100, that account for an amount of syrup required for a particular drink, viscosity of the syrup contained, and/or other details specific to the contents of the cartridge.

As shown in FIG. 6, the outlet 620 of each additive cartridge may be connected to output tubing 650a, b. In this manner, the output tubing 650a, b may transport the additive to an additive output for the device 100, such as a glass or bottle filling location or a fluid mixing location.

Figure 7:
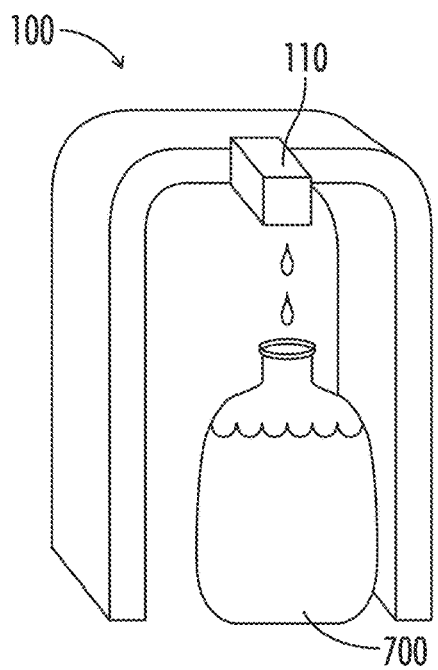
FIG. 7 shows a perspective view of the additive cartridges dispensing additives in the context of the device of FIG. 1.

FIG. 7 shows a perspective view of the additive cartridges 110 dispensing additives in the context of the device of FIG. 1. As shown, the additive cartridges 110 may be mounted directly above an additive output location for the device 100 such that the additive is output directly into a drinking vessel, such as a bottle 700 for a beverage.

Accordingly, to prevent any need to clean the 'output tubing' 650, it is also possible to eliminate the output tubing entirely. If the additive cartridge 110 is docked onto the machine in a position such that the cartridge's outlet 620 is directly above the user's drinking vessel 700, the syrup could be output from the cartridge 110 directly into the drinking vessel, without the need to horizontally transport the syrup via tubing. In this way, when the additive cartridge 110 is removed from the machine, there are no remaining components on the machine that have come into physical contact with the syrup in any form. This is advantageous, as the cartridge 110 can typically be cleaned more easily than the rest of the machine by, for example, placing it in a dishwasher. Additional features easing the cleaning of the cartridge 110 are discussed in more detail below.

Figure 8:
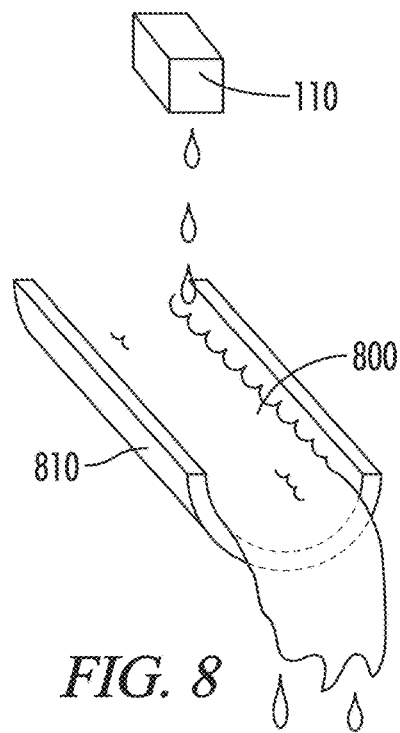
FIG. 8 shows a perspective view of the additive cartridges dispensing additives in the context of a second implementation of the device of FIG. 1.

FIG. 8 shows a perspective view of the additive cartridges 110 dispensing additives in the context of a second implementation of the device 100 of FIG. 1. As shown, instead of depositing the additive directly into a bottle for the beverage, the device 100 deposits additives into a fluid flow 800. For example, the fluid flow 800 may be water retrieved from a water source or other internal modules of the device 100.

The fluid flow 800 may be provided in a conduit 810 having an open top, or may be an oversized closed conduit such that the fluid flow only partially fills the conduit. In such a manner, the additive cartridges 110 may deposit additives into the fluid flow without an outlet 620 of the additive cartridge coming in contact with the fluid flow.

The conduit 810 may then transport the fluid flow 800, including the additive, to a bottle 700 or other drinking vessel for a user.

Figure 9A:
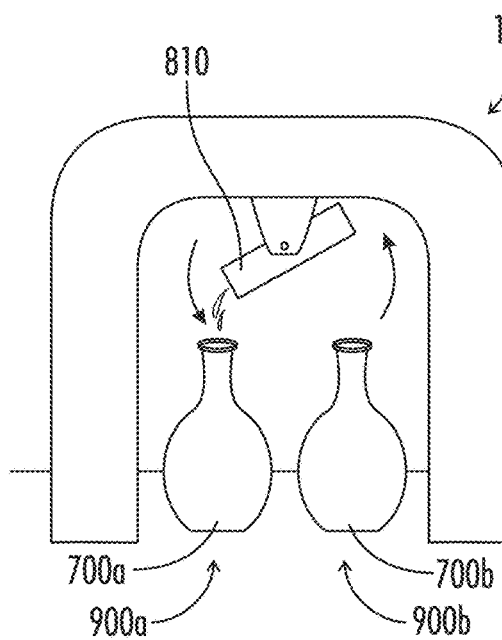
FIG. 9A-H show variations on the implementation of FIG. 8.
Figure 9B:
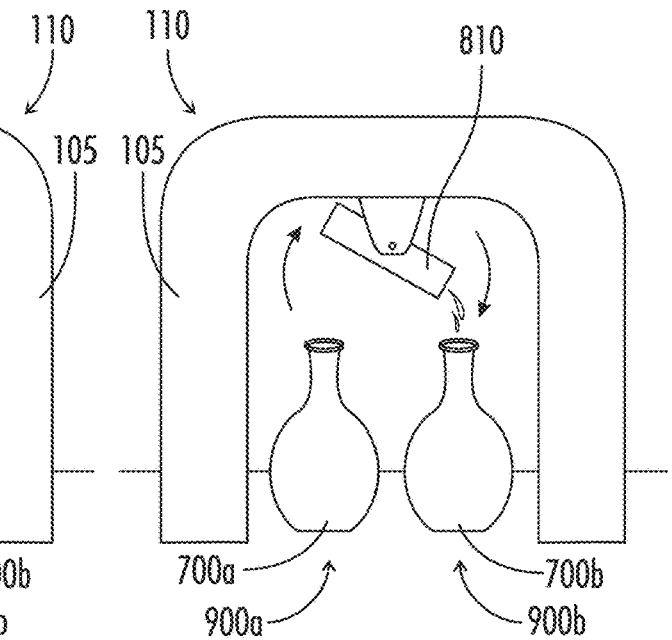
Figure 9C:
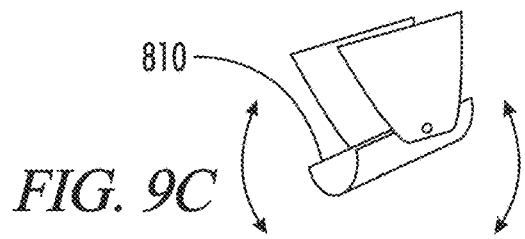

Accordingly, if the additive cartridge 110 is not docked directly above the user's drinking vessel, horizontal transport of the syrup could be achieved in a way that would immediately dilute the syrup to an extent that would not leave residue on any machine components. This could be achieved by having an open topped 'river' of water 800 flowing beneath the additive cartridge's 110 outlet 620. By having the syrup drop through mid-air into a 'river' flowing below it, any potential backflow of the river water into the cartridge 110 is avoided. Such backflow would be undesirable, as it could result in uncontrolled and undesired dilution of the additive cartridge's 110 syrup FIGS. 9A-C show a variation on the implementation of FIG. 8, with 9C showing a closeup view of the tilting river mechanism described. As shown, the conduit 810 may be provided external to the housing 105 of the device 100, such that the additive and the fluid base, such as water, each fall into the conduit just before the conduit transports the fluid to a bottle 700a, b or other drinking vessel. As shown, the conduit 810 may be tilted in order to adjust the steepness of the conduit, so as to regulate the fluid flow or adjust for different size vessels being filled. Further, the conduit 810 may be tilted in distinct directions in order to provide fluid to multiple distinct vessels 700a, b at filling locations 900a, b.

Accordingly, in order to facilitate ease of use, it would be useful to allow users of the machine to position two empty bottles 700a, b below the machine, and to have the machine 100 automatically fill both bottles. In this way the user could leave two empty bottles 700a, b, and come back to get them when they are both full, instead of waiting for the machine 100 to fill a single bottle 700a, and then replacing the filled bottle with another empty bottle 700b, and waiting for that bottle to fill. To allow the 'river' 800 system to accomplish this with minimal additional electromechanical components, we discuss several possible mechanisms.

The first is the 'Tilting River' mechanism, shown in FIGS. 9A-9C in which there is an open topped or, in alternative embodiments, closed-topped) channel 810 which can be tilted like a see-saw. This tilting could be electromechanically actuated, or could possibly be manually actuated by a user. By tilting like a see-saw, the 'tilting river' 810 can tilt to one side to fill one of the user's bottles 700a, and then tilt to the other side to fill the other of the user's bottles 700b, as depicted in FIGS. 9A and 9B.

The ability for the river 810 to tilt (either manually or electromechanically) also would allow for different height user vessels 700a, b to be placed under, and easily filled by the mechanism, since the river could be tilted downwards to touch the lip of bottles of varying height.

Figure 9D:
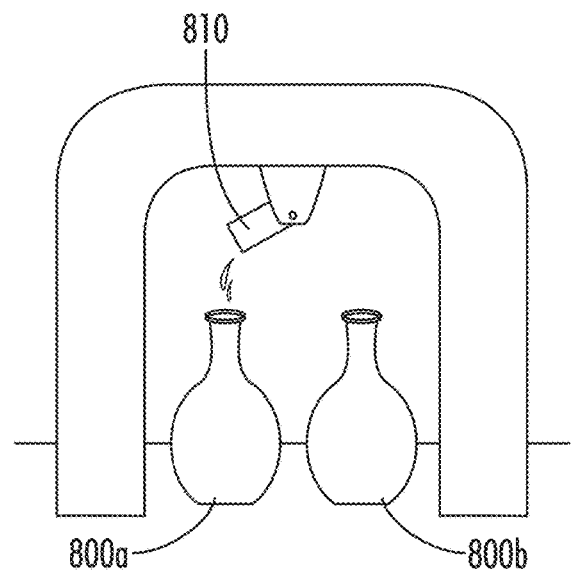
Figure 9E:
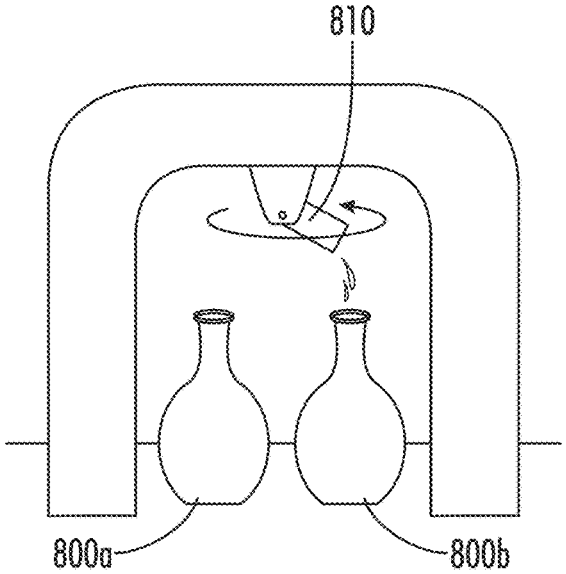
Figure 9F:
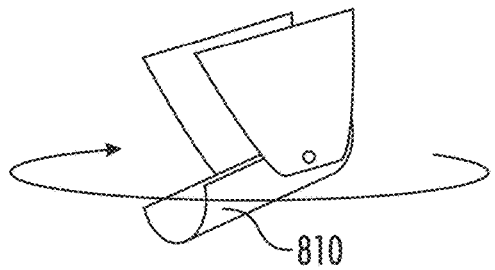

Alternatively, instead of tilting the river 810 from side to side, the river could be rotated, as shown in FIGS. 9D-F. We will refer to this as a 'Rotating River' mechanism. Such a mechanism would allow two, or more than two, user vessels 800a, b to be filled, by rotating from the position of one vessel's lip to the position of other vessel lips. This mechanism could also be combined with the 'Tilting River' mechanism to further increase speed of multi-vessel fill times, and also to allow facilitated filling of vessels of varying height.

Figure 9G:
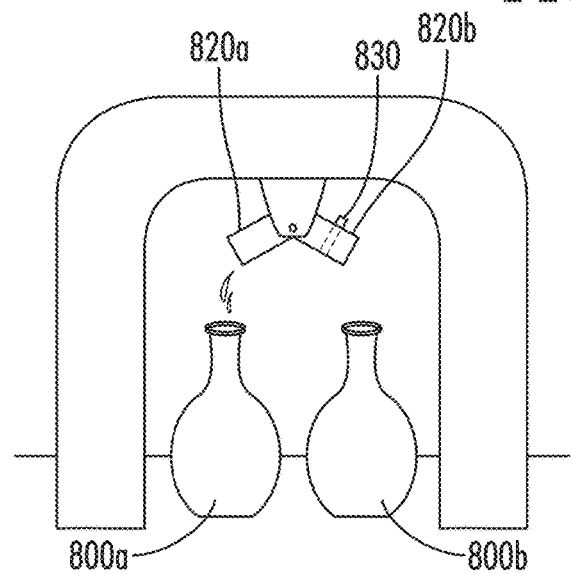
Figure 9H:
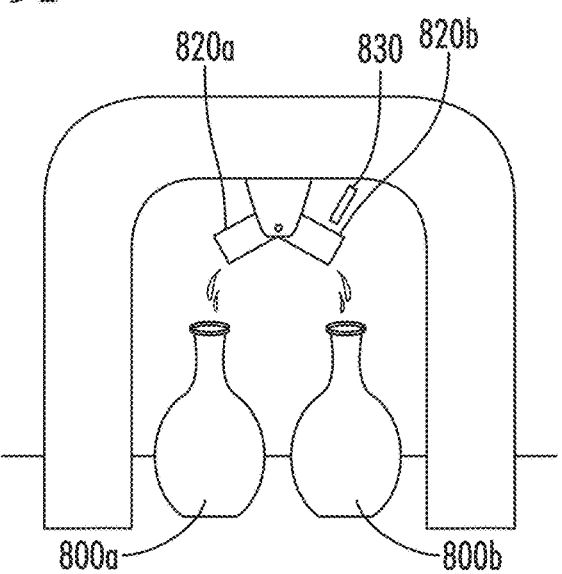

Alternatively, as shown in FIGS. 9G-H, the river could by split into 2 or more branches 820a, b, all of which, or all but one of which, could be blocked by an electrically actuated blockage 830 (a 'dam' wall, etc.). By opening/closing these blockages one would choose to fill one, or more than one bottle 800a, b simultaneously with the same beverage (i.e. one output stream of beverage being split into more than one 'river').

Finally, all of the "river" output mechanisms shown in FIGS. 9A-H could be removable, such that a user could choose to purchase a device 100 with or without the river 810, but could add the feature later if desired. Additionally, these rivers could come in different lengths such that longer lengths would extend laterally out of the device's 100 arch, such that it protrudes past the vertical front face of the machine. This would allow a user to have the machine pour beverage into a user vessel that is too large to physically fit within the device's 100 arch.

Figure 10:
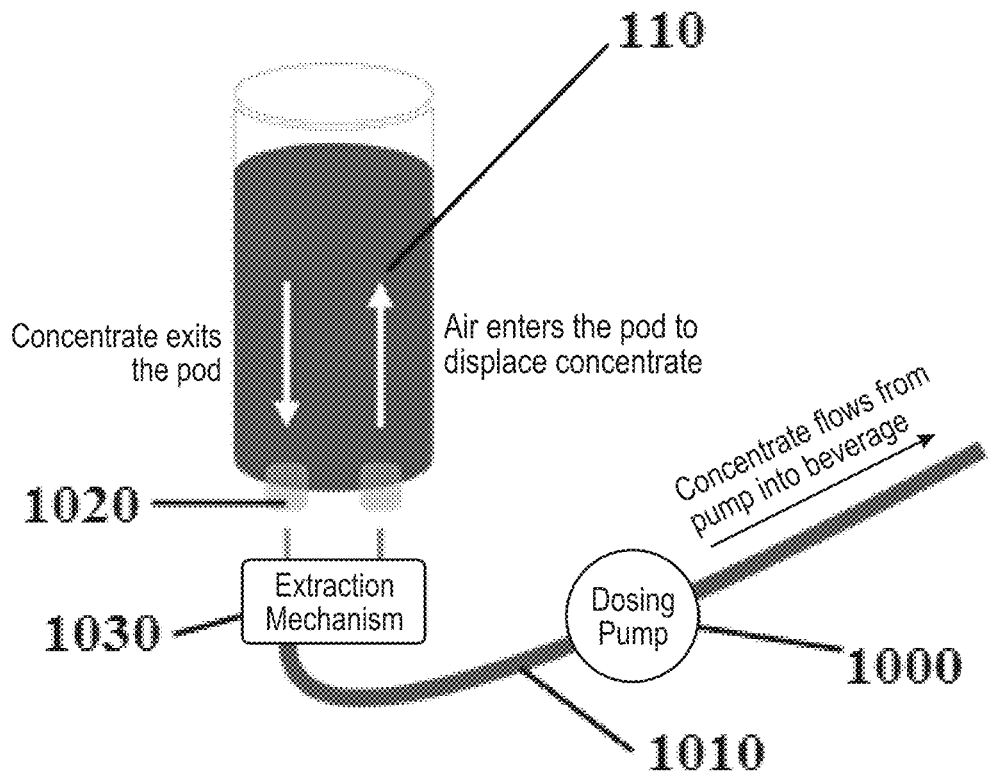
FIG. 10 shows a schematic diagram of a second pump implementation for dispensing additives in the context of the device of FIG. 1.
Figure 11:
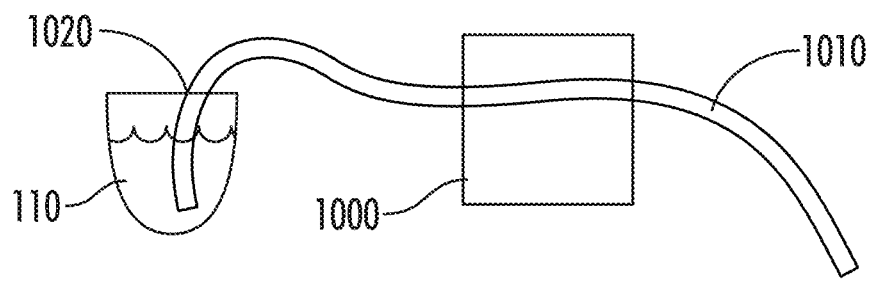
FIG. 11 shows a simplified schematic diagram of a variation of the pump implementation of FIG. 10.

FIG. 10 shows a schematic diagram of a second pump implementation for dispensing additives in the context of the device of FIG. 1, and FIG. 11 shows a simplified schematic diagram of a variation of the pump implementation of FIG. 10. As shown, a pump 1000 may be provided on a pressurized conduit 1010 provided at the outlet 1020 of the additive cartridge 110. In such an embodiment, the pump 1000 generates negative pressure, or suction, in the pressurized conduit 1010 so as to draw the contents of the additive cartridge 110 into the pressurized conduit. Further, once syrup from the additive cartridge 110 is drawn from the outlet 1020, the pump 1000 would be pumping syrup instead of air.

In such an embodiment, as discussed above, a valve may be provided as part of an extraction mechanism 1030 in association with the additive cartridge 110 in order to prevent the cartridge from dispensing additive to the pressurized conduit 1010 unless such dispensing is intended. Such a valve may be provided between the pump 1000 and the outlet 1020 in order to prevent exposing the pump to the negative pressure of the pressurized conduit 1010. Alternatively, such a valve may be provided at an inlet, such that opening the controllable valve 1020 allows ambient air to displace fluid in the additive cartridge 110 such that the additive may be drawn into the pressurized conduit 1010.

After a syrup pod 110 has been emptied, or between uses, it will be useful to be able to clean all of the tubing, such as the output conduit 1010 inside the machine that has come in contact with the pod's syrup. This would allow a user to replace the empty pod 110 with a new pod containing a different syrup without mixing the new syrup with remnants of the old syrup in the tubing 1010. Such a cleaning protocol also helps ensure maintenance of sanitation in the tubing 1010.

FIGS. 12A-D show various steps in a cleaning protocol for use in the pump 1000 implementations of FIGS. 10 and 11. As shown, the pump 1000 may be configured to reverse flow of fluid in order to facilitate cleaning of the pressurized fluid conduit and any other surfaces that may come in contact with additives. As shown, in step one of the cleaning protocol, a cleaning valve 1200 may be opened to provide access to a water source 1210, and water may be drawn from the water source into the additive cartridge 110. Water may then be drawn from the additive cartridge 110 into the pressurized conduit 1010 in order to clean the conduit. The pump direction may then be reversed in order to return the water into the additive cartridge 110 for removal by a user. The additive cartridge may then be disposed of or emptied and prepared for reuse.

Accordingly, a valve 1200 can be installed which allows momentary flow of water from a pure water source 1210 into the empty syrup pod 110. Once the cartridge 110 has been filled with pure water, the pump can push/pull this water from the cartridge, throughout the entire length of tubing 1010 that had previously come into contact with the cartridge's syrup. By pumping the water back and forth within the tubing 1010 it can help clean the tubing more thoroughly. The pump 1000 can then transfer this water (now presumably mixed with remnants of syrup from the cleaned tubing) back into the cartridge 110, which the user can remove and refill, recycle, or dispose of.

As an alternative, when all the syrup in a cartridge 110 has been used up, the user can remove the cartridge and replace it with another cartridge that is filled with a cleaning solution. The pump 1000 could move this cleaning solution out from the cartridge 110 and into all of the tubing 1010 that has previously come into contact with the previous cartridge's syrup. The pump could then pump the cleaning solution back into the cartridge 110, allowing the user to remove the cleaning solution cartridge 110.

In some embodiments, instead of providing a replacement pod or cartridge 110 containing cleaning solution, a user may use an external vessel containing cleaning solution. Such a vessel may be applied at an outlet of the device 100 while the pump is running in reverse, such that cleaning fluid is sucked into the tubing 1010 to the cartridge 110 by the pump in order to be used for cleaning.

In some embodiments, such a cleaning solution in an additive cartridge 110 may be used to clean bottles as well. Alternatively, or in addition to such implementations, the device 100 may further comprise a bottle cleaning protocol. For example, if a user positions a bottle 700 underneath the output spout of the machine 100, or under a specialized 'bottle cleaning location', the machine could clean the bottle via a UV LED which emits light around the 254 nm wavelength range which is known to have good sterilization properties, and/or via a high pressure water spray system. The water spray could be combined with a cleaning fluid deployed from a specialized 'syrup cartridge' made to hold cleaning fluid instead of syrup.

FIG. 13 shows a schematic diagram of a filter usable in the device of FIG. 1 as part of the filtration module 200. FIG. 14A shows a schematic diagram of a water source connection 1300 for use in the filtration module 200, and FIG. 14B shows a perspective view of one embodiment of the water source connection 1300 of FIG. 14A.

There are many types of filters on the market, each capable of filtering different subsets of contaminants out of the water. The device 100 may have a 'customizable filter' system which would allow multiple types of filters to be 'plugged into' the machine such that the machine's inlet water flow would pass through them sequentially. Unused filter ports would simply allow the water to flow past them.

As shown, a fluid source, such as a water source connection 1300 connected to a faucet 1305, is provided to provide fluid flow in a fluid flow conduit 1310. The fluid source connection 1300 may be connected to a user's kitchen faucet 1305, a user's water line, or a dedicated water line installed for the device 100. Water routed into the device 100 is then routed to a water filter 150.

As shown, the filter 150 may comprise multiple portions, each providing different filtering characteristics and which may result in water having different compositions. Accordingly, a single filter 150, or a filter housing, may comprise several distinct filter segments, each of which may independently removable, replaceable, exchangeable, or activated to modify the filtering characteristics of the device 100.

In order to implement a custom filter, certain segments of the filter 150 may be activated and certain segments may be removed or bypassed. In such an embodiment, each filter segment may be provided, for example, with a controllable valve for determining whether water from the fluid source 1300 should enter that particular filter segment. In some embodiments, water may be filtered by one custom filter out of several filters. In such an embodiment, water may be routed by controllable valves into one complete filter. In other embodiments, water may be filtered by several segments of a custom filter. In such an embodiment, each filter segment will have an independent valve, and the filters segments are arranged consecutively, such that water from the outlet of a first of the filter segments next encounters a controllable valve at the inlet of the next of the filter segments, and such that any fluid that bypasses the first filter segment also next encounters the controllable valve at the inlet of the next of the filter segments.

Each of the filter segments may be, for example, a large particulate filter, a granulated or solid block carbon filter, a microfiltration membrane, and a nanofiltration membrane, among others. It will be noted that while this disclosure discusses carbonation methods, users may still dispense still water immediately following the filtration process. Accordingly, a still water dispensation solenoid may function as a valve to release still filtered water directly to an output of the device.

The device 100 can be connected to the user's water supply in many ways, such as by a connection 1300 at the output of the user's kitchen sink faucet 1305, as discussed above, or by splicing into the kitchen sink's water supply pipes underneath the sink. If connected to the output of a sink faucet 1305, it may be necessary to allow the user to get water from their sink faucet as usual, while also allowing for the machine to receive water from the sink faucet when needed. For these purposes a 'Y-splitter' can be used which allows water to travel both down into the sink, and also to the machine. To allow the machine to request water from the sink faucet whenever needed, it is necessary for the user to have their kitchen sink's knob always left in the 'on' position, such that water is always reaching the output end of the sink's faucet, where the Y-splitter is connected. Because of this "always on" requirement for the user's sink knob, it may be necessary to introduce a secondary valve later in the sink faucet's water path which would allow the user to still turn on and off the water flow from their sink faucet into their sink. This secondary valve can be a manual knob/valve, or an electronically controlled valve. The electronically controlled valve would be controlled either by a manual button press, or touchscreen, or by passing one's hand within some proximity to a sensor, such as an infrared or sonar proximity sensor.

Finally, another option for allowing the machine to have access to a water supply is for the device 100 to have its own reservoir of water, which could be easily refilled from the sink faucet, either by manually transporting the reservoir to under the faucet, or by a retractable tubing with a funnel at the end that could be pulled from the machine to place it under the faucet.

In such an embodiment, a standard under-the-sink installed diverter may be provided on the cold or hot water line (relative to the temperature of water needed by the device), which is connected to a filter, which is connected to a long coiled hose which ends at a manually or electronically controlled valve. With such a system, whenever the counter top device's water reservoir is in need of refilling, the user could uncoil the hose from under the sink, stick its end into the machine's water reservoir, and then activate the valve at the end of the hose to allow water to flow into the reservoir to refill it.

Further, many kitchen appliances require access to a particular temperature range of water. For example, a refrigerator may require only cold water to perform necessary functions. However, it is not always convenient or possible for a user to install a traditional under-the-sink diverter hose from the hot or cold water line or drill a hole in a counter top for the hose. Accordingly, a valve device may be provided which connects to either the hot or cold faucet knob, allowing for a diversion at that point, rather than under the countertop.

Accordingly, water may be drawn from an under-sink T-junction spliced into the user's water supply line, an accessory water reservoir, or a tap connected T-junction. Either of these mechanisms may further use a water pressure regulator.

The refilling station can be powered by standard outlet power adapters, or by an onboard rechargeable battery (e.g. Lead Acid). This battery could be recharged either by connecting it to an outlet-connected recharging circuit, and/or by deriving power from a water turbine 1400, and or CO2 gas turbine. The hydroelectric water turbine 1400 could be installed anywhere along the water flow path through the machine's components. An optimal localization would be at the location of first contact with the user's home water supply (e.g. the sink head, or at any other integration point with the user's water supply), such that it would generate power (i.e. water would flow through it) both when the user commands water to pour into their sink (blue arrow), as well as when the machine commands water to flow through its tubing (red arrow). A wire could connect the turbine to the machine's battery by following the path of the machine's water tubing which connects it to the sink. Meanwhile, a CO2 gas turbine would be located somewhere along the gas' pathway from the machine's compressed CO2 tank to the machine's carbonation reservoir, such that it would generate power anytime the CO2 gas was injected into the carbonation reservoir to carbonate water. In some embodiments, instead of utilizing a turbine, solar power could be used to power the refilling station, as well as other components of the device.

The device 100 may be provided with a processor and software can be used to keep track of CO2 usage, water filter usage, and syrup usage so that it can provide updates to a user on when each of these will run out. Each of these may be tracked by the amount of time that the machine's respective actuators (e.g. CO2 dispensing servo motor, water inlet valve, peristaltic syrup pump) have been active since the new CO2 tank, water filter, or syrup pod was inserted into the machine. The user will inform the machine when a new CO2 tank, water filter, or syrup pod was inserted by clicking on a button in the machine's app, or pressing a button on the machine itself, or the device 100 may detect the installation of a new, or refilled, component.

The amount of CO2 left in a device-connected compressed CO2 tank can be assessed by the amount of time it takes for the carbonation reservoir to reach a certain pressure (e.g. 150 PSI) after the compressed CO2 tanks' pin valve has been actuated. This amount of time is a function of the flow rate of CO2 from the tank into the carbonation reservoir, which is a function of the amount of remaining pressure in the compressed CO2 tank. In some embodiments, it may be possible to determine how much additive is left in a cartridge 110 by way of a capacitive sensor. Alternatively, the device 100 may track the amount of fluid remaining in a cartridge 110 by tracking how much fluid from that cartridge has been used using any of the tracking mechanisms or methods discussed elsewhere in this disclosure.

In some embodiments, the device 100 may further comprise cooling and/or heating modules to the inlet of the machine. These modules would be installed between the machine and the user's under-the-sink connection to the user's home water pipes.

To facilitate proper positioning of a water bottle underneath the output spout of the device 100, the device could have a laser, or light beam shining either down from the center of the output spout, or upward into the center of the output spout. Alternatively, a drip dray for the device 100 may be provided with concentric circles, either as a design or as physical ridges, which may be utilized for positioning the bottle centrally underneath the output of the device.

As discussed above, the device 100 provided includes a carbonation module 210 for carbonating a beverage. Certain features of some embodiments of the device 100 may be designed to increase the efficiency of carbonation by increasing the contact time between CO2 bubblers and water as well as increasing the efficiency of gas-liquid mixing. Further, in some embodiments, specialized bottles are provided that increase the amount of time a manually capped bottle of carbonated water will maintain its carbonation over time after an initial carbonation process.

As shown in FIG. 1, the carbonation module 210 may provide a gas supply, such as a carbonation gas tank 130 and a fluid vessel, such as a carbonation vessel 140. The device 100 may further include a retainer, such as a permanent connection or a screw connection for retaining the carbonation tank 140 or other fluid vessel relative to the gas supply 130, and a gas injection mechanism 135, such as a nozzle, for injecting gas into a fluid retained in the carbonation vessel 140.

During use, the carbonation vessel 140 is filled with fluid, such as water from a water source 160. The gas injector 135 then injects gas below a fluid surface level 145 within the carbonation vessel 140. Typically, the gas injector 135 injects gas just below a top surface 145 of the fluid within the carbonation vessel 140 with some velocity, such that the gas follows a path to the bottom of the carbonation vessel and then takes a return path back towards the top surface of the fluid.

In order to achieve consistent results, the carbonation vessel or reservoir 140 may be filled with water or fluid to be carbonated only to a pre-determined level, thereby allowing a sufficient amount of headspace to allow for consistent carbonation at the desired efficiency. The amount of water drawn from a water supply may be monitored in order to account for variations in flow rate. CO2 may then be released from a compressed CO2 tank by applying an actuator to an actuation pin. Such CO2 may then travel through tubing, potentially a check valve, and then the gas injector 135, such as an injection straw, discussed at length below. Further, the carbonation reservoir may comprise a pressure switch for maintaining a consistent maximum pressure level, such as 150 PSI, thereby ensuring control over pressure levels within the carbonation reservoir.

Further, when carbonated water is requested by a user, a separate valve may release CO2 first in order to reduce pressure in the carbonation vessel and thereby avoid excessively high flow rates to the user. Further, air pumps may be provided to expel the carbonated water after the CO2 has been released, such that the carbonated water can be dispensed at a consistent rate. A valve with a large diameter may be provided for dispensing the water in order to avoid excessive agitation that could otherwise release the carbonation of the water.

There are several ways in which carbonation can be assisted, including increased contact duration between CO2, or other carbonation gasses, and water or any other fluid to be carbonated, increased surface area of contact between the carbonation fluid and fluid to be carbonated, increased pressure, and decreased temperature. For ease of reference, the carbonation fluid will be occasionally referred to as CO2 and the fluid to be carbonated will be occasionally referred to as water.

The duration of contact between water and CO2 can be increased by several methods. For instance, by adding a spiral staircase-type structure within the carbonation vessel, as shown in FIGS. 15A and 15B. This 'staircase' could be 'staired' like a staircase, or it could be smooth like a ramp, or it could have various other structural sub-components repeated along its length, as will be described later. The staircase would extend inward from the walls of the carbonation vessel 140 towards the vessel's center, but would not extend all the way to the center of the vessel, thus leaving a continuous 'central hole' along the entire vertical length of the staircase. This central hole is referred to as the "well-hole" in architectural language when referring to the central empty space in stairwells. This well-hole would allow the injected CO2 to travel downwards down the center of the carbonation vessel, thereby imparting a pushing and mixing force upon the water. This downward moving mixture of water and CO2 would be forced back upwards towards the top of the reservoir once it hits the bottom of the carbonation vessel. This now upward moving mixture of water and CO2 would be then forced by the spiral staircase structure to rise in a spiraling motion back towards the top of the carbonation vessel 140. Because a spiraling return path is longer than the more straight-line-vertical return path that would be followed by the water/CO2 mixture if the spiral staircase was not present, the spiral staircase serves to increase the contact time between the water and CO2, thereby facilitating dissolving of the CO2 into the water.

Accordingly, FIGS. 15A and 15B show one example of a carbonation vessel 140 for use with the device 100 of FIG. 1 designed to increase the duration of contact between carbonation gasses and water. As shown, the carbonation vessel 140 may include internal surfaces 1500, in this case a spiral path adjacent an outside wall 1510 of the carbonation vessel 140 designed to obstruct the return path. By forcing the carbonation gas to take a longer return trip to the fluid surface level, the gas remains in contact with the fluid for a longer period of time, allowing more efficient mixing of the fluid with the gas. Because the spiral path 1500 shown is adjacent the outside wall 1510 of the vessel and does not extend to the center of the vessel, a central well-hole allows for a direct path to the bottom 1520 of the carbonation vessel 140. In some embodiments, the bottom 1520 of the vessel may have a profile designed to deflect gas towards the sides of the vessel, forcing it to return by way of the spiral path 1500.

FIG. 16 shows a surface feature, shown as vertical wings 1600 on an upper surface 1610 of, for example, the spiral path 1500 of FIG. 15A.

Such wings 1600 could be configured to direct the flow of any downward flowing water, such as that captured by or pushed downwards by injected CO2, into a downward spiral motion. Such a downward spiral motion would be in the opposite rotational direction to the upward spiraling motion on the underside of the staircase, thereby generating additional agitation.

Figure 17:
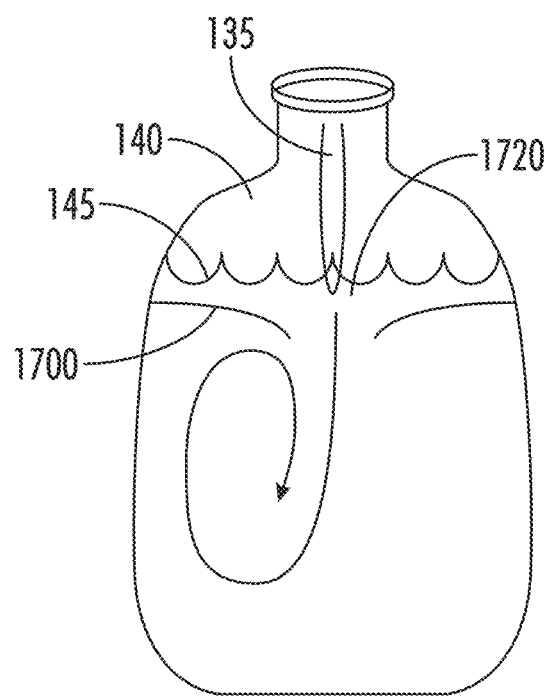
FIG. 17 shows an alternative embodiment of a carbonation vessel for use with the device of FIG. 1.

FIG. 17 shows an alternative embodiment of a carbonation vessel 140 for use with the device of FIG. 1. As shown, the vessel may include annular flanges 1700 below the fluid level 145. Accordingly, upon injection, gas travels to the bottom of the carbonation vessel 140, and upon rising to an upper surface 145 of the fluid, the gas is redirected downwards by the annular flanges 1700. Such flanges 1700 could be used alone or in combination with other features, such as the spiral path 1500 discussed above.

As shown, the flanges 1700 do not extend to the center of the carbonation vessel 140, thereby leaving a central hole 1720 allowing carbonation gas, such as CO2, to pass down vertically during injection. However, during a return trip, the gas is redirected downwards before returning to the upper surface 145 of the fluid.

As shown, the flanges 1700 may be downwardly concave, and may retain gas below the fluid level 145 after completion of agitation.

Increasing the surface area of CO2 with water can be achieved by various means. Breaking bubbles into smaller bubbles is one method, as smaller spheres have a higher surface area to volume ratio than larger spheres.

Figure 18:
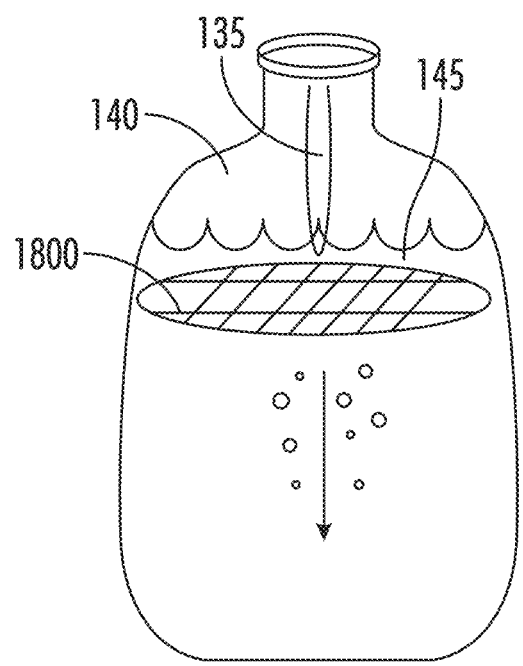
FIG. 18 shows an alternative embodiment of a carbonation vessel for use with the device of FIG. 1.

FIG. 18 shows an alternative embodiment of a carbonation vessel 140 designed to increase the surface area of the carbonation gas for use with the device of FIG. 1. As shown, the carbonation vessel 140 may have a gas agitator for breaking up gas bubbles. This may be, for example, by use of a plastic or metal grid 1800 located below the upper surface 145 of the fluid and by forcing injected CO2 to pass through the grid. To help prevent bubbles from re-combining after passing through the grid 1800, the grid could be of greater thickness, thereby forcing the bubble pieces to completely separate from each other once they have entered the thickness of the grid.

Another way to increase agitation in the water, and thereby use the water as a force to churn the gas and break up bubbles, is to induce the formation of gyres. Gyres are like small whirlpools that can be created by forcing liquid or gas past a specially shaped obstruction. Such obstructions could be placed along the internal walls of the carbonation vessel.

Figure 19:
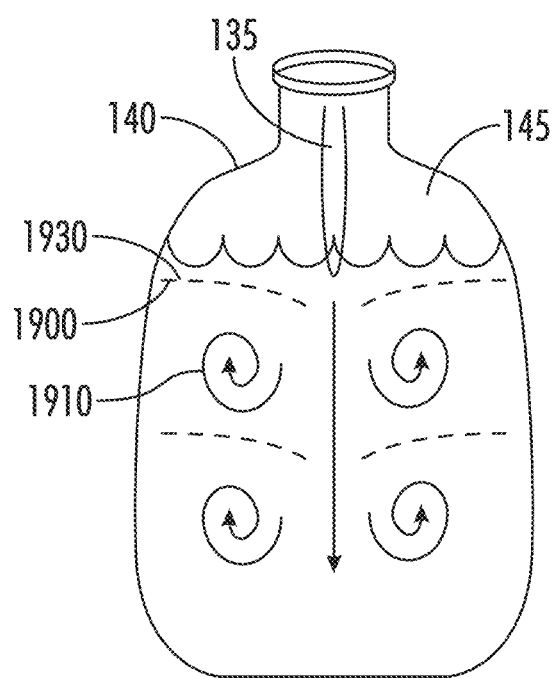
FIG. 19 shows an alternative embodiment of a carbonation vessel for use with the device of FIG. 1.
Figure 20A:
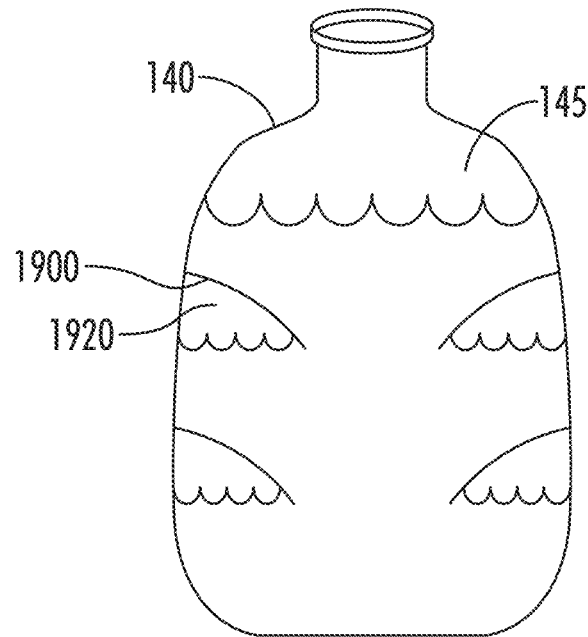

FIG. 19 shows an alternative embodiment of a carbonation vessel 140 including obstructions 1900 shaped to generate gyres 1910 for use with the device of FIG. 1. FIG. 20A shows an alternative embodiment of a carbonation vessel similar to that shown in FIG. 19 for use with the device 100 of FIG. 1. FIG. 20B shows another alternative embodiment incorporating a multitude of small overhangs 1900 in the middle of the carbonation vessel 140 in addition to the obstructions 1900 shown in FIG. 19. FIG. 20C shows a tree assembly 2000 that can be inserted into the carbonation vessel to increase the CO2 absorption rate.

As shown in FIG. 20B, by providing a multitude of obstructions 1900, CO2 dispensed by the gas injector may be retained in more places within the carbonation vessel 140, thereby resulting in more surface area defining contact between the CO2 and the fluid and for a longer period of time. FIG. 20B also shows an extended version of the gas injector 135 which results in the CO2 being sent directly to the bottom of the carbonation vessel 140. While the longer gas injector 135 may result in less contact between the CO2 and the fluid on its path to the bottom of the carbonation vessel 140, and it may further result in less agitation of the fluid, the extended gas injector provides structure at a central location within the carbonation vessel. This structure may be utilized as additional surface area for the implementation of obstructions 1900, with each obstruction takes the form of an annular flange fixed to the gas injector 135.

As shown, such obstructions 1900 could have a downward facing concavity as well, to capture and hold CO2 bubbles 1920 as shown in FIG. 20A, thereby allowing continued CO2 contact with the water even in the case of the carbonation reservoir's pressure relief valve being activated (thereby releasing any CO2 in the headspace, but not the CO2 trapped by the obstructions). Such obstructions, in addition to being concave, could have a mesh of fine holes 1930 (~1-2 mm diameter), as shown in FIG. 19, thereby also exposing the tops of any trapped bubbles to the water above the obstruction, while not having holes big enough to let the bubble actually pass through.

As shown in FIG. 20C, in addition to, or in place of the obstructions 1900 previously described, a tree assembly 2000 can be provided and inserted into a carbonation vessel 140. Such an assembly may be assembled about an exterior of a long gas injector 135, such as that shown in FIG. 20B. As shown, the tree assembly 2000 may comprise a plurality of obstructions 2010 for obstructing the return path of CO2 to an upper surface 145 of the fluid. As shown, each obstruction may branch into sub-obstructions 2020 for increasing the surface area of the obstructions, and thereby increasing the amount of contact between CO2 retained by the obstructions and the fluid itself. In such an embodiment, the internal surface, typically comprising an annular flange, branches out into multiple internal surfaces.

Another way to increase agitation in the water, and thereby use the water as a force to churn and break up bubbles, is to have the CO2 injection straw 135 be flexibly attached 2100 to the wall of the carbonation vessel 140 or some other fixation point, such that it is free to 'wiggle' to some extent. Subsequently, by either having a deliberately offset ejection hole at the tip of the injection straw 135, or by relying on the natural randomness of travel of the ejected CO2, the injection straw 135 would wiggle about violently during injection of CO2 into the water of the carbonation vessel 140. This violent wiggling would agitate the water, assisting mixing, while not requiring any sort of motor, as the movement would be driven by the power of the CO2 escaping the injection straw's tip. To further enhance mixing via this method, a paddle shape could be added to the injection straw, so that it would push around more water during each of its movements.

Instead of a flexible connection 2100 to the carbonation vessel's walls, a rotational connection could also be used, like a swivel, which would force the injection straw's 135 movement to be in a circular motion instead of the more random motion derived from a simpler flexible connection 2100. Instead of a simple hole at the tip of the injection straw, there could additionally be a reed-type attachment around the ejection hole, like the reed of a reed instrument. This reed-type structure would vibrate at a certain frequency when the CO2 is blown through it (like a musician playing a wind instrument). This vibration could further agitate the water at a more micro-scale than the large scale mixing caused by the straw's overall circular or wiggle movements. Finally, there could be multiple injection straws, perhaps one at the top, and one at the bottom of the carbonation reservoir, and a simultaneous, or alternating injection of CO2 between the two of them could further assist in mixing.

FIG. 21 shows a nozzle 135 for use in a carbonation module in the device of FIG. 1. As shown, the nozzle 135 extends below a fluid level 145 of the water, and is attached by a flexible connection 2100.

FIG. 22 shows an alternative embodiment of a carbonation vessel 140 for use with the device 100 of FIG. 1. As shown, another way to increase agitation in the water, and thereby use the water as a force to churn and break up bubbles, is to have jack-type objects 2200 within the carbonation chamber 140, which would be thrown about by the water when the water is mixed by the injected CO2. These randomly tumbling jacks 2200 could further assist the agitation of the water and mixing with CO2, in a similar way as tennis balls in a clothes drying machine. These jacks 2200 could have paddle shaped 'appendages' to facilitate their getting pushed about, and to facilitate their assistance with mixing the water and injected gas.

In some embodiments, a plurality of nozzles 135 may be provided in order to increase the amount of agitation during carbonation. For example, the nozzles may be positioned such that carbonating case, such as CO2, from each nozzle cross paths in order to create hyper-agitated zones at such interfaces and increasing the efficiency of carbonation.

A previously discussed issue with existing systems is that if a user places a carbonated bottle into the refrigerator, the manually screwed on cap of the bottle maintains an imperfect seal, thereby allowing CO2 to slowly leak out of the bottle. Additionally, anytime the bottle is uncapped for a drink, and then re-capped, CO2 that has left the water and is in the headspace of the bottle will escape into the atmosphere, thereby further reducing the pressure in the bottle, and reducing the amount of CO2 in the bottle, thereby further accelerating the de-carbonation process of any water left in the bottle, even if the bottle is refrigerated, re-agitated, or re-pressurized.

Several solutions are disclosed for addressing this issue. These solutions revolve around the general idea of capturing any CO2 that has separated from the water during the natural de-carbonation process, and trapping this separated CO2 in pockets of gas that are not exposed to leaky and occasionally-opened cap of the bottle (opened by the user when they get a drink). These CO2-trapping solutions would allow carbonated water dispensed into an uncapped bottle to 'hold onto' far more of its CO2 than an uncapped bottle without these CO2-trapping mechanisms, since the latter's CO2 could simply bubble out of the solution and into the atmosphere through the bottle's open top. Any CO2 trapped via the mechanisms described below could be subsequently re-mixed into the water to re-carbonate it to some degree if the water was first refrigerated (since colder water is able to be carbonated more easily by agitation that warm water).

Similar to the carbonation vessel 140 discussed above with respect to FIGS. 19 and 20A, one way of trapping this separating CO2 away from the cap of the bottle is to have downward facing obstructions, which may be concavities 1900 along the inner wall of the bottle. These concavities 1900 would trap any bubbles 1920 floating upward near the walls of the bottle. The bubbles would therefore be trapped in the concavity and would not have access to the cap area of the bottle. The concavities 1900 could have continuous surfaces, or could be meshed, as shown in FIG. 19, thereby exposing the tops of any bubbles trapped to the water above the concavity, thereby increasing surface are of contact, while not allowing the bubbles to travel all the way to the bottle's headspace where it would be subject to leakage out of the bottle. The concavities 1900 could also have additional micro-concavities along their bottom surface, thereby acting to keep bubbles of CO2 1920 separate from each other to increase surface area of contact between CO2 and the water.

Figure 23:
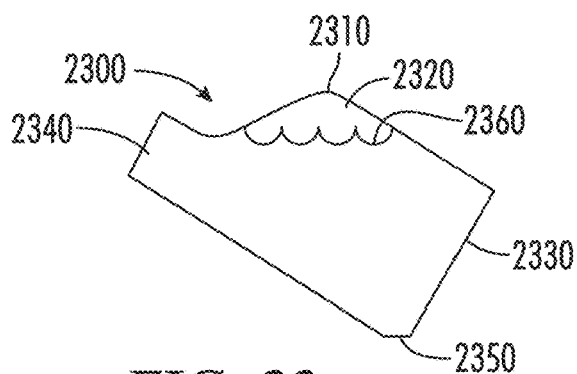
FIG. 23 shows a storage container for storing a carbonated beverage for use with the device of FIG. 1.

FIG. 23 shows a side profile of a storage container 2300 for storing a carbonated beverage for use with the device 100 of FIG. 1. As shown, as an alternative to the concavities 1900 attached to the inside wall of the bottle 140 as discussed above, the storage container 2300 shown has an overall bottle shape which would act in much the same way as discussed. For instance bottle could have one or more 'shoulders' 2310 structured to be concavities in and of themselves. These shoulders 2310 could act as CO2-trapping 2320 concavities either with the bottle in a 'normal' bottle stance (i.e. sitting on the bottle's flat bottom) 2330, or could act as CO2-trapping concavities only when the bottle is oriented at a certain angle, as shown. The latter would be preferable, as it would allow a shape of bottle which would not be hard to clean (i.e. no "u-turns" in its shape), but would still allow trapping of CO2 away from the bottle's cap 2340. Such a bottle may have a second bottle bottom 2350, or a stand provided for retaining the bottle at an angle for storage in which the bottle cap 2340 is submerged below a fluid surface level 2360.

Figure 24:
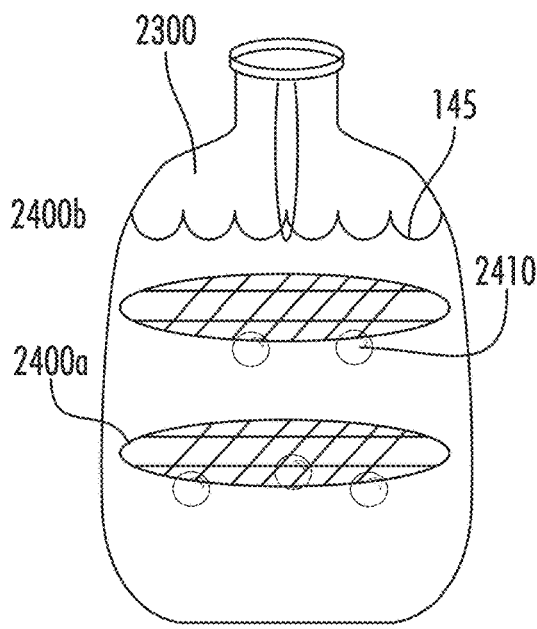
FIG. 24 shows an alternative embodiment of a storage container for storing a carbonated beverage for use with the device of FIG. 1.

FIG. 24 shows an alternative embodiment of a storage container 2300 for storing a carbonated beverage for use with the device 100 of FIG. 1. An alternative to concavities 1900 would be a fine mesh 2400 across the entire horizontal cross section of the bottle. This mesh 2400 would be submerged within the water column and below an upper surface of the fluid 145, and there could be multiple stacked meshes 2400*a, b,* for instance several centimeters apart.

Bubbles 2410 would get trapped in this mesh 2400 as they naturally rise after having separated from the water during the natural decarbonation process.

Figure 25:
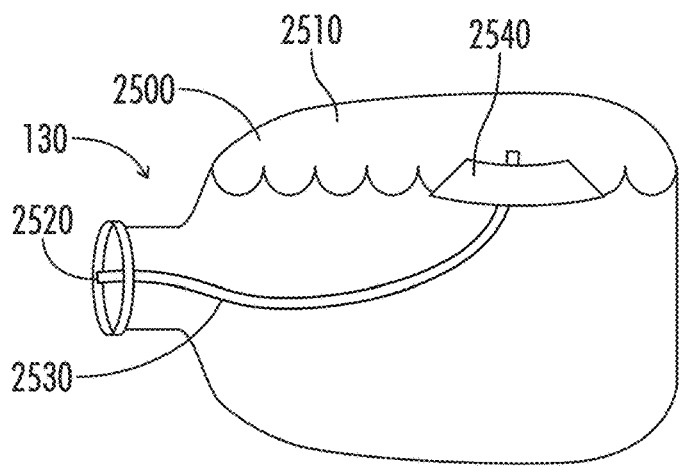
FIG. 25 shows a gas tank for use in the device of FIG. 1.

FIG. 25 shows a gas tank 130 for use in the device 100 of FIG. 1. Typical compressed CO2 tanks contain both liquid CO2 and gaseous CO2. If liquid CO2 is expelled from a compressed CO2 tank, it rapidly evaporates, creating higher localized pressures than would exist if only CO2 gas is expelled. This rapid localized region of high pressure can cause rupture in tubing meant to carry expelled CO2 from the tank to the desired location.

To avoid the potential of liquid CO2 escaping from the tank, most systems that use compressed CO2 require the CO2 tank to be oriented vertically, such that liquid CO2 cannot access the tank's output valve. In cases where a horizontal orientation of the tank is desired, anti-syphon tubes are typically used. These are bent 'dip tubes' which extend down from the CO2 tank's output valve, down into the CO2 tank, with an upward bend in the dip tube which is meant to ensure that only gaseous CO2 can travel into the anti-syphon tube and out the output valve. While anti-syphon tubes do work, they require careful installation to ensure proper orientation of the CO2 tank such that the internal anti-syphon tube's curve is pointing in the correct direction (upwards relative to the ground).

As shown the gas tank 130 may provide a tank housing 2500, a gas reservoir 2510, and a gas outlet 2520 for transmitting gas from the gas reservoir to, for example, the carbonation vessel 140. In order to provide a syphon directly to gas contents of the tank 130, a flexible, or freely rotatable anti-syphon tube 2530 having a first end at the gas outlet 2520 and extending into the gas reservoir 2510 is provided. A float 2540 is then provided for suspending the second end of the flexible tube 2520 inside the gas reservoir. This float would allow the tip of the flexible/freely rotatable anti-syphon tube to always be ensured to be held above the surface of the liquid CO2, regardless of rotational variations in the tank's horizontal orientation.

Figure 26A:
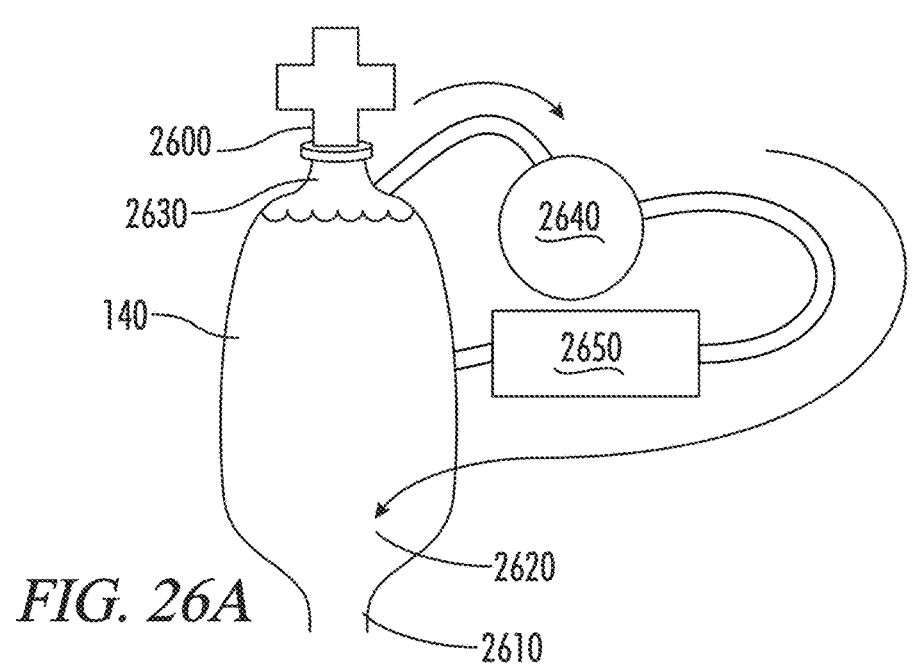
FIG. 26A shows a block diagram of a carbonation vessel and valve system for use in the device of FIG. 1.

FIG. 26A shows a block diagram of a carbonation module 210 including a carbonation vessel 140 and a valve system for use in the device 100 of FIG. 1.

As shown, the carbonation vessel 140 further comprises an inlet 2600 and an outlet 2610, where the outlet 2610 transmits carbonated fluid 2620 towards a system outlet. In such an embodiment, subsequent to the carbonation of the fluid 2620 in the carbonation vessel 140, the outlet 2610 is opened, and gas from the gas supply at the inlet 2600 displaces the fluid 2620 in the carbonation vessel.

Alternatively, or in combination, the gas used for ejecting the fluid may be waste gas, such as gas in a head section 2630 of the carbonation vessel 140. Accordingly, during carbonation, a valve 2640, such as a solenoid valve, may be used in combination with a pressure regulator 2650 to retain pressurized CO2, and may then be used to release the CO2 upon the opening of the outlet 2610.

With respect to the carbonation process itself, one method for carbonating water is commonly referred to as 'force carbonation.' In 'Force Carbonation' CO2 bubbles are initially bubbled into water in a pressure vessel via an 'aeration stone' at, for example, 80 PSI. As the bubbles rise up through the water column, some of their CO2 dissolves into the water, and remaining CO2 accumulates in the headspace (the gaseous region in the pressure vessel above the water level). The pressure vessel's pressure is maintained at the pressurizing pressure, in this case 80 PSI, letting the headspace CO2 passively and slowly diffuse down into the water below.

Traditional 'Force Carbonation' takes time. One factor that limits the speed of this passive dissolving process is the amount of surface area of the CO2-water interface. To increase this surface area, and thereby increase the speed of this passive carbonation, we propose to increase the surface area of the CO2-water interface. One way in which this can be achieved is by trapping the rising CO2 bubbles underwater, before they reach the headspace, when they are initially injected into the water (via the aeration stone, or by other means). To do this, a multitude of small overhangs could be positioned all along the inner wall of the carbonation chamber, as shown in FIGS. 17-20A, and possibly positioned to be in the midst of the chamber as well (e.g. attached to a tree-shaped object inserted into the pressure vessel), as shown in FIGS. 20B-C. These overhangs would each trap tiny CO2 bubbles as they rise back up (due to their buoyancy) after the initial injection of CO2.

Further, there are several ways to carbonate water, all utilizing some combination of temperature, pressure, time, and mixing or agitation. Two of these methods include 'Force Carbonation,' described above, which is slow, and an agitation based method, which is more rapid. While the agitation method is rapid, it is not efficient in its use of CO2 when creating highly carbonated water. This is because, in order to increase the amount of agitation and mixing, which is achieved by injecting CO2 at a high velocity, it must occasionally release CO2 into the atmosphere to decrease the pressure inside the pressure vessel, to allow more CO2 to be injected which further agitates the CO2/water mixture.

Figure 26B:
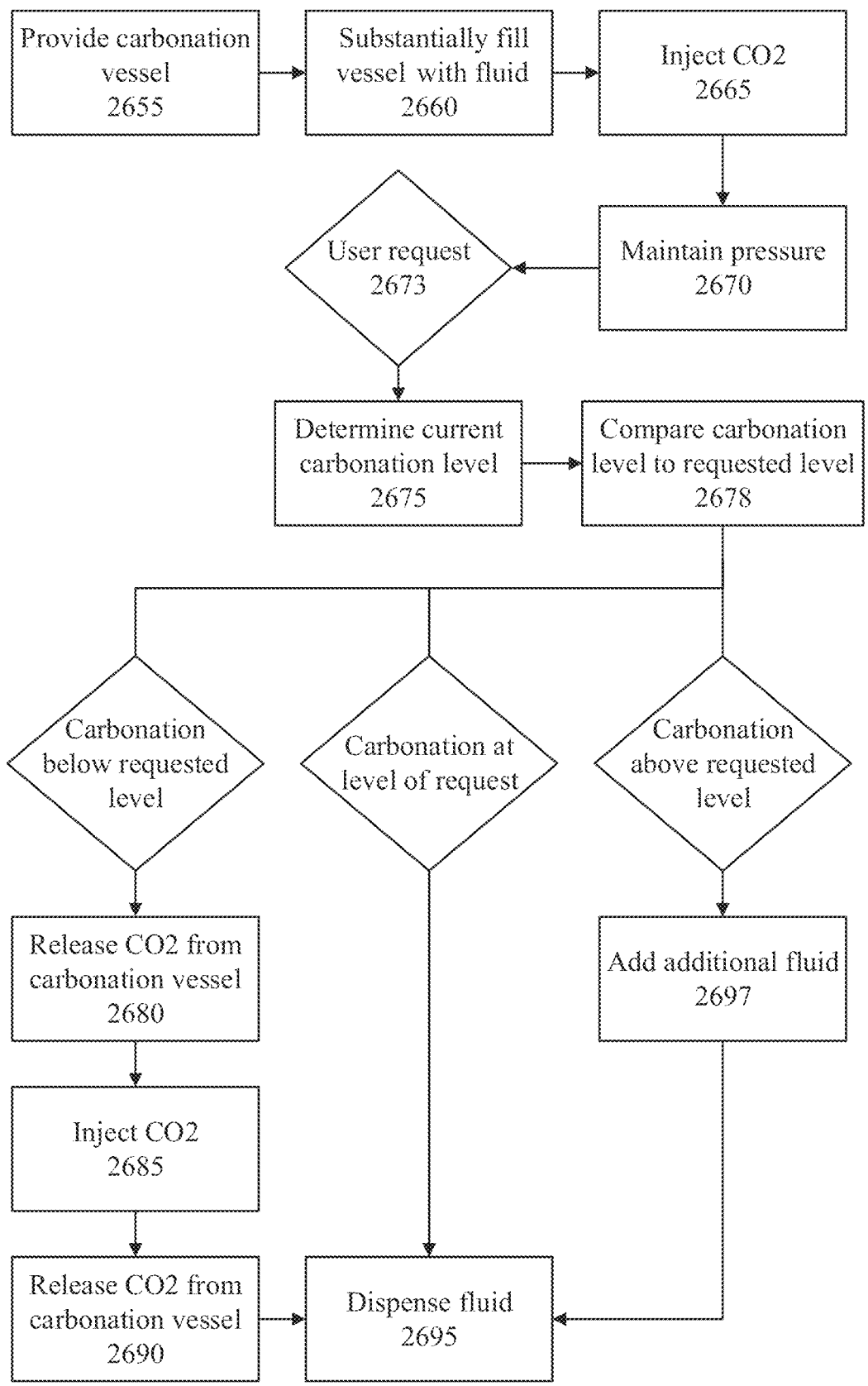
FIG. 26B shows a flowchart illustrating a method for carbonating fluid.

FIG. 26B shows a hybrid carbonation methodology that may combine the forced carbonation process with the agitation method. This hybrid method makes uses of the agitation method's ability to efficiently achieve medium carbonation levels, and then makes use of force carbonation method's ability to passively continue the carbonation process over time. The following is an example scenario of this hybrid system utilized in a device 100 according to the present disclosure.

Initially, a carbonation vessel is provided (2655) and substantially filled with fluid to be carbonated (2660), such as water. When the vessel is substantially filled, it may be filled to a fill line, such that a known amount of head space remains in the vessel, and so that carbonation can provide consistent results. The gas injector 135 initially injects at least one dispensation of the carbonating fluid (2665), such as three blasts of CO2, into the water to force agitation and quickly achieve medium carbonation levels. However, the CO2 is not released, and the carbonation container is instead maintained at a high pressure (2670), such as 150 or 170 PSI.

As the CO2 is not released, force carbonation may then proceed, including the leveraging of the internal structures shown in FIGS. 17-20C. Accordingly, carbonation proceeds over time to bring the water to 'max carbonation'.

If a user requests a carbonated beverage (2673), the device 100 may then determine the current carbonation level of the fluid in the carbonation vessel (2675) and compares it to a carbonation level for the request (2678). The carbonation level for the request may be selected by the user, or it may be a default for the device. If the user requests water that is carbonated at a higher level than that already in the vessel, such as if the water is requested before the force carbonation completes, the device 100 can then release pressure by releasing CO2 from the carbonation vessel (2680) and quickly carbonate the fluid in the container by resuming the agitation based carbonation process and injecting CO2 (2685). Such additional "wasteful" injections and expellations of CO2 can quickly bring the carbonation up to max levels.

After the water has been carbonated to the requested level, the device 100 may release CO2 from the carbonation vessel (2690) so that the water is not dispensed at high pressure, and then dispense the fluid to the user (2695).

In some embodiments, a user may specify a level of carbonation requested in a particular beverage. In such a scenario, if, during the wait time a user demands medium or slightly carbonated water, the device 100 can calculate how much of the wait time has passed, and respectively, how much plain water might need to be mixed with the carbonated water to achieve a desired carbonation level and then add such additional fluid (2697) prior to dispensing (2695). If, however, no user demands highly carbonated water during the waiting time, the machine will complete its carbonation process by way of force carbonation. Further, if the requested carbonation level is equal to the current carbonation level, the device may simply dispense the fluid 2695 to the user.

One novel aspect of the device 100 is the 'endless vessel' feature, which simulates the existence of a constantly filled vessel with seemingly endless capacity. To create this experience, a system must be able to A) detect when a vessel is empty, or partially depleted, and/or B) be able to uniquely identify each vessel with respect to the beverage that was previously in it, or detect and/or indicate the current contents of the vessel, such that the system will be able to automatically refill that vessel (or, in some cases, as described below, a second vessel) with the same beverage was previously present in it. The former ('A') can be achieved by placing a liquid level sensor (LLS) on a vessel. This vessel could be manufactured with an integrated LLS, or an LLS could be sold as a unit that could be attached by the user to their own existing vessel.

Off-the-shelf LLS already exist in many forms, including 'float switches', optical systems, and conductivity based systems. While these sensors could theoretically be used in an 'endless vessel' system, we here propose several novel methods for liquid level sensing which have advantages over existing off the shelf sensors.

The latter ('B') can be achieved by any sort of identifier coupled to the vessel. This could be an RFID, a bar code, a unique color or shape, etc. Further, the use of an identifier to track the most recent beverage used to fill any beverage vessel may be implemented regardless of whether it is used as part of an endless vessel system. Accordingly, a user may have a glass or bottle having an incorporated RFID tag identifying a previous vessel. When the user refills the vessel at the device 100, the device may automatically fill the vessel with the specific beverage identified by the RFID tag.

One embodiment of such an 'endless vessel' system may include the coupling of an RFID chip to a vessel. By being coupled to the vessel, the RFID could, in some cases, be usable as both an LLS (as further described below), and also as an identifying tag that the beverage dispensing machine could use to know precisely what beverage it should refill the vessel with (e.g. the same beverage that it has previously filled the vessel with). The RFID chip would be able to transmit its unique ID to the beverage dispensing device 1) whenever the RFID was within close enough proximity to its RFID reader, and 2) whenever the RFID does not have its signal obstructed, either intentionally or unintentionally by signal blocking substances, such as metal and water.

Figure 27A:
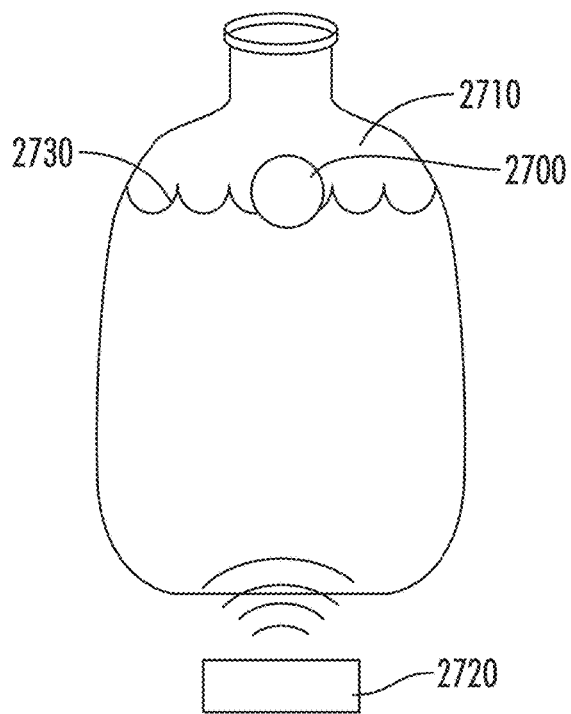
FIGS. 27A and 27B show a fluid level detector in use in a beverage vessel in two states.
Figure 27B:
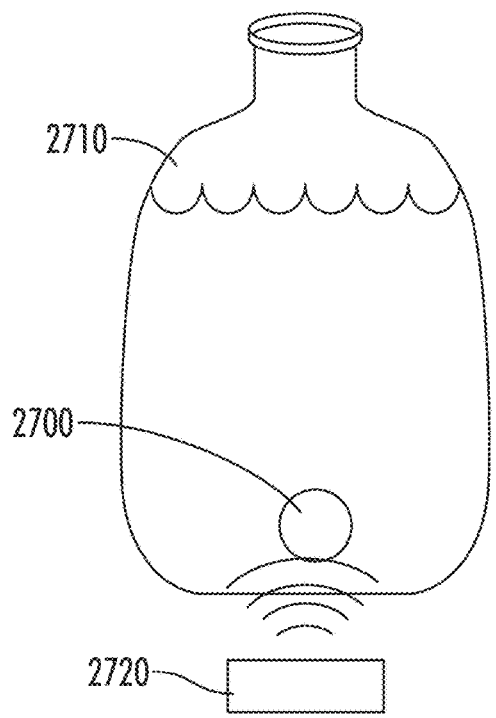

FIGS. 27A and 27B show one embodiment of a fluid level detector 2700 in use in a beverage vessel 2710 in two states.

The fluid level detector 2700 may be used in conjunction with a processor and sensor 2720, also referred to herein as a receiver antenna, depending on the wireless technology relied on, incorporated into the device 100. The device may then have a fluid dispenser which then dispenses fluid into either the vessel 2710 detected to be empty or a different vessel upon determination by the processor that the vessel 2710 is empty or depleted below a certain level.

As shown, the fluid level detector 2700 may be in a floating object, such as an RFID chip embedded within a waterproof object, such as a plastic sphere dropped into the vessel, and may therefore float at a fluid level 2730 in the vessel 2710. In such an embodiment, the fluid level detector 2700 may function by leveraging certain constraints inherent in RFID's ability to transmit data. To transmit data, a typical RFID chip must be provided with power, which may be by way of wirelessly transmitted electromagnetic power source. The RFID chip must then wirelessly transmit data back to a receiver antenna 2720, typically located near the power source.

RFID data transmission ranges are limited by many factors including the size and orientation of antennas, the amount of electrical voltage and current being used, etc. In addition, certain materials, such as metal or water, if located between the RFID and its power source or receiving antenna, can block or attenuate the transmission of data from the RFID and/or the transmission of power to the RFID. By making use of these concepts, one could have an RFID inside of a floating object 2700 (Such as a plastic sphere) inside of the vessel 2710. If the vessel has beverage in it, the floating RFID's 2700 ability to transmit data would be attenuated relative to the amount of beverage between it and its respective data receiving antenna. Accordingly, if the receiving antenna 2720 was located on a flat surface upon which the vessel is placed, the attenuation of data transmission between the RFID 2700 and the receiving antenna 2720 would decrease in a predictable way as the beverage in the vessel is reduced (e.g. consumed by the user), since the floating RFID would have less and less beverage between itself and the receiving antenna.

In such an embodiment, the fluid level detector 2700 may transmit a constant signal, so long as it is powered, or a passive detector may be passively accessible by a sensor unit 2720. Because of the attenuation of any wireless signal due to the fluid in the vessel 2710, such a signal may only be retrieved upon depletion of liquid in the vessel. Accordingly, upon receipt of such a signal, the device 100 confirms depletion of the fluid in the vessel 2710.

In some embodiments, the level of attenuation itself may provide information to the device 100 about the liquid level in the vessel 2710. Accordingly, a partially depleted beverage vessel 2710 will partially attenuate a wireless signal, while a fully depleted vessel will attenuate the wireless signal less, if at all.

Where the detector 2700 takes the form of a floating object, the floating object in which the RFID is encased could be of any shape, including special shapes that would help prevent the object from being able to float out of the vessel's neck while the vessel is tilted (i.e. to prevent it from flowing into a user's mouth as they drink from the vessel).

Figure 28A:
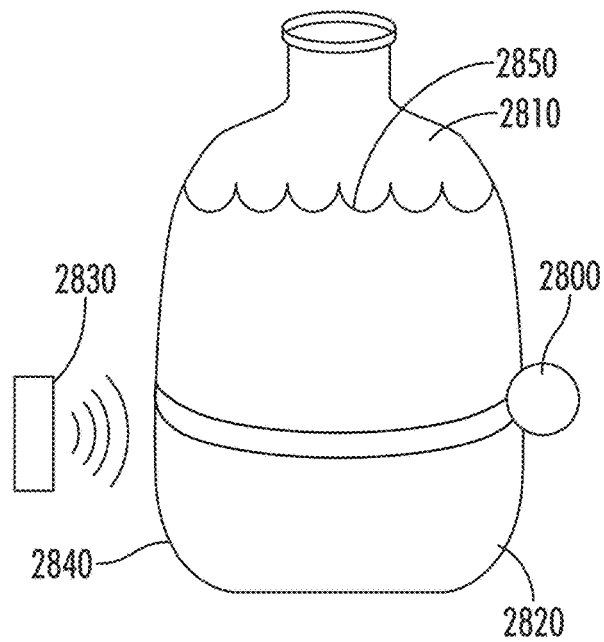
FIGS. 28A and 28B show an alternative embodiment of a fluid level detector in use in a beverage vessel in two states.
Figure 28B:
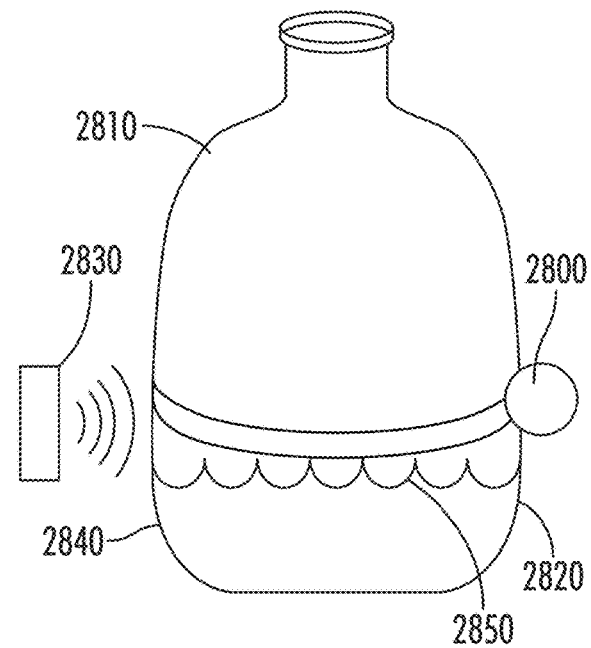

FIGS. 28A and 28B show an alternative embodiment of a fluid level detector 2800 in use in a beverage vessel 2810 in two states.

As shown, an RFID chip 2800 could be coupled to the vessel 2810 by strapping 2820 the RFID to the vessel (e.g. with an elastic or Velcro strap, or with an adjustable belt-like clasp), or by sticking the RFID to the vessel with adhesive.

In such an embodiment, the fluid level detector 2800 is at an outer surface on a first side 2820 of the vessel 2810, and the sensor, or receiving antenna 2830, is located adjacent a second side 2840 of the vessel 2810.

Accordingly, the fluid level detector 2800 is fixed to the vessel 2810 at a certain height, and a signal from the detector 2800 to the receiving antenna 2830 will be blocked or attenuated by fluid in the vessel 2810 until the fluid level 2850 is below the level of the detector 2800.

Figure 29A:
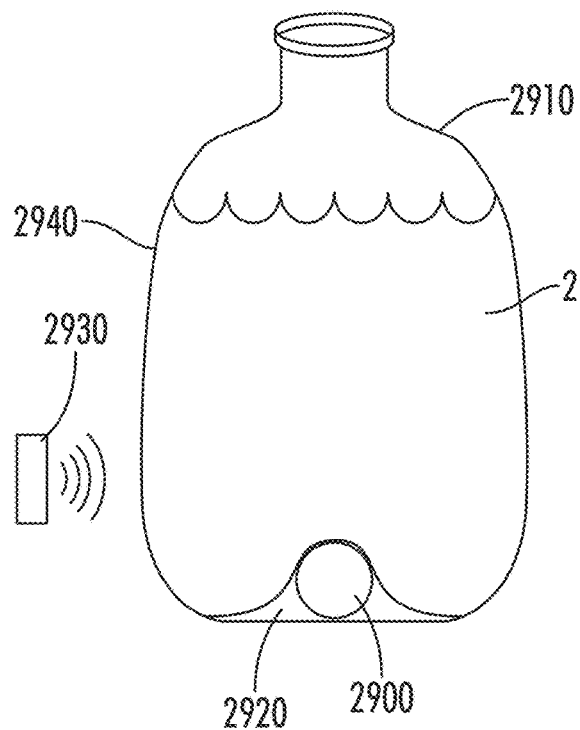
FIGS. 29A and 29B show an alternative embodiment of a fluid level detector in use in a beverage vessel in two states.
Figure 29B:
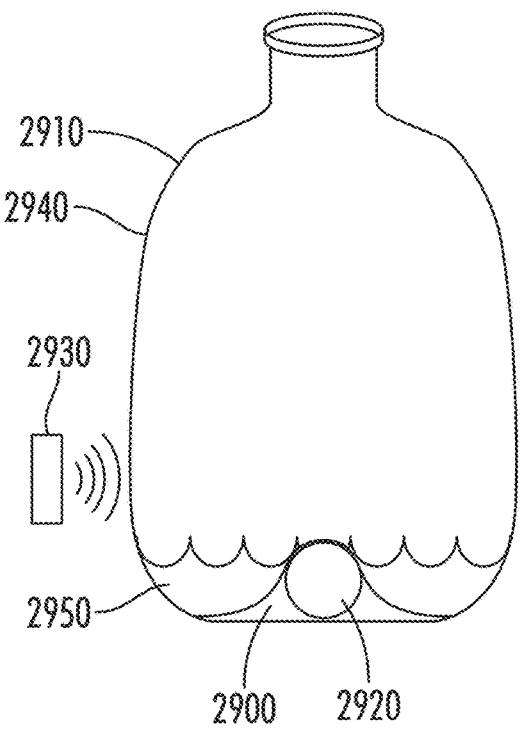

FIGS. 29A and 29B show an alternative embodiment of a fluid level detector 2900 in use in a beverage vessel 2910 in two states. In the embodiment shown, the fluid level detector 2900 is embedded in a base 2920 of the beverage vessel 2910. In such an embodiment, an antenna 2930 for retrieving a signal from the fluid level detector 2900 is mounted adjacent an outside wall 2940 of the vessel 2910. Accordingly, when the vessel 2910 is full, the fluid level detector 2900 will be fully covered, and the space between the detector and the antenna 2930 will be obstructed by the beverage 2950. Accordingly, when the beverage is depleted, a signal from the detector 2900 can be retrieved by the antenna 2930.

Figure 30A:
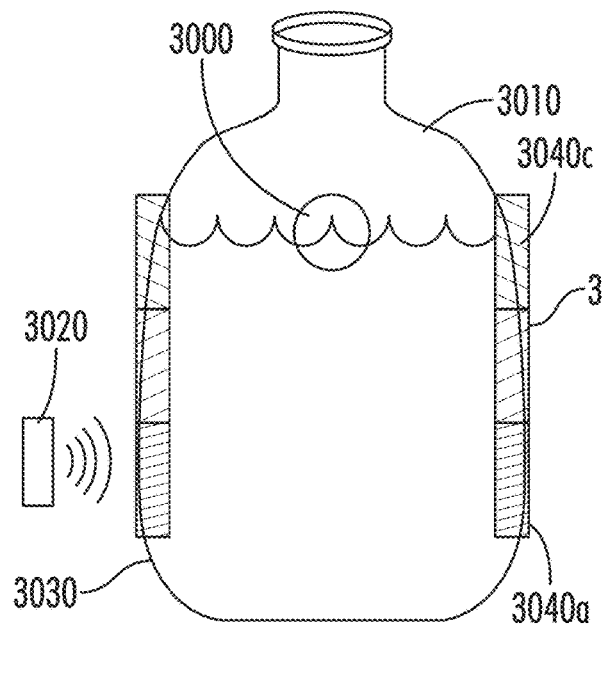
FIGS. 30A and 30B show an alternative embodiment of a fluid level detector in use in a beverage vessel in two states.
Figure 30B:
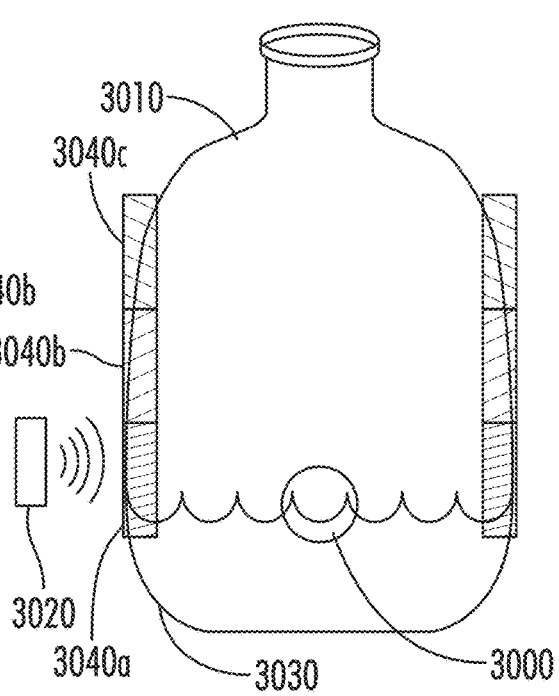

FIGS. 30A and 30B show an alternative embodiment of a fluid level detector 3000 in use in a beverage vessel 3010 in two states. As shown, an RFID chip may be embedded in a floating object, as in the embodiment of FIG. 27A, B. In the embodiment shown here, however, an antenna 3020 may be provided adjacent a wall 3030 of the vessel 3010 such that the signal is communicated between the detector 3000 and the antenna through the wall.

In such an embodiment, the walls of the vessel may be made of a combination of substances 3040a, b, c, some of which attenuate data transmissions more than others, and some less, thereby 'programming' into the vessel 3010 a predictable change signal attenuation as the floating RFID passes into different zones of the bottle which are constructed of different materials.

Accordingly, the vessel 3010 may have a lower portion of the wall 3030 made of a first material 3040a and an upper portion made of a second material 3040b, and the second material attenuates a radio transmission more than the first material.

FIGS. 31A and 31B show an alternative embodiment of a fluid level detector 3100 in use in a beverage vessel 3110 in two states.

As shown, in addition to the floating object 3100 containing an RFID chip, the floating object, could also serve as an LLS itself by activating a switch when it reaches the bottom of the vessel 3110. This could be achieved by having two bare leads 3120a, b at the bottom of the vessel, which the object 3100 would bridge when it falls down far enough in the vessel. Alternatively, a transmitter embedded within the object could obtain the power needed to transmit a signal when it touches power leads at the bottom of the vessel.

Additional implementations for the "endless vessel" concept are contemplated as well. For example, instead of relying on electronic detection of the need for a refill of a beverage, the 'endless vessel' could also be implemented by relying on the user to place the vessel into a vessel refill station only when they desire it to be refilled. This system would thereby not require a LLS, and would instead only require vessels to have an identifying mechanism, such that the refilling machine could know what type of beverage was previously added to the vessel, and refill the vessel with the respective beverage. This identifying mechanism could be coupled to the vessel by various means including by embedding the identifying mechanism into the vessel during manufacturing, or adhered to the vessel by the user by use of adhesive, or a strap, etc. The identifying mechanism itself could be an RFID, a bar code, a unique color or shape, or any number of other existing mechanisms.

Further, while RFIDs do not require an on-board power supply, an LLS system with a powered data transmitter could be used as an alternative to RFIDs. Such a transmitter would require an on-board electrical power supply to function. This power could be supplied by a battery or capacitor connected to the LLS, and this attached battery/capacitor could be recharged whenever the vessel is placed into a refilling system with its own power supply (either a battery, wall outlet, solar power, hydroelectric power, etc. as described elsewhere in this application). This recharging could be achieved via a contact electrode, via wireless charging using coiled wire, or even via laser transmission (With a solar panel being on the vessel), etc. During this recharging process any vessel usage data recorded by sensors on the vessel could also be transmitted to the refilling system.

Some embodiments may implement methods and systems for refilling vessels with a correct amount of the beverage. The refilling system could either refill the same bottle that has been detected to be depleted of beverage, or the refilling system could instead fill a separate, empty bottle with the same beverage that was detected to have been depleted in the user's in-use bottle. In the former case, the refill station could refill the vessel when it detects that the depleted vessel has been placed underneath the beverage spout. In the latter case, the refill station could refill a new vessel whenever both A) the in-use vessel is within data-transmission range of the refill station (i.e. when it's able to tell the refill station that it's depleted) and B) the in-use vessel has been depleted beyond some set threshold.

In embodiments where the system fills a second bottle upon the depletion of the first bottle, alternative methods for telling the device that the first bottle is depleted are contemplated. For example, a user may manually transmit information to the system using, for example, an app associated with the system. Alternatively, a transmission base may be provided for the first bottle separate from the second bottle in convenient locations. For example, a sensor and transmission base designed to function with any of the embodiments of FIGS. 27-31 may be provided for placing on a dining room table or in a user's refrigerator. Accordingly, when a depleted bottle is returned to its base on the dining room table, or is returned to the refrigerator, a second bottle is automatically filled for retrieval by the user.

In the case of either filling a brand new vessel, or refilling a completely empty vessel, the refill station could refill the vessel with the same amount of liquid that was previously recorded to have been put into it, and in the case of refilling a partially depleted vessel, the refill station would add only enough beverage to top-off the vessel without overflowing it. This 'topping off' could be achieved by combining A) the use of a weight scale, B) knowing the weight and max beverage carrying capacity of the vessel being filled, C) subtracting the known weight of the vessel from the scale-measured weight to calculate the current weight (and thereby the volume) of the liquid remaining in the vessel, and finally D) adding enough beverage to top off the vessel.

FIG. 32 is a flowchart showing a method for delivering fluid to a vessel. This method may be implemented using the device 100 described and the vessels and sensors discussed with respect to, for example. FIGS. 27A, B. As shown, a first vessel 2710 is provided with a fluid level detector 2700, such as a floating ball containing an RFID tag (3200).

The device 100 then monitors the first vessel (3210) to determine whether it is depleted. The device 100 then checks, using a processor and the fluid level detector 2700 whether the fluid level in the first vessel is depleted by first attempting to retrieve a signal (3220) from the fluid level detector 2700 at a sensor 2720. Such an attempt may be, for example, by attempting to transmit power to an RFID chip and retrieving a response, or by detecting a signal from an active transmitter.

If no signal is retrieved, then the first vessel 2710 is determined not to be depleted. If a signal is retrieved, it is compared (3230) to an expected signal. The expected signal may represent, for example, a completely empty vessel.

Accordingly, if the retrieved signal perfectly matches the expected signal, the vessel 2710 is determined to be empty. If the signal is attenuated relative to an expected signal, the device 100 determines if the signal is above a threshold level of strength (3240). Such a threshold may represent a specific level of depletion.

If the beverage in the vessel is not depleted beyond the threshold amount, and no signal is detected or a detected signal is below a threshold strength, the method continues to monitor the vessel (at 3210).

Upon detecting that the vessel is fully depleted (at 3230) or depleted beyond a threshold amount (at 3240), the device 100 identifies the specific contents of the vessel prior to depletion (3250). This may be by, for example, checking the contents of the signal retrieved or by evaluating a different indication from the vessel 3210 or a user. The device 100 then dispenses a fluid corresponding to the identified contents at a fluid dispenser (3260) into either the first vessel 2710 or a second vessel.

Figure 33A:
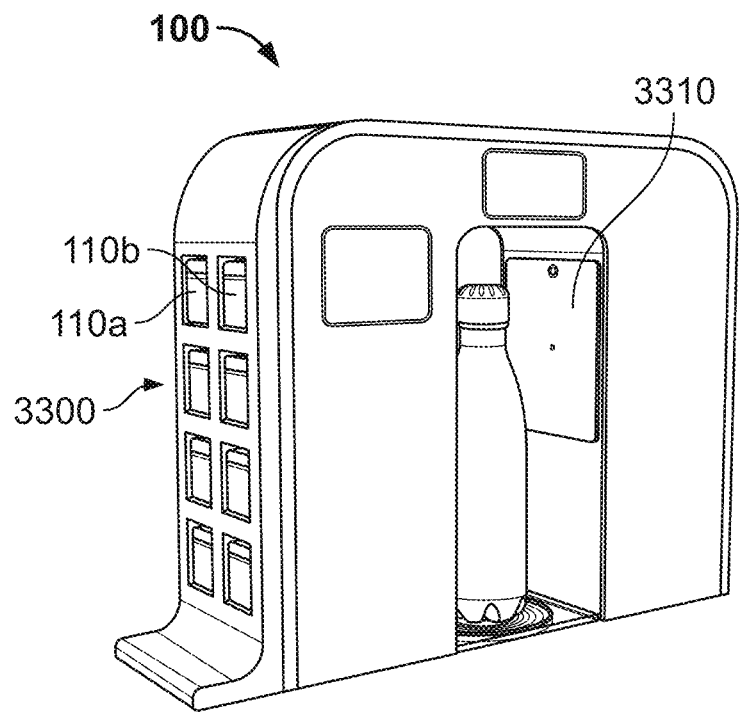
FIG. 33A is a perspective view of an alternative embodiment of a custom beverage creation device including a storage module for additive cartridges.

FIG. 33A is a perspective view of an alternative embodiment of a custom beverage creation device 100 including a storage module 3300 for additive cartridges 110. Typically, the cartridges 110a, b desired for use at any given time may be taken from the storage module 3300 and placed in a docking location (not shown) for use in creating beverages.

Figure 33B:
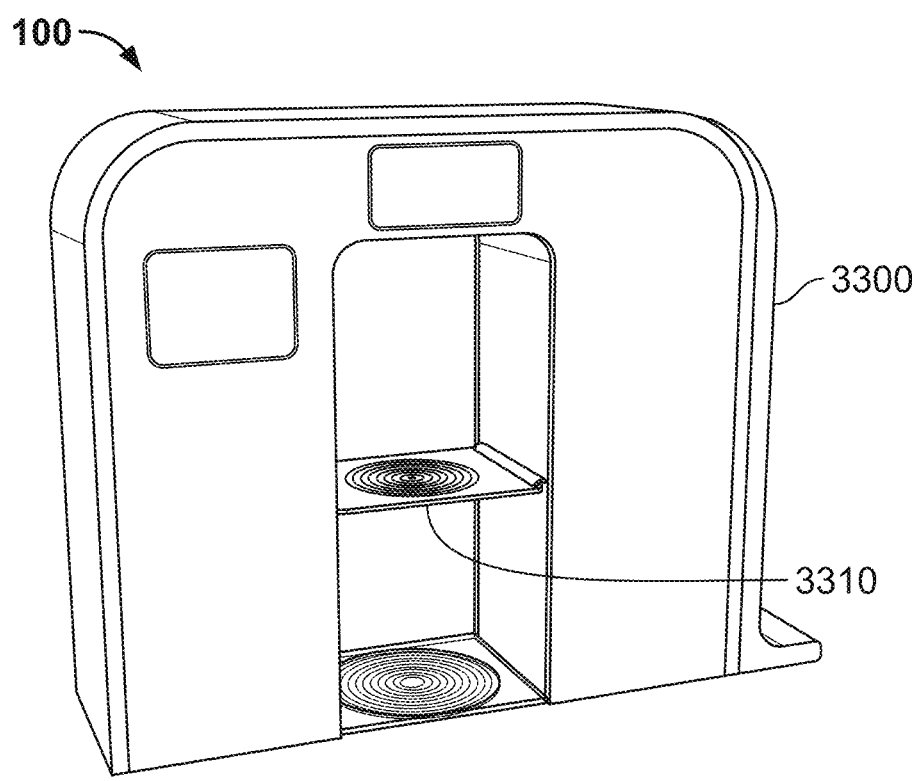
FIG. 33B is another perspective view of the custom beverage creation device of FIG. 33A including a shelf for shorter beverage vessels.

FIG. 33B is another perspective view of the custom beverage creation device of FIG. 33A including a shelf 3310 for shorter beverage vessels. The shelf 3310 is shown folded into a wall in the device 100 in FIG. 33A.

Figure 34A:
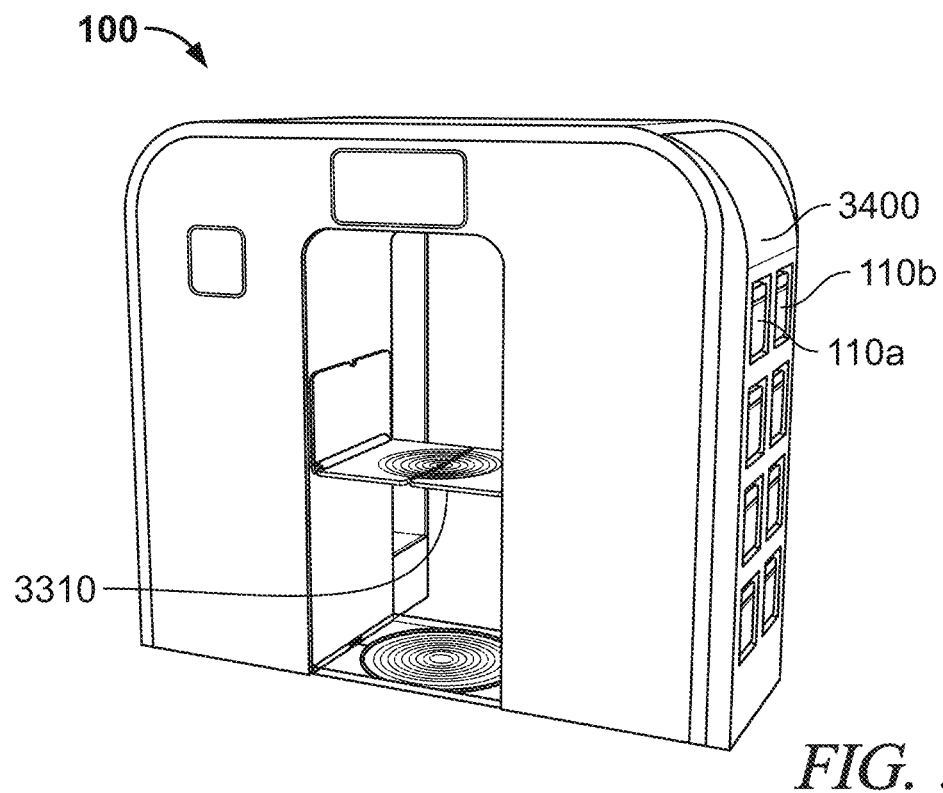
FIG. 34A is a perspective view of an alternative embodiment of a custom beverage creation device including a different storage module for additive cartridges.

FIG. 34A is a perspective view of an alternative embodiment of a custom beverage creation device including a different storage module 3400 for additive cartridges 110a, b. While several designs for such a storage module are shown, including the one shown here, as well as in FIGS. 33A, 34B, 34D, 35B, and 36, additional configurations are contemplated as well. Further the module may be installed on either the left or right side, or both sides, of the device 100. Further, as shown schematically in FIG. 36, a standalone storage module 3600 may be provided, and such modules may be used to implement active features for tracking multiple cartridges 110a, b.

Figure 34B:
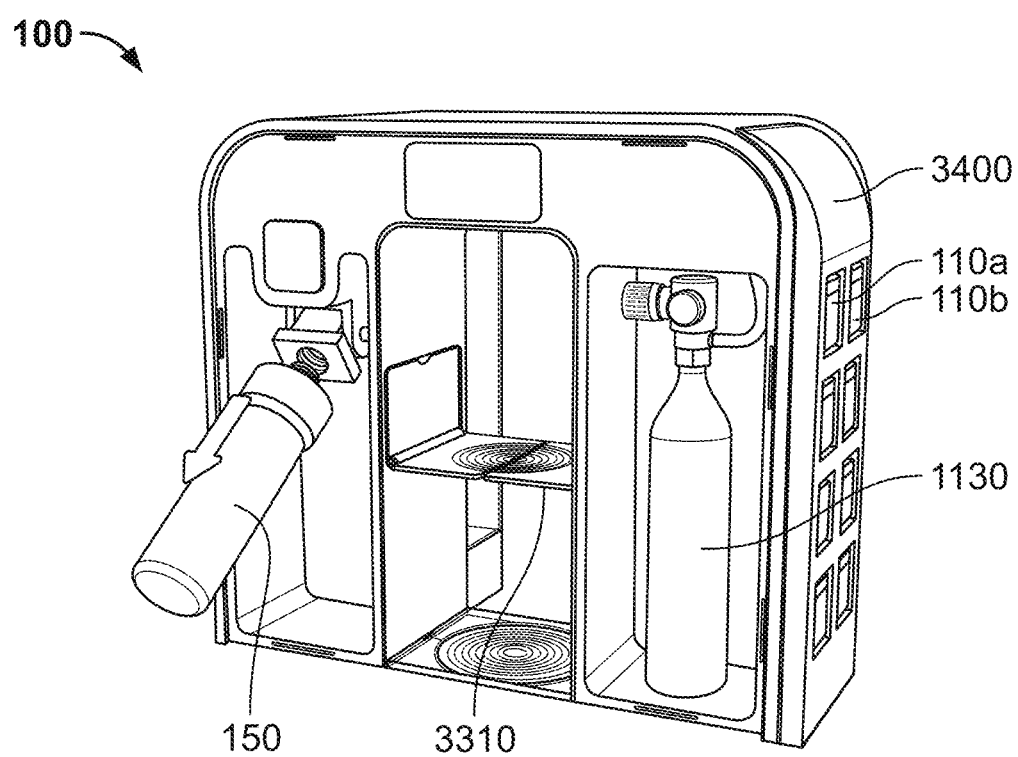
FIG. 34B is a perspective view of the custom beverage creation device of FIG. 34A showing a removable front panel removed.

FIG. 34B is a perspective view of the custom beverage creation device of FIG. 34A showing a removable front panel removed. As shown, the device includes a CO2 canister 130 and a filter 150, and the filter is removable by rotating out of the device.

Figure 34C:
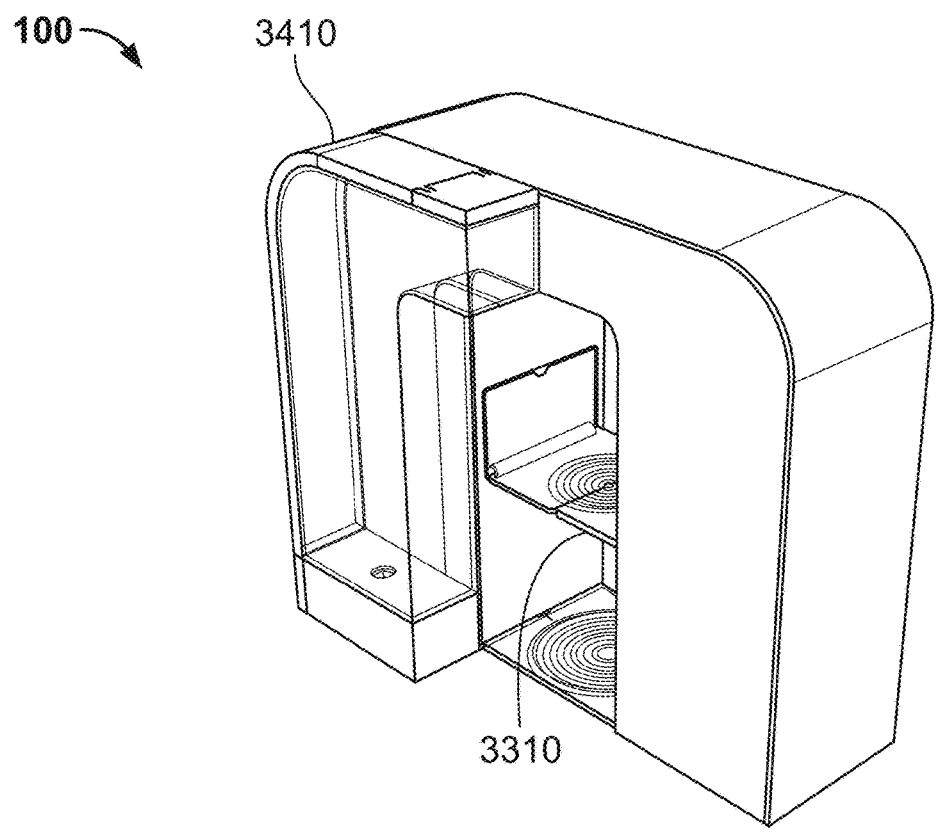
FIG. 34C is a back perspective view of the custom beverage creation device of FIG. 34A including a water tank for water storage.
Figure 34D:
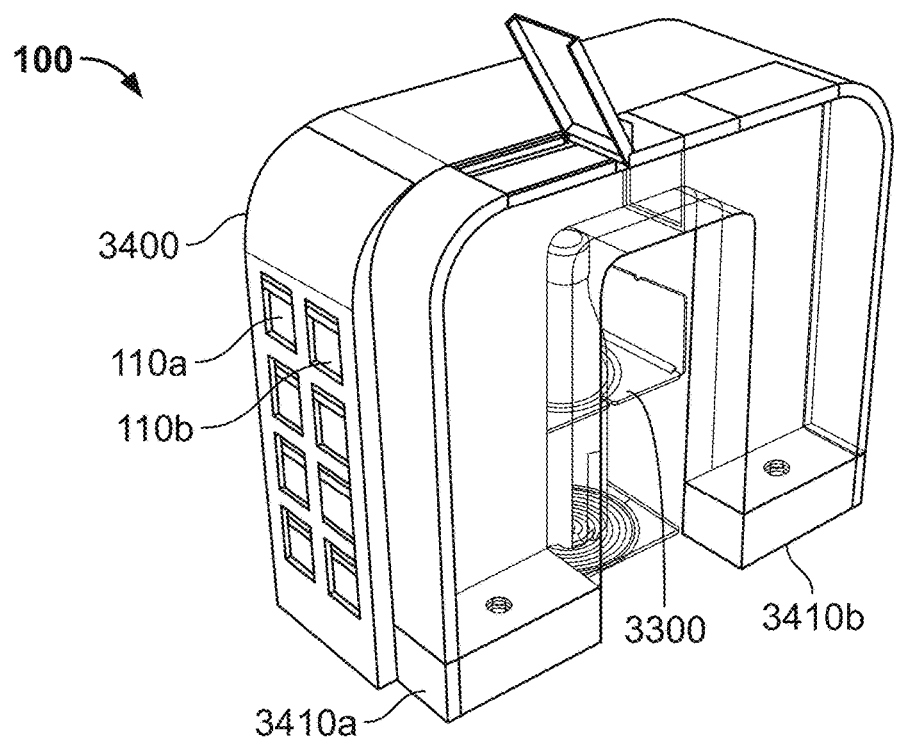
FIG. 34D is a back perspective view of the custom beverage creation device of FIG. 34A including two water tanks for water storage.

FIG. 34C is a back perspective view of the custom beverage creation device of FIG. 34A including a water tank 3410 for water storage. FIG. 34D is a back perspective view of the custom beverage creation device 110 of FIG. 34A including two water tanks 3410a, b for water storage. Such tanks 3410 can replace the water source discussed elsewhere in this disclosure, and can be provided in various sizes depending on the expected traffic for the particular installation. As shown the water tanks 3410 may be modular, such that one, two, or more tanks can be provided. In some embodiments, tanks can be stacked behind each other and linked together to provide additional storage.

Figure 35A:
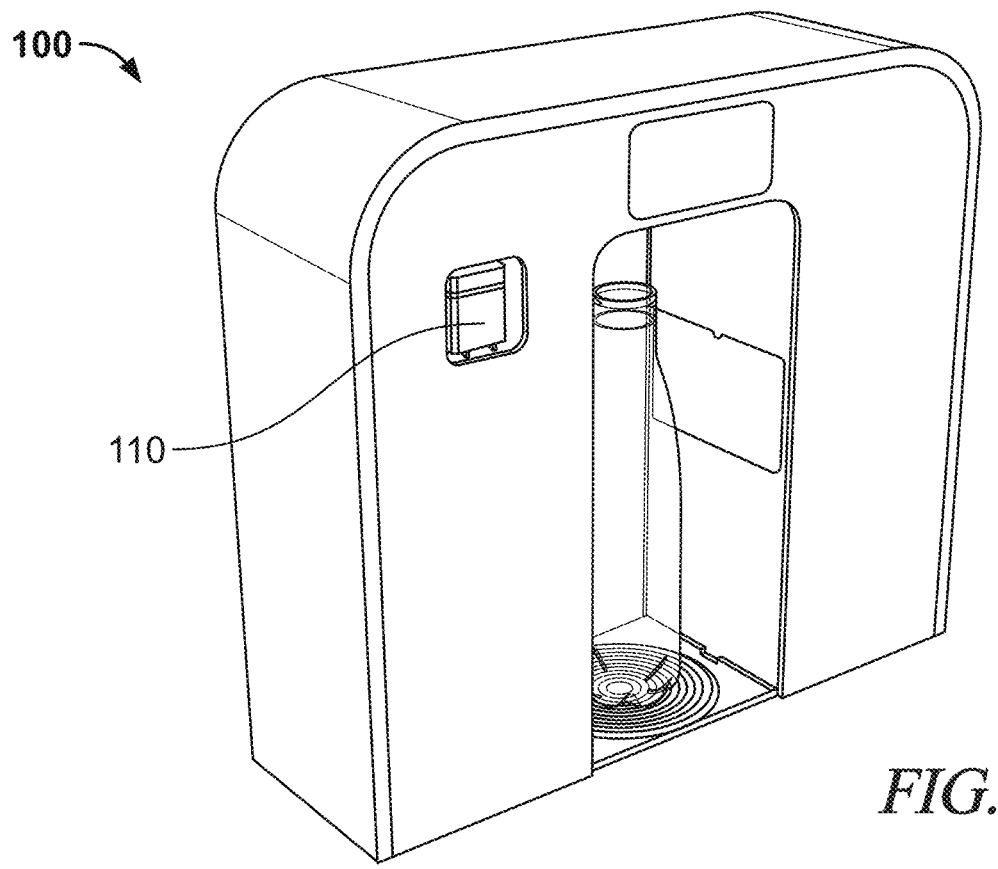
FIG. 35A is a perspective view of an alternative embodiment of a custom beverage creation device showing an additive cartridge installed.
Figure 35B:
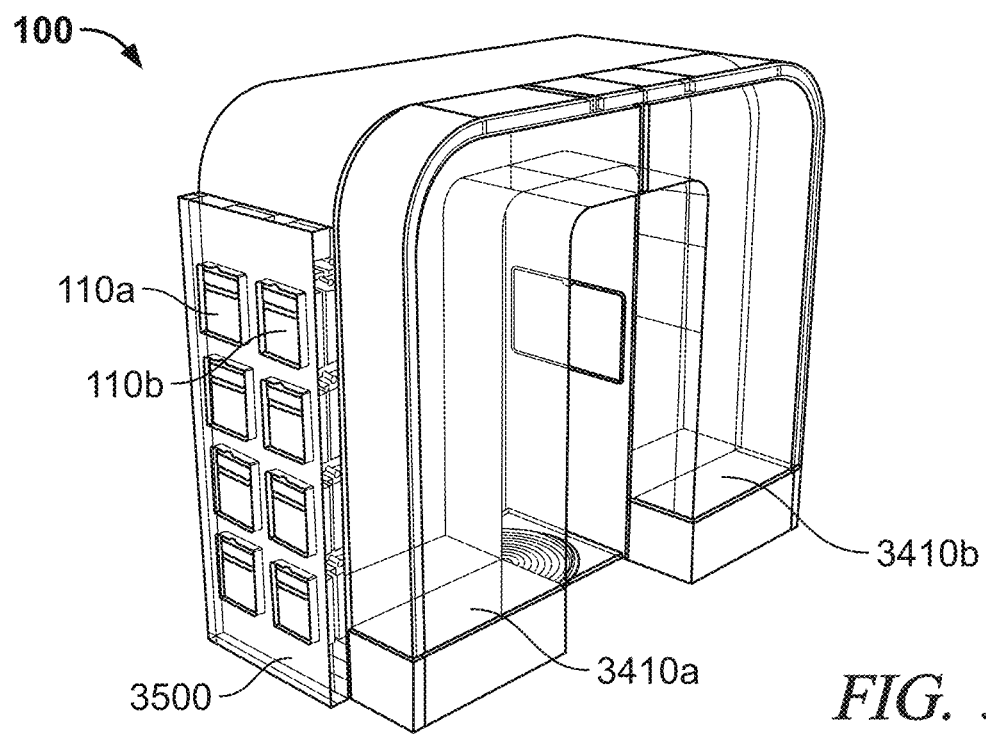
FIG. 35B is a back perspective view of the custom beverage creation device of FIG. 35A including optional storage modules for additive cartridges and water tanks for water storage.

FIG. 35A is a perspective view of an alternative embodiment of a custom beverage creation device 100 showing an additive 110 cartridge installed. FIG. 35B is a back perspective view of the custom beverage creation device of FIG. 35A including optional storage modules 3500 for additive cartridges 110a, b and water tanks 3410a, b for water storage.

Figure 36:
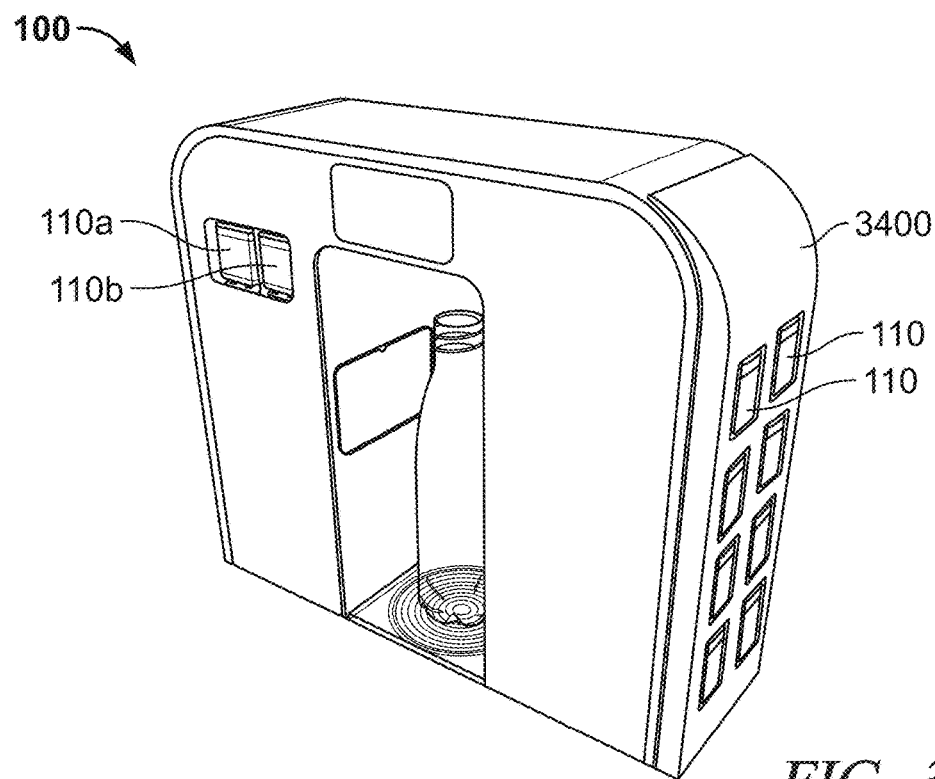
FIG. 36 is a perspective view of an alternative embodiment of a custom beverage creation device showing multiple additive cartridges installed and including a storage module for additional additive cartridges.

FIG. 36 is a perspective view of an alternative embodiment of a custom beverage creation device 100 showing multiple additive cartridges 110a, b installed and including a storage module 3400 for additional additive cartridges 110.

As further shown in FIGS. 33A-36, embodiments of the device 100 provided may include a designated location for a beverage vessel, shown as a circle, or concentric circles, in a base of the device. Typically, in using a device which dispenses liquid, there is a risk that the device will dispense liquid when no beverage vessel is present. Accordingly, in some embodiments, water sensors are provided at the designated location for the beverage vessel such that if the sensor detects any, or more than a threshold amount, of water, it can signal the device's internal control circuitry to stop the output of water. Alternatively, or additionally, the sensor may be configured to transmit a warning to a user, thereby mitigating any spill or flooding that could otherwise occur.

While the water sensor is described in a specific location, it will be understood that such a water sensor may be located in other locations on the device 100 as well.

Figure 37:
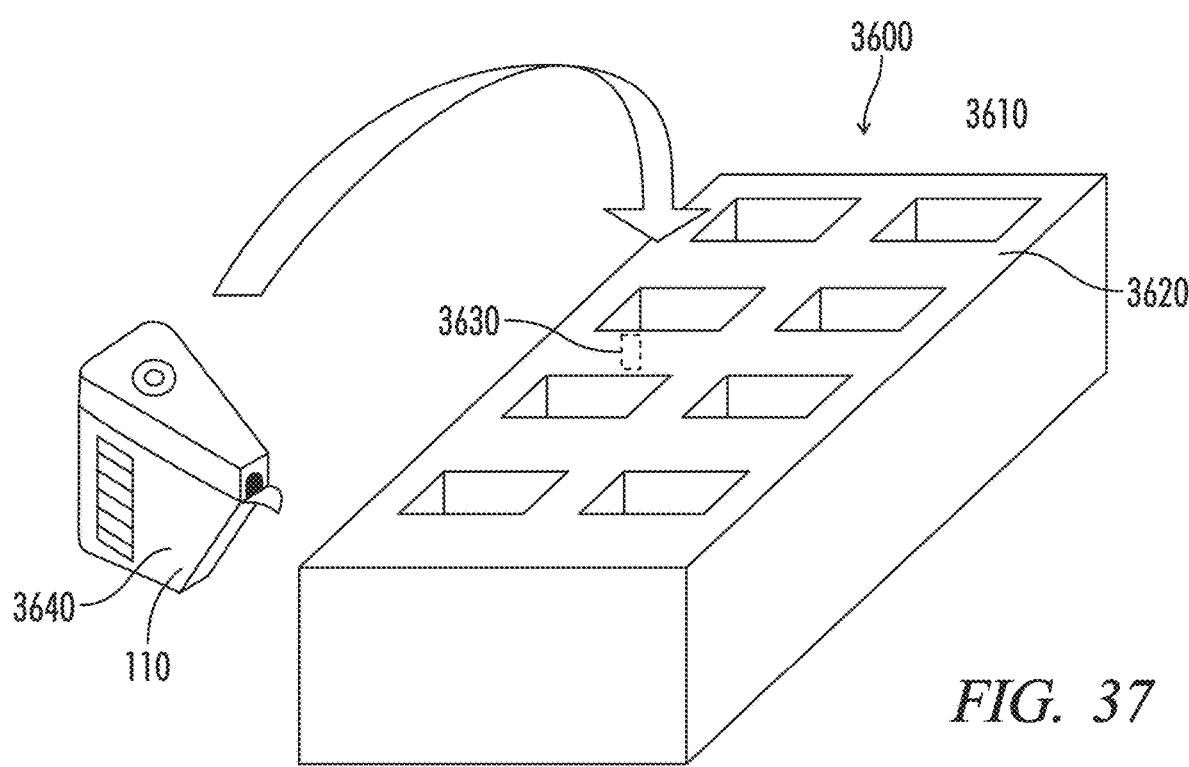
FIG. 37 is a storage module for additional additive cartridges for use with the device of FIG. 1.

FIG. 37 shows a schematic diagram of a storage module 3600 for additive cartridges, similar to that shown in FIG. 33A, incorporating additional features. While the schematic diagram shown in FIG. 37 shows a storage module 3600 taking a different aesthetic form than those shown in FIGS. 33A-36, it will be understood that the features described herein may be incorporated into storage modules having a variety of form factors.

It is often advantageous for the device 100 to know the contents of an additive cartridge 110 that has been inserted for use in the device. For instance, cartridge recognition allows the machine to know if it has to conduct any special processing procedures with the currently inserted pod, such as, for example, diluting a syrup to a greater degree than standard pods by adding a certain amount of water, converting a powder to a syrup by adding a certain amount of water, or if the cartridge contents are intended for brewing and water should therefore be added at a specified temperature.

Cartridge recognition further allows the device 100, or a backend system (which may be incorporated by software or linked by way of a wireless connection) to track usage statistics for particular flavors, which may be helpful in allowing the system to recommend other flavors or additives to the user. Such a backend system may utilize artificial intelligence (AI) for making such recommendations. Such software may similarly allow the device 100 to create and reproduce recipes utilizing the contents of one or more cartridges 110.

Cartridge recognition would also allow the machine, or a networked backend, to note if users are creating any novel mixture of flavors that could potentially be marketable to a wider audience, thereby 'crowdsourcing' flavor creation.

Cartridge recognition would also allow the cartridges 110 to be filled with syrups having a wide range of viscosities, since the cartridge's contents would be known and could therefore by accounted for in the dispensation of the additive from the cartridge. For example, if the device 100 is notified that a highly viscous syrup is in the cartridge 110, the device could know the exact supply voltage level (or PWM level) for the air pump which would dispense the additive at the desired rate. Finally, data related to cartridge 110 contents may be necessary for certain functionalities, including elements of the endless bottle feature discussed above.

For example, where cartridges 110 and beverage vessels, such as glasses, are identified using RFID tags, a first user, 'User A,' may associate a glass with a blueberry flavor. Later, a second user may place a strawberry cartridge in the machine. When 'User A' returns and attempts to fill his glass without checking the pod, the device 100 may alert the user to the flavor change and ask if the new flavor should be used. If 'User A' chooses to utilize the new flavor, the device 100 may further ask if the user would like to associate the RFID tag on his glass with the strawberry flavor.

Allowing a device 100 to recognize the contents of an inserted cartridge is straightforward if the cartridge is a single-use pod (i.e. it arrives as a sealed container, and after a single use in the machine, is disposed of), since the contents of the cartridge may then be established at the factory where it is produces, so an appropriate machine-readable label corresponding to its contents can be placed onto the pod at the factory. However, when one desires to have a multi-use cartridge which can be washed, refilled (perhaps with something different than what it was previously filled with), and re-used by the user, the issue of letting the machine know the contents of a cartridge is complicated.

In order to identify a cartridge, and to keep multiple cartridges 110 organized, a storage module 3600 may be provided. The storage module 3600 may comprise a labeled tray having storage bays 3610 for individual cartridges 110, with each storage bay having a specific flavor label 3620. Embedded in a wall of each storage bay 3610 is an array of magnets 3630, which may be either permanent magnets or electromagnets, which may be arranged or activated in such a way that each of the tray's storage bays 3610 has a different magnetic code. For example, permanent magnets 3630 may be spaced in order to apply barcode like coding to cartridges 110 inserted into the corresponding storage bay 3610.

In such an embodiment, each cartridge 110 may be provided with a strip of magnetic tape 3640 located to line up with the magnetic array 3630 in the storage bay 3610 when stored. Accordingly, when stored, a cartridge 110 would be magnetized and encoded with the pattern of magnets 3630 in the corresponding bay 3610.

After a cartridge 110 has been encoded, upon insertion into the device 100, the device would be able to evaluate, using a magnetic strip reader, the contents of the cartridge 110.

A similar concept could be used to transfer information from a large syrup refill package directly to a pod, if the refill package is provided with an array of permanent magnets on its cap, such that these magnets would come within close proximity of a magnetic strip on the cartridge (e.g. if the magnetic strip is on the cartridge's cap, so that it presses up against the cap of the refill package, which contains an array of permanent magnets, while the pod is being refilled.

Alternatively, the device 100 could distinguish between different pod contents via colorimetry (i.e. measuring absorbance of specific wavelengths of light) if the pod was entirely or at least partially transparent, and if the pod contents varied by color.

FIG. 38A shows an alternative embodiment for labeling the contents of cartridges 110. In some embodiments, a user may be provided with multiple pre-labeled and RFID encoded bands, such as elastic bands 3800. For instance, a user may be provided with two elastic bands, one labeled "strawberry" and having a correspondingly encoded RFID tag, and the second labeled "blueberry" and having a correspondingly encoded RFID tag. The user would then label the cartridges 110 using the provided bands 3800 based on the contents of the corresponding cartridge. The RFID tag 3810 of the band 3800 would then be located such that it can be read by an RFID reader in the device 100.

As shown, the cartridges 110 may be provided with detents 3820, such that the applied band 3800 lies flush with a surface 3830 of the cartridge 110. Such a band may be sealed such that it can be left on the cartridge 110 during washing.

In some embodiments, as shown in FIG. 38B, an RFID tag 3850 may be embedded and permanently encoded in a cap 3840 of the cartridge 110. Such caps 3840 may then be permanently factory embedded with RFID data, and may further be provided with a text label or color designating content. A user may then use a cap 3840 associated with a desired flavor on any cartridge 110 associated with the device 100.

FIGS. 39A-C show additive cartridges 3700 for use with the device 100 of FIG. 1. As discussed above, with respect to FIG. 7, such cartridges 3700 may be designed to drip syrup directly into a user's beverage or beverage vessel. As shown, the cartridge 3700 generally contains a syrup reservoir 3705 and has an air input hole 3710 which could, for example, interface with the air tubing 600a, b of FIG. 6, to connect the air input hole to the pumps discussed above. The cartridge 3700 further comprises a syrup output hole 3720, and a tube 3730 for transporting syrup from a syrup reservoir 3705 to the syrup output hole 3720.

Figure 43A:
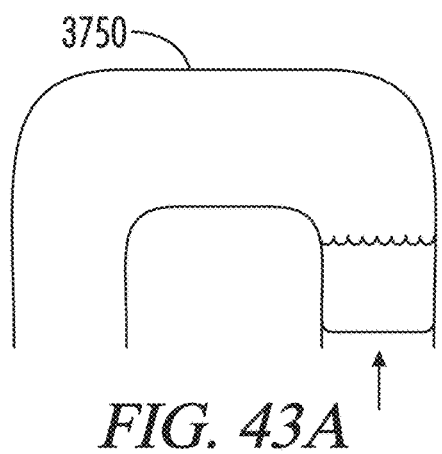
FIGS. 43A-D show one advantage of the embodiment of FIG. 42 relative to the embodiment of FIG. 40.
Figure 43C:
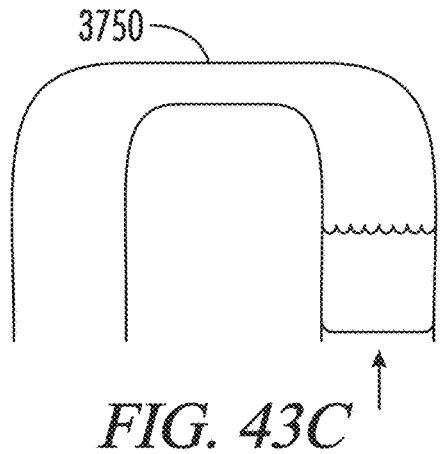
Figure 43B:
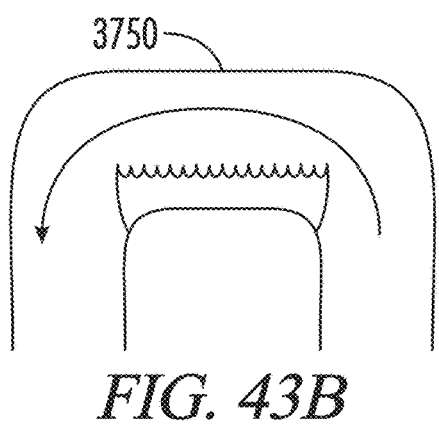
Figure 43D:
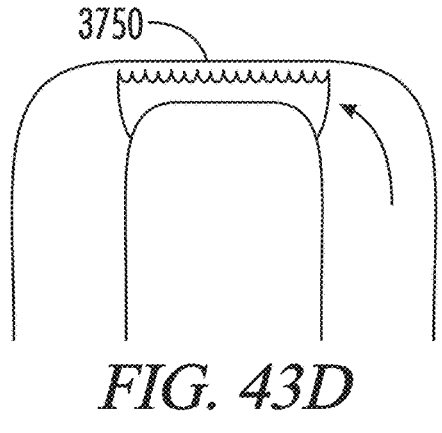

As shown in FIG. 39A, the air input hole 3710 may be on a top surface of the cartridge 3700. Alternatively, as shown in FIGS. 37B and C, the air input hole 3710 may be on a side surface. If the air input hole 3710 is on a side surface, the syrup reservoir 3705 could have a fluid fill level 3725 below the location on the side surface at which the air input hole is provided, as in FIG. 37B. Alternatively, an anti-syphon tube 3740 may be provided in association with the air input hole 3710, such that the fill level 3725 of the syrup reservoir 3705 can be higher than the air input tube, as shown in FIG. 37C. Accordingly, even where the air input hole 3710 is below the fluid fill level 3725, the anti-syphon tube 3740 directs pressure from the fluid inlet above the fluid fill level. While the air input hole 3710 is shown in FIGS. 37B and C as opposite the syrup output hole, it will be understood that in some embodiments, the air input hole may be located on the same side of the cartridge 3700 as the syrup output, depending on aesthetics and mechanical configurations of the device 100. Further, as shown in FIGS. 43A and B below, because the syrup output hole 3720 may be downward facing and the air input hole 3710 may be horizontal, the two openings may be on adjacent surfaces, rather than on the same surface of the cartridge 3700.

As shown, the cartridge 3700 may therefore comprise a cartridge housing, shown as reservoir 3705, for retaining fluid up to the fluid fill level 3725, a fluid inlet 3710, typically for receiving air, for pressurizing the cartridge 110, and a fluid outlet 3720 above the fluid fill level 3725. The cartridge may further comprise a syphon, such as an output tube 3730, for transporting fluid from below the fluid fill level 3725 inside the cartridge reservoir 3705 to the fluid outlet 3720. Accordingly, when pressure is applied at the fluid inlet 3710, it causes fluid from the cartridge 3700 to dispense at the fluid outlet.

Figure 40:
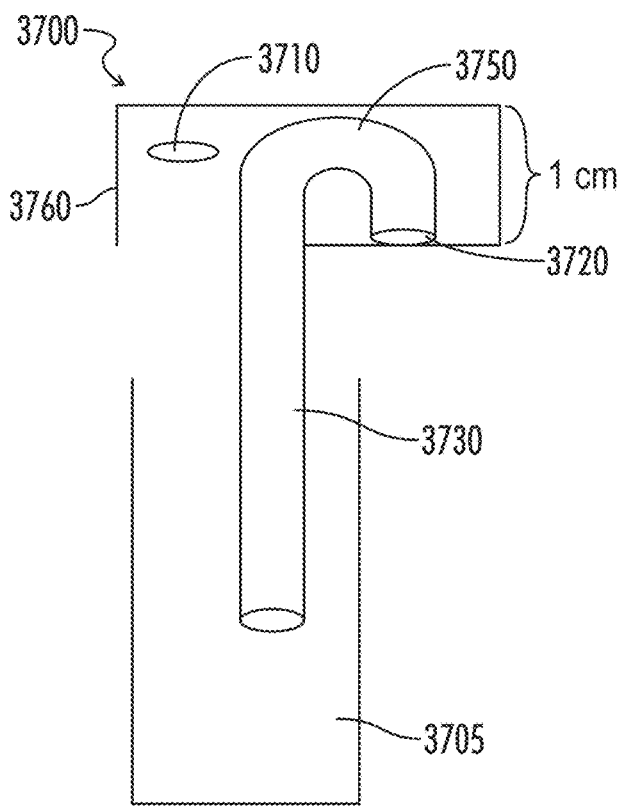
FIG. 40 shows a schematic diagram of an output tube for use in the context of the additive cartridges shown in FIGS. 38 and 39A-C FIGS. 41A-D show a pumping process for retrieving contents of the additive cartridges from the output tube.

FIG. 40 shows an output tube 3730, also referred to as a syphon, for use in the context of the additive cartridges 3700 shown in FIGS. 39A-C. Note that sample dimensions are shown, but the tube may have a wide variety of dimensions. As shown, the output tube 3730 extends up from the syrup reservoir 3705, forms an upside down U 3750, and connects to a downward facing syrup output hole 3720. In such an embodiment, a main body, which may be the syrup reservoir 3705, may be detachable from a cap 3760, as shown. The syrup output tube 3730 may then be integrated into or connected to the cap 3760. When assembled, the bottom of the tube 3730 extending into the syrup reservoir 3705 may extend to the bottom of the reservoir so that it can receive all syrup within the cartridge 3700, and the syrup output hole 3720 faces downward, and is typically placed above a user's beverage vessel or beverage. In this way, syrup drips directly into the bottle and does not require additional tubing for transport. Alternatively, the cartridge 3700 may extend above a "river" design, as shown in FIGS. 8-9C.

FIGS. 41A-D show a pumping process for retrieving contents of the additive cartridges 2700 from the output tube 3730.

In some embodiments, whenever syrup is pumped out of the additive cartridge 3700 (such as when air pumped into the air inlet 3710 pushes syrup out of the pod via the syrup output tubing 3730), it may be followed by air being pumped back out of the pod (e.g. via the reversal of a peristaltic air pump). This may then cause the reverse pumping of syrup back into the syrup reservoir 3705. Accordingly, the pressure applied causes syrup to be sucked from the exitway side of the syrup tubing, shown on the right in FIGS. 41A-D, back over the tubing's U shaped section 3750 and into the entryway side of the syrup tubing, shown on the left side in the figures. This can be achieved via a constant rate reverse-pumping of air out of the pod. However, such a constant rate pumping may result in liquid forming a film along the boundaries of the tube 3730, as shown in FIG. 41B. Alternatively, the pumping may be pulsed (e.g. 1 second of reverse pumping, followed by 1 second of non-pumping, followed by 1 second of reverse pumping, etc.). This pulsed reversed-pumping may be more effective because it allows any syrup left in the exitway side of the tubing to reconsolidate into a droplet (via gravity), as shown in FIG. 41C, which takes up the entire cross sectional space of the tubing (instead of being, for instance, spread out as a 'film' on the walls of the tubing, as happens when air is attempting to push past it due to the reverse-pumping), thereby allowing air to better push to bolus through the tubing back towards the entryway side of the syrup tubing.

Figure 41A:
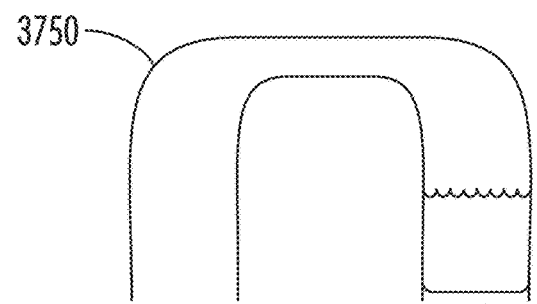
Figure 41B:
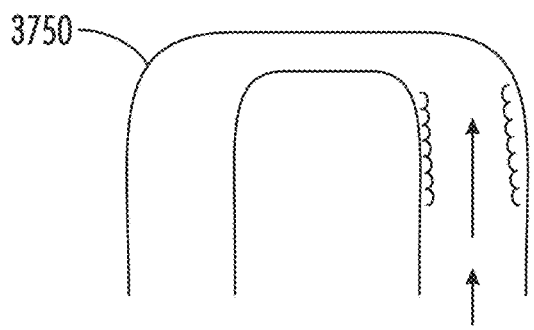
Figure 41C:
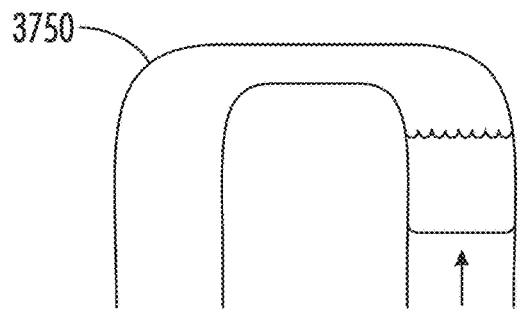
Figure 42:
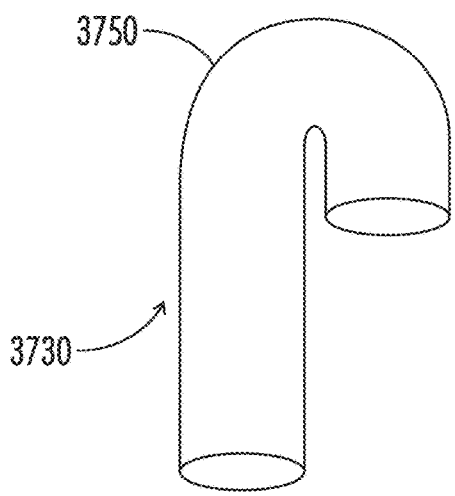
FIG. 42 shows an alternative embodiment of an output tube for use in the context of the additive cartridges shown in FIGS. 38 and 39A-C.
Figure 41D:
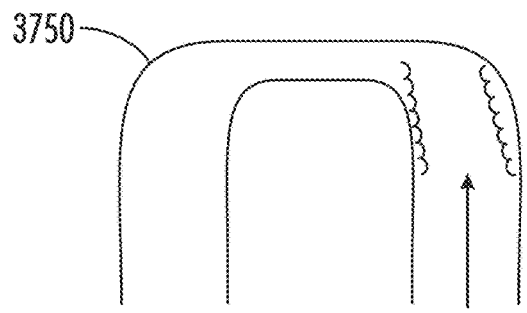

FIG. 42 shows an alternative embodiment of an output tube for use in the context of the additive cartridges shown in FIGS. 41A-C. As shown, the top of the U shaped section 3750 may be flattened when viewed as a horizontal section.

One purpose of the arched syrup tubing is to prevent the dripping of syrup from the pod when it is being handled by the user. A larger internal cross-section of tubing allows faster and easier pumping of fluid through them (less friction). However, when fluid is passing from a vertical section of tubing (e.g. the vertical exitway side side of the syrup tubing) into a horizontal section of tubing (e.g., the U shaped section 3750), if the horizontal section has a 'tall' internal dimension, then the water will tend to be spread out and drawn by gravity away from the 'ceiling' of the tubing, thereby allowing any air an easy bypass of any air that was previously pushing the fluid bolus in the vertical section of tubing. This allowance of air bypass interferes with successful suction of the fluid bolus through the horizontal section of tubing. Therefore, to prevent this malfunction of suction, and to allow the fluid bolus to be successfully sucked back into the vertical entryway side of the syrup tubing, the horizontal section of syrup tubing must be of a 'short and wide' dimension, thereby allowing a gravity-flattened fluid bolus of fluid to still fill the entire cross section of the tubing, and thereby still allow suction to successfully draw all of the syrup from the exitway side of the syrup tubing over to the entryway side of the syrup tubing.

FIGS. 43A-D show one advantage of the embodiment of FIG. 42 relative to the embodiment of FIG. 40. FIGS. 43A and B show the effect of the reverse pumping described on a U shaped section 3750 having a cross section consistent with the rest of the tube, while FIGS. 41C and D show the effect of the same reverse pumping on a U shaped section 3750 having the flattened cross section described.

Figure 44A:
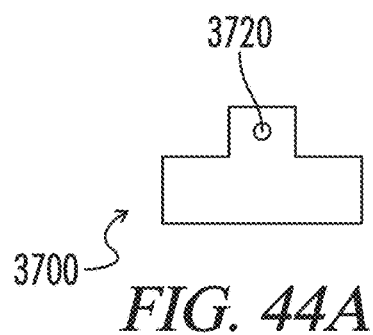
FIGS. 44A, B, and C show views of an embodiment of an additive cartridge according to this disclosure.
Figure 44B:
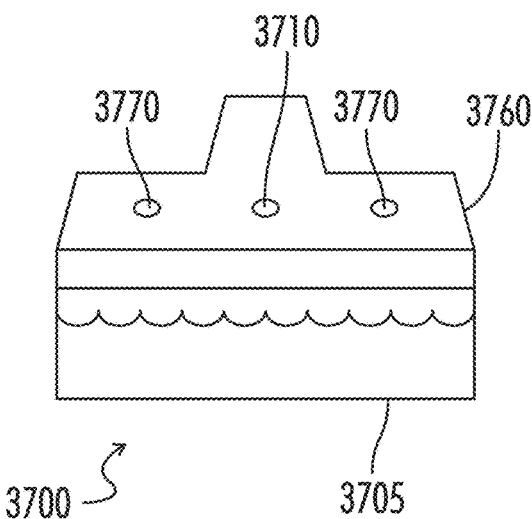
Figure 44C:
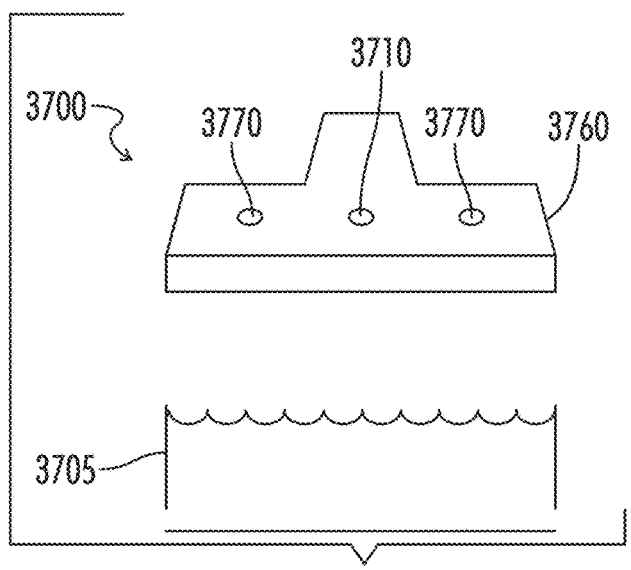
Figure 45A:
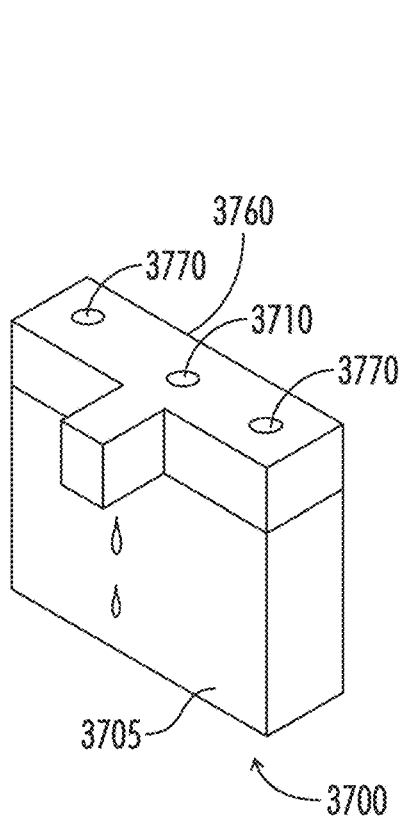
FIGS. 45A and B show views of an embodiment of an additive cartridge according to this disclosure.
Figure 45B:
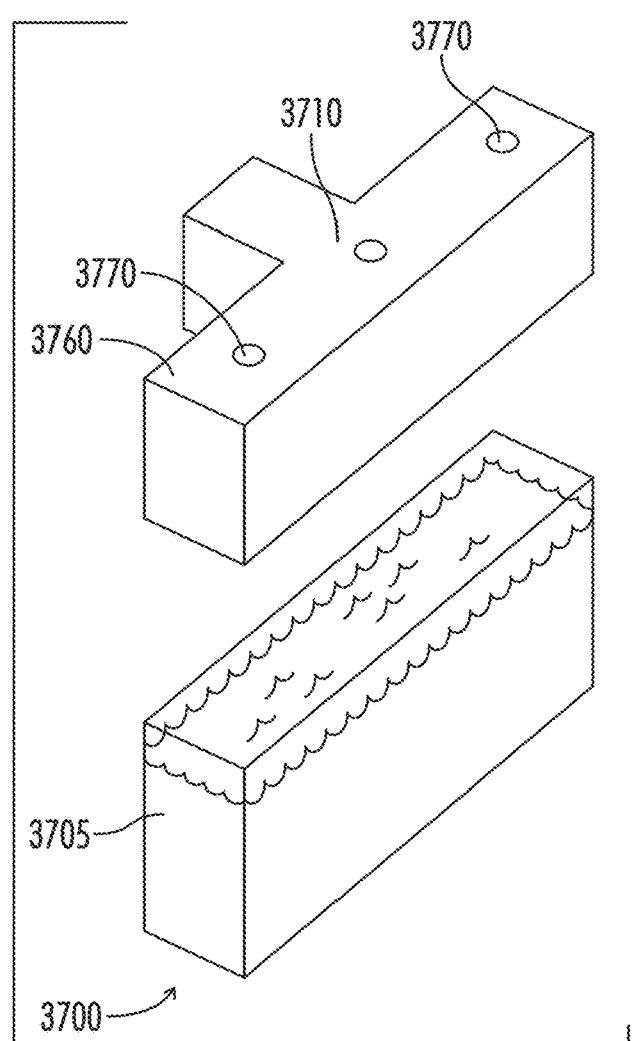

FIGS. 44A, B, and C show views of an additive cartridge 3700 according to this disclosure. FIGS. 45A and B show views of an embodiment of an additive cartridge 3700 according to this disclosure. FIG. 44A shows a bottom view of a cartridge 3700 as described, showing the syrup output hole 3720 on a downward facing surface on the cartridge. FIG. 44B shows a front view of the cartridge 3700 assembled, and shows the air input hole 3710 on a front surface. Further, as shown in FIGS. 45A and B, the air input hole 3710 may be on a top surface of the cartridge 3700, and it may be on a surface adjacent to the syrup output hole 3720. FIG. 44B further shows fixation elements 3770 for removably mating the cartridge 3700 with the device 100. In the embodiment shown, those fixation elements may take the form of magnets 3770, which may connect to corresponding magnets on the device 100. As shown in FIG. 42C, the cap 3760 of the cartridge 3700 may be removable from the syrup reservoir 3705.

In the embodiments shown, the cartridge 3700 has a removable cap. The removal of the cap 3760 allows the user to more easily clean and refill the cartridge 3700. Accordingly, the main body, comprising the syrup reservoir 3705 can be washed in a washing machine since it has a large opening for water to easily flow in. Further, the cap 3760 can be easily washed under a sink by positioning the syrup tubing under the water falling from the user's faucet. While specific embodiments are described, it is contemplated that the cartridge 3700 may be further disassembled to further ease cleaning, or to render the entire assembly machine washable.

Cleaning tubes typically presents problems because tubes are long, small diameter channels which are difficult to clean using traditional cleaning mechanisms, such as high velocity water directed perpendicularly to the tubing wall or scrubbing. Users of a refillable cartridge 110, such as those described, are unlikely to have specialized cleaning skills or equipment. Accordingly, a new tube design is described and shown.

Figure 46:
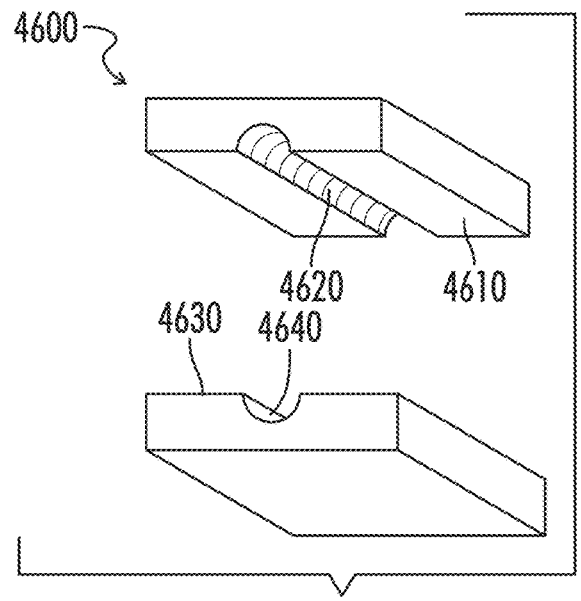
FIG. 46 shows components of a deconstructed syphon tube for use in cartridges for use with the device of FIG. 1.
Figure 47A:
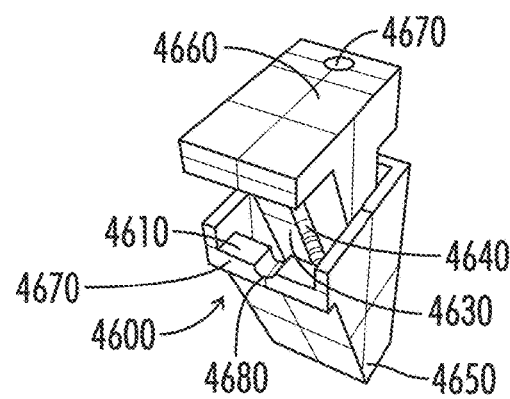
FIGS. 47A-B should the incorporation of the deconstructed syphon tube of FIG. 46 in additive cartridges.
Figure 47B:
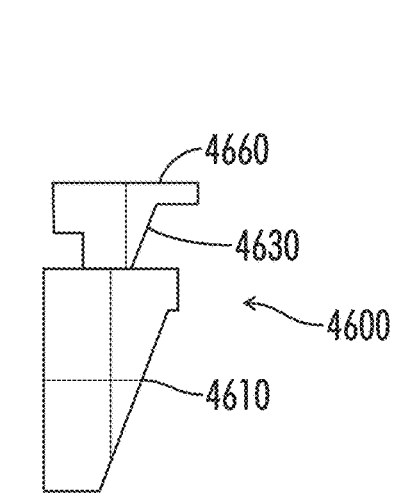

For example, one way in which the cleaning process can be eased is by replacing the syphon tube, or syrup output tubing 3730, with a deconstructed tube 4600, shown in FIGS. 46-47B. As shown, the deconstructed tube 4600, or syphon, may comprise a first surface 4610 having a first surface groove 4620, and a second surface 4630 having a second surface groove 4640. In such an embodiment, both the first and second surface 4610, 4630 may be compressed against each other such that the first and second surface grooves 4620, 4640 combine to form the syphon tube 4600.

While the embodiment shown provides two surfaces having grooves, it will be understood that grooves could be provided in only one of the two surfaces without compromising the integrity of the deconstructed tube 4600.

As shown, the first and second surfaces 4610, 4630 may be planar surfaces. Alternatively, the surfaces may be provided with some curvature to ease the incorporation of such surfaces into a cartridge 110.

In such an embodiment, the deconstructed tube 4600 may be opened along its length, such that the tubes inner walls can be easily exposed and washed either by hand or in a dishwasher.

FIGS. 47A-B show a perspective view and a side view of the deconstructed syphon tube 4600 incorporated into a cartridge 110. As shown, the cartridge may have a cartridge housing comprising a reservoir 4650 and a lid 4660. The first surface 4610 may then be an extension of the lid 4660 and the second surface 4630 may be an interior surface of the housing 4650.

In such a structure, the cartridge 110 acts as both a reservoir and a dispenser for syrup. In order to dispense additive syrup, an external pump applies pressure at an inlet 4670, thereby pushing additive through the deconstructed syphon 4600 to an outlet spout 4680.

As shown, the first surface 4610 and the second surface 4630 may be angled relative to a closure direction of the cartridge 110. In order to facilitate a tight coupling between the surfaces 4610, 4630 that would allow for a fluid tight seal, the mating surfaces are angled such that when a user compresses the lid 4660 against the housing 4650, the surfaces are pushed against each other. This seal allows the substantially vertical transport of fluid by way of the surface grooves 4620, 4640, by applying pressure to the interior of the housing 4650 at the inlet 4670.

In this implementation, as well as all other implementations where the cartridge 110 has a removable cap or lid 4660, the ability to seal the cap to the housing 4650 is important. Such a seal may be enhanced by applying force magnetically. Accordingly, the lid 4660 may be compressed against the housing 4650 using a magnetic closure. Such compression may reinforce the integrity of the deconstructed syphon tube 4600.

Forming good pneumatic seals is more difficult than forming good hydraulic seals, since gasses can more easily traverse through smaller seal imperfections (e.g. a gap or crack in the seal) than fluids can. Typical pneumatic seal solutions involve the use of O-rings or adhesives or fillers such as threadlock glue, silicone sealant, or Teflon tape, which may minimize gaps through which gases can flow. Such solutions may not work sufficiently for the cartridges 110 shown and described herein, since in many cases, the cartridge 110 must have a cap 4800 that can pneumatically seal to a dock 4810 for pumping air into the cartridge and the cap must further pneumatically seal with the base of the cartridge 4820. Further, in some embodiments, such as that shown in FIGS. 46A-47B, the deconstructed syphon must comprise a pneumatic seal as well, such that air cannot leak into the tube, as well as a hydraulic seal such that syrup cannot escape the grooves 4620, 4640.

These unique requirements stem from the fact that the cartridge 110 must be easily removable from the cartridge dock by an untrained user, the cartridge 110 cap and base must be easily washable in a dishwasher or by hand, and untrained users must be able to easily and repeatedly disconnect and reconnect the AP cap from the AP base. Accordingly, seals must have minimal crevices in which cartridge contents can accumulate, while also being non-permanent and easily coupled and decoupled with minimal skill.

Figure 48:
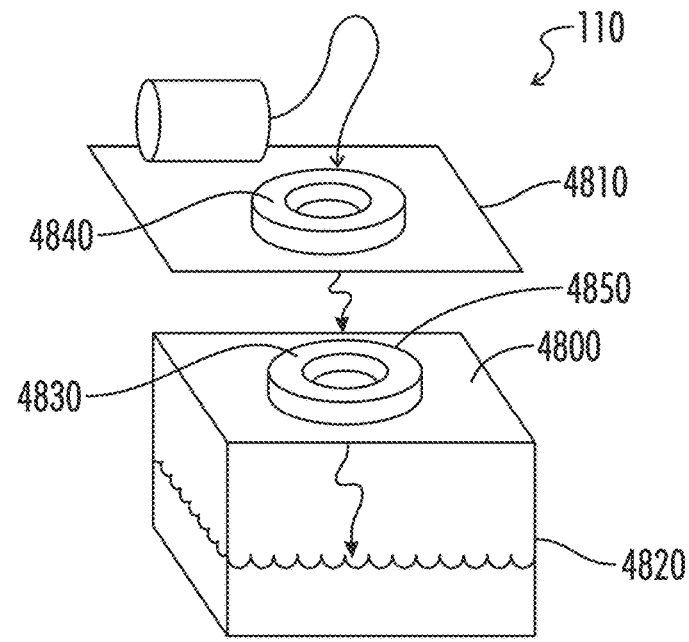
FIG. 48 shows a magnetic seal for use with a cartridge.

Accordingly, as shown in FIG. 48, seals may be provided as magnetic couplings. In such an embodiment, a magnet 4830 would be located on either the cartridge dock 4810 or on the cartridge itself 110, and the other of the two would have either another magnet or a ferromagnetic material 4840 for bonding to the magnet. To facilitate a good pneumatic seal, the magnet may fully encircle the pneumatic port, in this case the inlet 4850 through which air is pumped from the dock 4810 into the cartridge 110. The magnet 4830 and/or the ferromagnetic material 4840 may therefore be provided in a donut shape, which completely encircles the port.

By sandwiching a rubber-like material in the middle, a strong seal can be made. Because the seal is magnetic, no male/female or convexity/concavity matings are necessary for the coupling, and the coupling can be applied and decoupled by unskilled users.

In some embodiments, in order to further facilitate correct orientation of the cartridge 110 when docked with the dock 4810, either an additional magnet could be used, or a non-round shape could be used for the magnets, thereby biasing the couplings orientation to a desired orientation.

As shown in FIGS. 49A-B, magnets may be configured to ensure a good cartridge 110 base 4900 to cap 4910 seal. Such a configuration may apply a magnetic seal only when the cartridge 110 is docked to the device 100, and the seal is loosened when the cartridge is removed from the device.

As shown, a magnet 4920 may be incorporated into the base 4900 of the cartridge 110 instead of the cap 4910. Accordingly, when the cap 4910 is placed on the base 4900 and the cartridge 110 is inserted into the device 100, the cartridge dock 4930 is then placed on top of the cartridge 110. In this way, the magnet 4920 in the base 4900 of the cartridge 110 is attracted to the magnet or ferromagnetic material 4940 in the dock 4930, thereby sandwiching the cap 4910 between the two magnetic components. In this way, the compression ensures a good base 4900 to cap 4910 seal as well as a good cap 4910 to dock 4930 seal.

Furthermore, because of this cap 4910 sandwiching effect, the cap surfaces that mate with the dock 4930 and base 4900 can be relatively simple, with a minimum of crevices within which additive could accumulate and become encrusted and hard to clean. For instance, the mating surface could be simply a flat surface which increases the surface area of contact between the components.

Figure 50A:
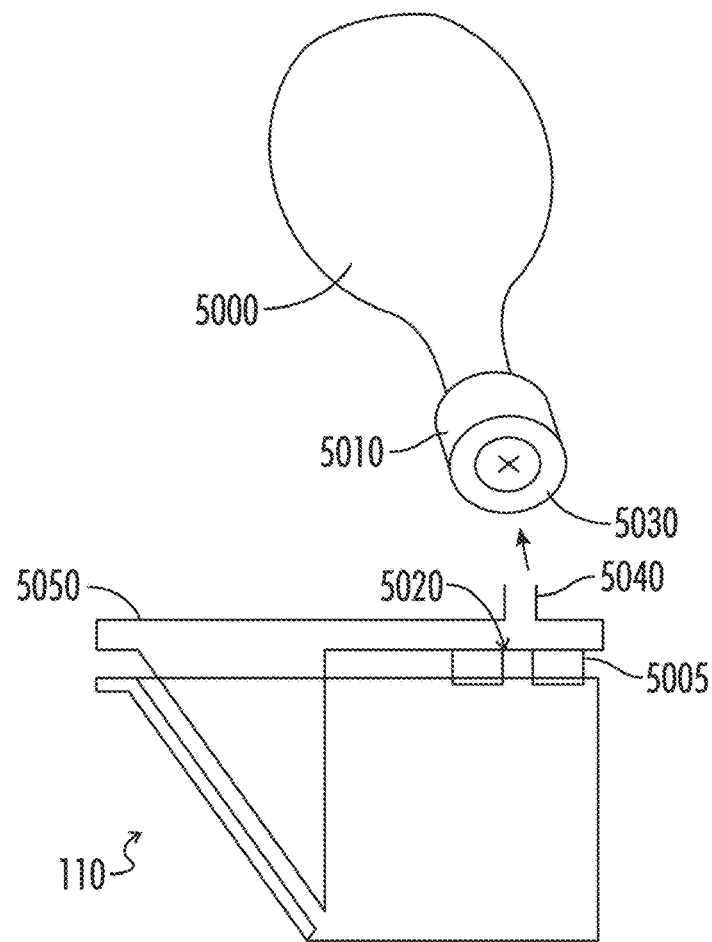
FIGS. 50A-50B show magnetic elements for use in refilling a cartridge.
Figure 50B:
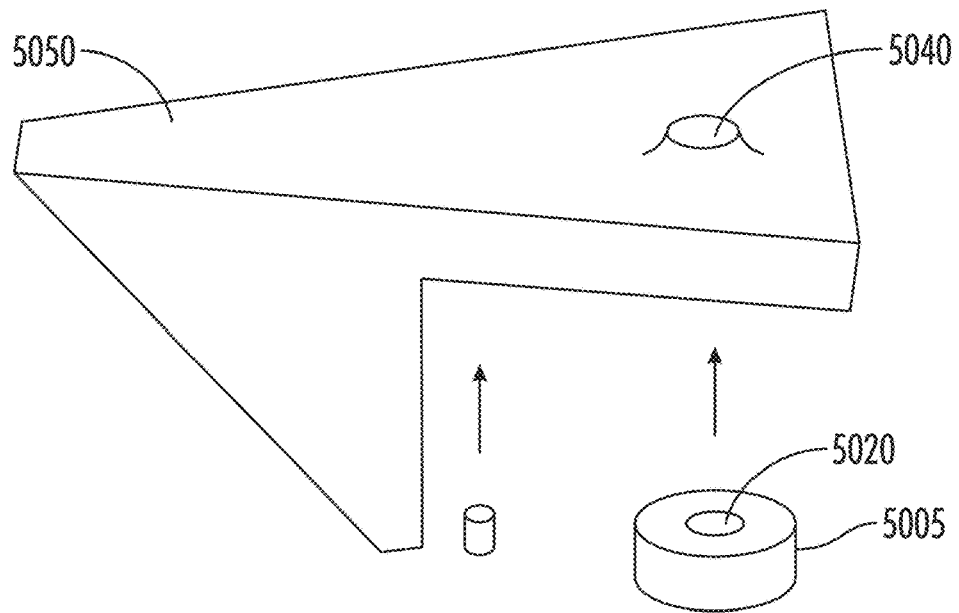
Figure 51:
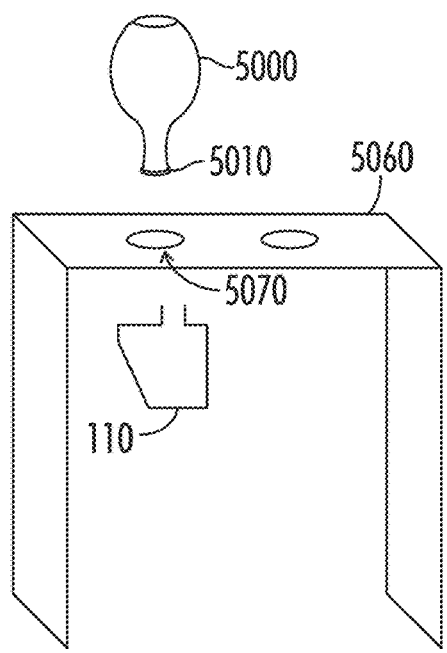
FIG. 51 shows a stand assembly for use in refilling a cartridge.

Cartridges 110 may be refillable from refill containers. In order to reduce waste, many systems allow users to refill small cartridges, such as soap dispensers or ink cartridges, using large containers of refill fluid. This is typically an inconvenient and messy process, requiring substantial effort to avoid spillage. To facilitate convenient refilling, as shown in FIGS. 50A-B, the circular magnet shown in FIG. 48, shown as 5005 or a similar magnet or ferromagnetic metal, may be used to couple the cartridge 110 to a refill container's 5000 output spout 5010 by way of the cartridge's air input hole 5020, thereby using the air input as a refill port. Also shown in FIG. 50B is a second optional magnet for facilitating orientation of the cap 5050 with respect to a base of a cartridge 110.

In order to prevent leakage from the refill container 5000 until it has been properly coupled to the cartridge 110, a cross-slit valve 5030 (also called 'cross valve' or a 'slit valve'), or other types of one way or directionally biased valves, could be used at the output port of the refill container 5000. This valve would prevent output of 'refill fluid' until either the refill container 5000 is squeezed (i.e. increasing the internal pressure sufficiently to force fluid out through the valve), or until an external protrusion 5040 pushes the 'flaps' of the valve open 5030, allowing fluid to exit. The latter protrusion 5040 could be a nipple that extends out around the air input port 5020 on the cartridge cap 5050, such that it would auto-pierce the refill container's 5000 slit valve 5020 when the refill container 5000 and cap 5050 are coupled via magnetic force (or by some other method).

As shown in FIG. 50C, such a 'no drip' mechanism would further allow the refill container 5000 to be permanently mounted 'upside down' such that its output spout 5010 is always in the downward facing position, ready to be dispensed into an cartridge 110. In such an embodiment, a support structure 5060 may be provided for retaining the refill container 5000 in a position in which the cartridge 110 can be applied to it. In such an embodiment, the support structure may be provided with an additional magnetic or ferromagnetic ring 5070 in order to fix the refill container 5000 to the support structure 5060.

In some embodiments, instead of, or in addition to, the cartridges 110 being refillable, the cartridges are supplied to users pre-filled with syrup. In such embodiments, prior to shipping, a seal could be placed over the input and output ports of the cartridge 110. Such seals can prevent spillage of either powder or liquid additives stored in the cartridge. In such an embodiment, the device 100 may comprise a surface or mechanism for puncturing or removing the seal, or a user may remove the seal prior to first use of the cartridge 110.

As discussed above, flavor and usage of additives from the cartridges 110 can be tracked by monitoring air pumped in to the cartridges. The additives may take the form of flavoring syrups, pH adjusting concentrates, or other fluids, and is usually monitored by controlling and monitoring actuators which control the dispensation of the additives from the cartridge 110 through a tube to a mixing or drinking vessel, such as a user's glass. For instance, in using a stepper motor pump, a device 100 can ensure that the pump moves "100 steps" worth of an additive out of the additive reservoir and into the mixing vessel.

However, in many embodiments, such as where syrups or other additives may have different viscosities, usage may be tracked more precisely and accurately by monitoring the output of the cartridge 110. This may be, for example, by monitoring the weight of the vessel that the additive is being added to, by monitoring the passage of additives through an output tube using a flow sensor, such as a paddle wheel based sensor. However, such implementations require output tubing or otherwise require sophisticated scales or sensors.

Figure 52B:
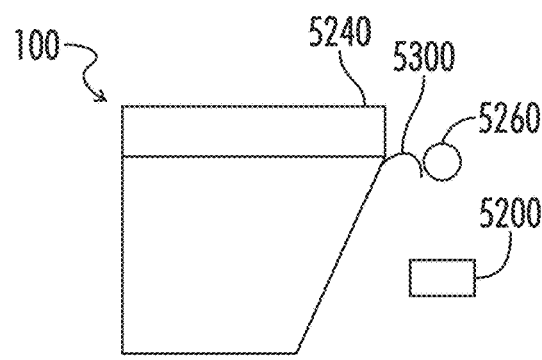
FIGS. 52A-B show an assembly for counting drops dispensed from a cartridge.
Figure 52A:
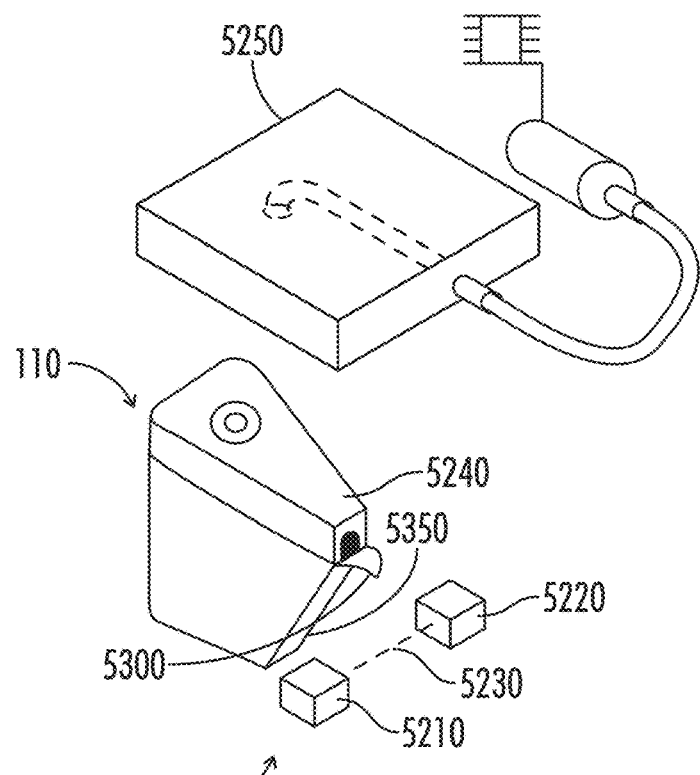
Figure 53A:
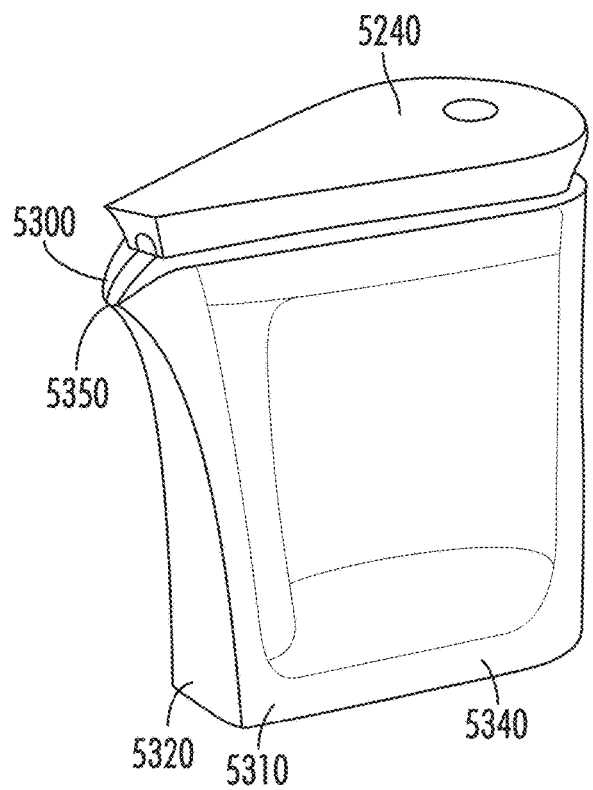
FIGS. 53A-D show a cartridge for use in the assembly of FIGS. 52A-B.
Figure 53B:
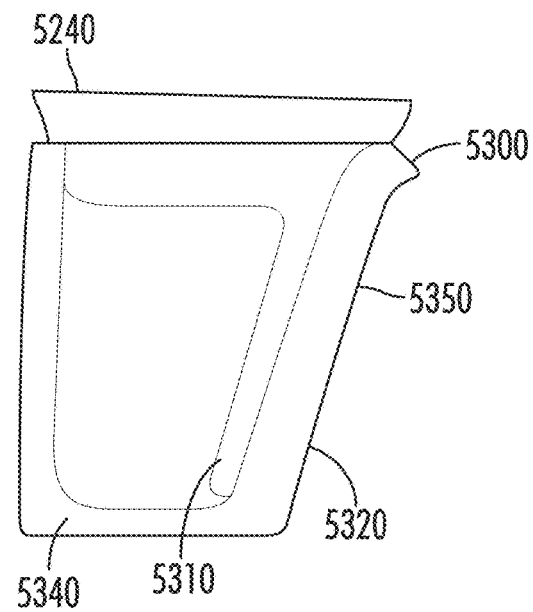
Figure 53C:
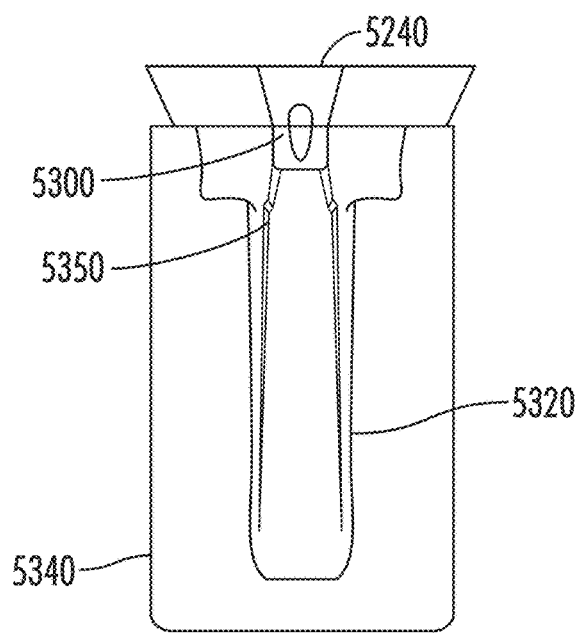
Figure 53D:
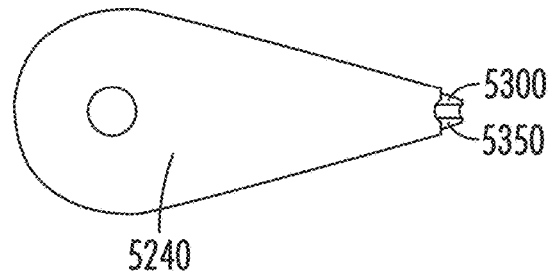

Alternatively, the tracking may be by use of a drop sensor 5200, as shown in the system of FIG. 52A-B, in order to count drops output from the cartridges. A proposed setup for a drop counter assembly is shown in FIG. 52A as a partially exploded assembly. Such a setup is shown assembled in a side view in FIG. 52B. As shown, the monitoring may be by counting drops using, for example, an IR emitter 5210 paired with a sensor 5220 positioned on either side of a vertical passage through which additive drops fall. Accordingly, the IR beam's default state is to shine across the passage from the IR emitter 5210 into the IR sensor 5220, and a drop of additive falling through the passage interrupts the beam 5230, allowing for detection.

By counting the number of droplets falling from an additive cartridge 110 into a mixing vessel, the device 100 can quantify the dispensation of additives in a way that is uniquely advantageous to a device utilizing a cartridge that is user-openable and can be refillable by the user with a wide array of additives that have varying viscosities.

Because user's can both 1) remove and replace the cartridge 110 cap 5240, and 2) pour into the cartridge 110 syrups of varying viscosities, there can be variation in both 1) how airtight the AP's cap-body seal is, and 2) how easy it is to push the additive out of the pod, respectively. Because of these variabilities, a system which controls only input parameters (e.g. commanding a stepper motor pump to move a certain number of steps), would not be able to accurately dispense a consistent amount of syrup from such cartridges 110. Meanwhile, by counting the number of additive drops that have fallen from the cartridge, the pump can operate as long as needed for the desired number of drops to be dispensed.

To ensure that syrup is dispensed from the cartridge 110 at a slow enough rate to create individual drops of additive, instead of a steady stream, two methods are disclosed. In a first method, if the machine knows the type of syrup inside a cartridge, then it will also know the viscosity of the syrup currently being dispensed, and it could select a pump power (e.g. via Pulse Width Modulation voltage control) appropriate for that viscosity. Alternatively, to ensure that additive is dispensed in individual droplets, the device 100 may gradually ramp up the supply voltage going to the air pump 120 (e.g. via Pulse Width Modulation), or repeatedly turn the pump on and off until the drop sensor detects that a drop has been dispensed. At this point the device 100 could maintain the voltage at the current level, or it could automatically increase the voltage slightly above the current level, to ensure a continuous and steady dispensation of drops.

Where the device 100 is provided with data relating to the liquid level in the pod, which may be determined by tracking syrup output from the pod or by detecting an amount of fluid remaining, the device can predict a good PWM level at which to start the PWM ramp, since the level required to dispense a drop depends on the current liquid level in the pod. In so doing, the machine can minimize the time needed to dispense the first drop from the pod.

In order for a drop sensor to accurately evaluate a number of drops, it is useful for drops to fall consistently in a known location. FIGS. 53A-D show a perspective view, as well as a side, front, and top view respectively, of a cartridge 110 provided with a spout 5300 designed for precisely locating the drop as it is dispensed from the cartridge. Such a cartridge 110 is shown schematically in FIGS. 52A-B and may incorporate several features discussed in this specification.

Accordingly, the cartridge 110 may be provided with a deconstructed syphon, such as that shown above in FIGS. 46-47B comprising a first surface 5310 having a first surface groove and a second surface 5320 having a second surface groove. The first surface may be an extension of the lid 5240 of the cartridge 110, while the second surface may be an inside surface of the housing 5340. While the grooves are not shown, the spout 5300 may be an extension of the second surface groove.

The spout 5300 is typically a downwardly curving channel, as shown, and is located at a corner 5350 of the cartridge 110. Accordingly, when the cartridge is docked in a pod dock 5250 and is placed in a known orientation, the drop location of droplets 5260 rolling off the spout 5300 will be precisely known.

Figure 54:
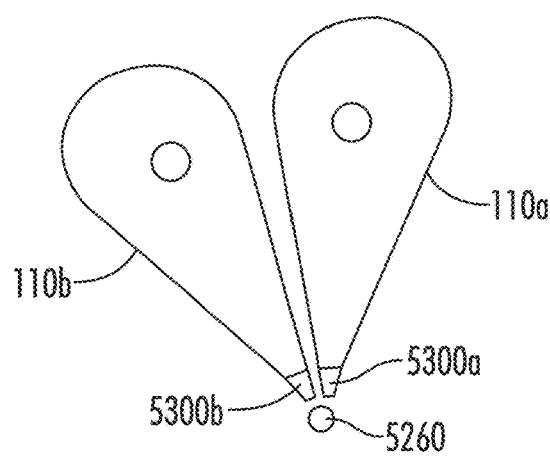
FIG. 54 shows an overhead view of multiple cartridges in the assembly of FIGS. 52A-B.
Figure 55:
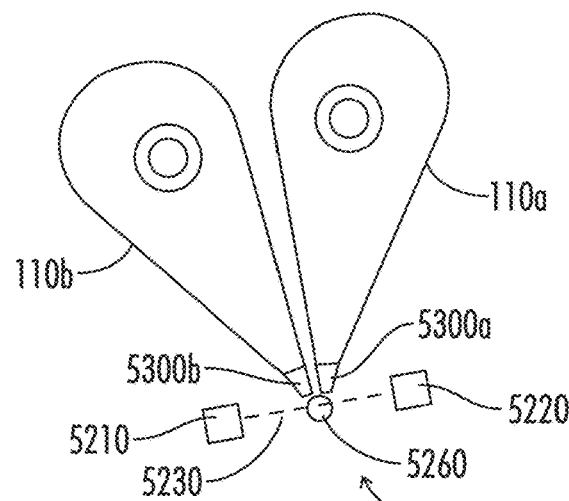
FIG. 55 shows the use of a drop sensor in the view of FIG. 54.

In addition to knowing the precise location at which a drop will fall, a drip detection system will work best if all drops fall in substantially the same location. Where multiple cartridges 110a, b are used, a single drop sensor will work most effectively if the multiple cartridges dispense drops at the same, or in substantially the same location. Accordingly, Accordingly, the cartridge 110 structure shown in FIGS. 52A-53D is wedge shaped, with the wedge tapering substantially to the corner 5350 containing the spout 5300, so as to allow the positioning of multiple such cartridges adjacent each other in a dock, and such that the cartridges dispense drops at substantially the same location. Two such cartridges 110 adjacent each other are shown in FIG. 54. As shown in FIG. 55, this arrangement allows the drop sensor 5200 to detect a droplet 5260 from either cartridge 110.

Accordingly, as shown, an implementation of the device 100 may comprise a first fluid cartridge 110a comprising a first spout 5300a at a fluid outlet for dispensing a fluid, such as syrup, a second fluid cartridge 110b comprising a second spout 5300b at a similar fluid outlet, and a docking location for docking both cartridges 110a, b. When docked, the first spout 5300a is positioned adjacent the second spout 5300b such that droplets fall in the same place, which functions as a drop detection location. Because the cartridges 110a, b taper to their respective spouts 5300a, b, additional cartridges may be provided as well such that the cartridges form segments of a circle.

Figure 56:
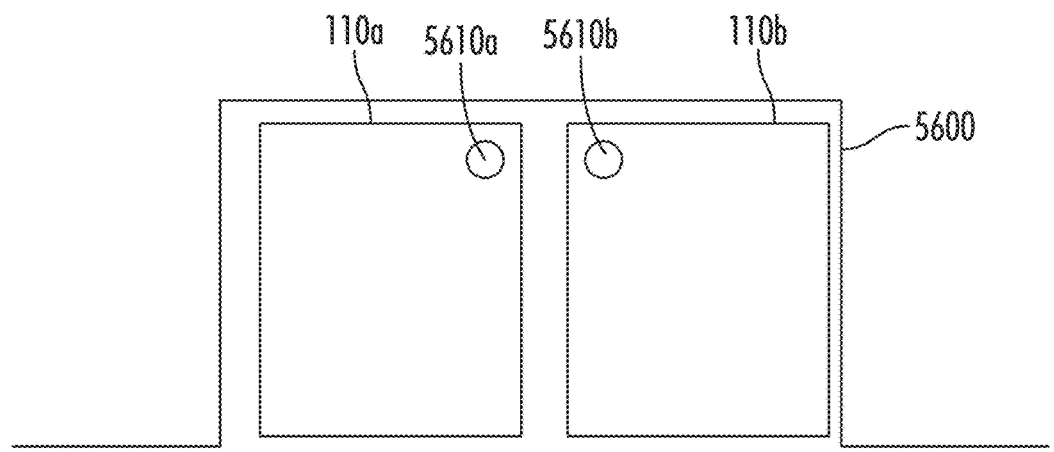
FIGS. 56-57 show multiple cartridges in a docking location for use in the device of FIG. 1.

Alternatively, the outputs from a plurality of cartridges 110a, b may be located with spouts 5610a, b adjacent each other in other ways. As shown in FIG. 56, multiple square, or rectangular, cartridges 110a, b may be retained at a docking location 5600 of the device such that their respective spouts 5610a, b are rotated towards each other. Accordingly, each cartridge 110a, b has a square cap which allows the pod to be placed on either the left side or right side of the docking location 5600 by rotating the cartridge such that the spouts 5610a, b are oriented towards the center of the pod dock.

Figure 57:
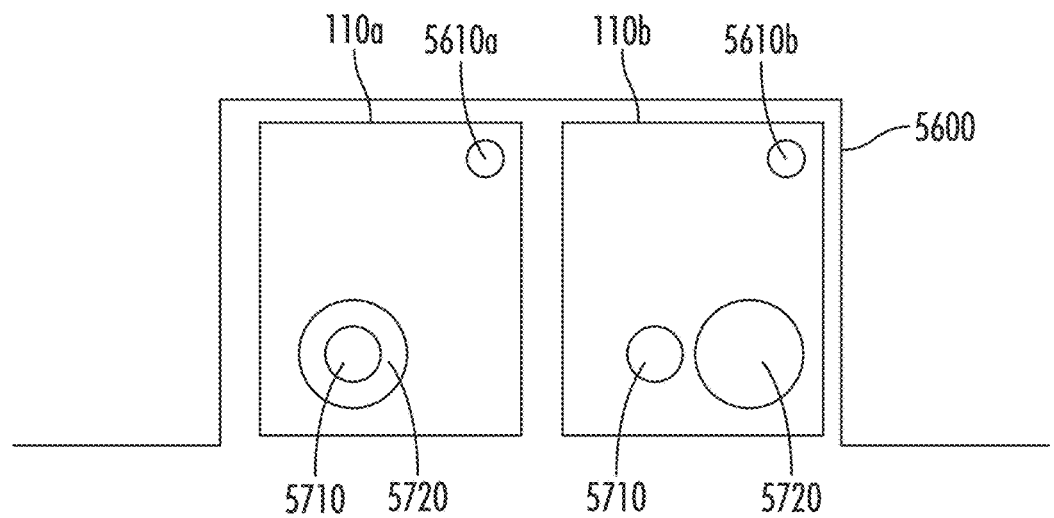

In order to ensure that the spouts 5610 are located at the specified location required, the docking location may incorporate detection mechanisms such that it can be confirmed that the cartridges are properly oriented. As shown in FIG. 57, this may include magnets in the cap 5710 and the dock 5720 respectively that must be properly aligned in order for the cartridges to mate with the dock. If such magnets are not aligned, the docking location 5600 may reject the cartridges 110a, b, or may not properly function.

The magnets 5710, 5720 may also serve to secure the air inlet port, and may be offset from the center of the corresponding cartridge cap 5730, such that an incorrect orientation will not allow coupling of the cartridge cap 5730 to the docking location 5600. Another option is for there to be more magnets oriented at the corners of the pod cap in north/south orientations that prevent incorrect user orientation of the pod while docking it to the pod dock.

Figures 58, 59:
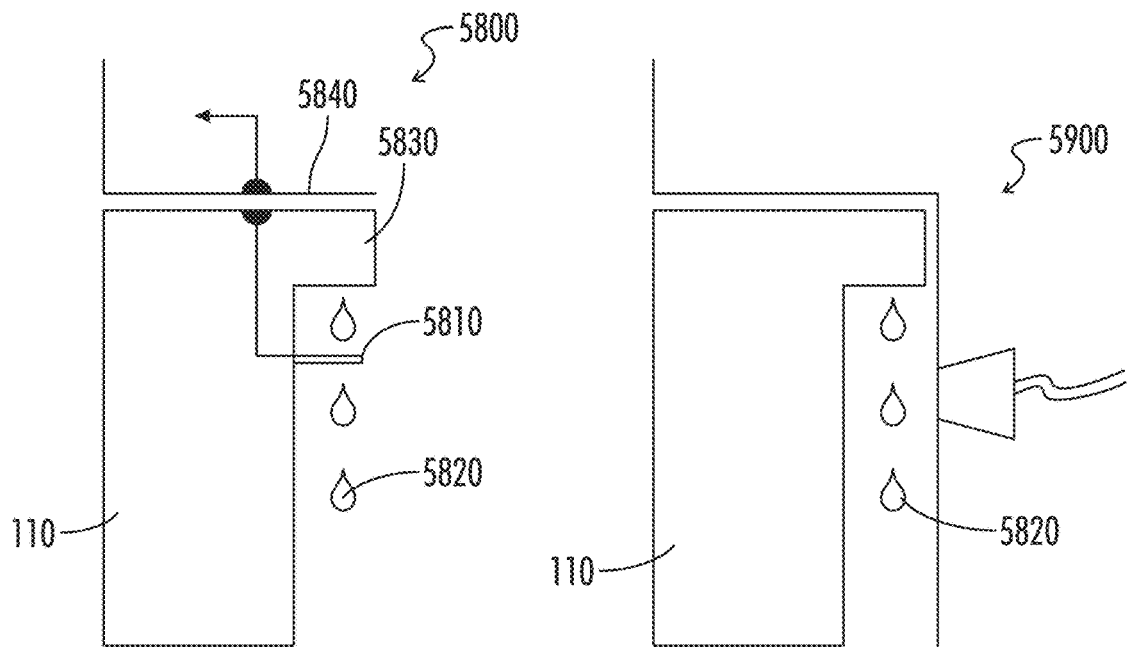
FIGS. 58-59 show alternative embodiments of drop sensors for use in the device of FIG. 1.

The drop sensor is shown in FIG. 52A-B as a beam 5230 between two units, typically a laser emitter 5610 and a detection unit 5620. Alternatively, the drop sensor 5200 may be a capacitive sensor 5800, as shown in FIG. 58, or a reflective object sensor 5900, as shown in FIG. 59.

The capacitive sensor 5800, may comprise a single conductive element 5810 (e.g. a single wire, straight or looped) that is positioned to be in the path of falling drops 5820 being dispensed from the pod 110. This type of sensor requires either contact, or close proximity to a conductive substance (e.g. a falling droplet) in order to trigger detection. Before drops 5820 are dispensed, a baseline reading is taken from the sensor 5800. Subsequently, to detect drops 5820 as they fall, a microcontroller simply evaluates the sensor's 5800 readings for a change in capacitance that is representative of a drop 5820 passing or contacting the sensor wire.

Because the capacitive sensor could be as simple and cheap as a single conductive wire, it can be mounted to the cartridge itself 110, and connected to the machine's circuitry via a conductor-to-conductor connection between the cartridge cap 5830 and the cartridge dock 5840.

This capacitive sensor 5800 could also serve a dual purpose by allowing the device 100 to detect when a pod has been mounted to the cartridge dock 5840. Because the circuitry to process capacitive sensor data resides in the device 100, the capacitance measured by this circuitry changes when the cartridge 110 is mounted to the dock 5840. This is because, by mounting a cartridge 110 to the dock 5840, the capacitive sensing circuitry in the machine is coupled to the capacitive sensing wire 5810 on the cartridge 110, effectively "elongating" the circuitries sensing wire to extend down onto the cartridge. Because of this large change in the sensed capacitance that occurs when a pod is docked to the machine, this large change in capacitance can be assumed to be due to the mounting of a cartridge 110 to the cartridge dock 5840 if 1) it occurs at a time when drops are not being actively dispensed by the device 100, and 2) the change is within the range expected to occur when a cartridge 110 is mounted to the dock 5840.

In case the capacitive sensing wire 5810 does come into contact with the falling droplets 5820, the capacitive sensing wire can be easily cleaned by removing the cartridge 110 from the dock 5840, and placing it into a dishwasher, or washing by hand. Alternatively, a UV LED in the device 100 can be positioned such that it shines on the capacitive sensing wire 5810, thereby continuously ensuring maximum sanitization.

Another type of sensor that can detect drops is a reflective object sensor 5900, which makes use of the fact that water is IR reflective. Such a reflective object sensor comprises an IR emitter and an IR detector oriented such that they are angled towards each other in a way so that if a reflective object is placed at a certain distance in front of them, it allows reflection of the emitter IR beam back into the detector. This sensor 5900 would be mounted within the device 100, and would not make contact with the drops 5820.

Figures 60A, 60B:
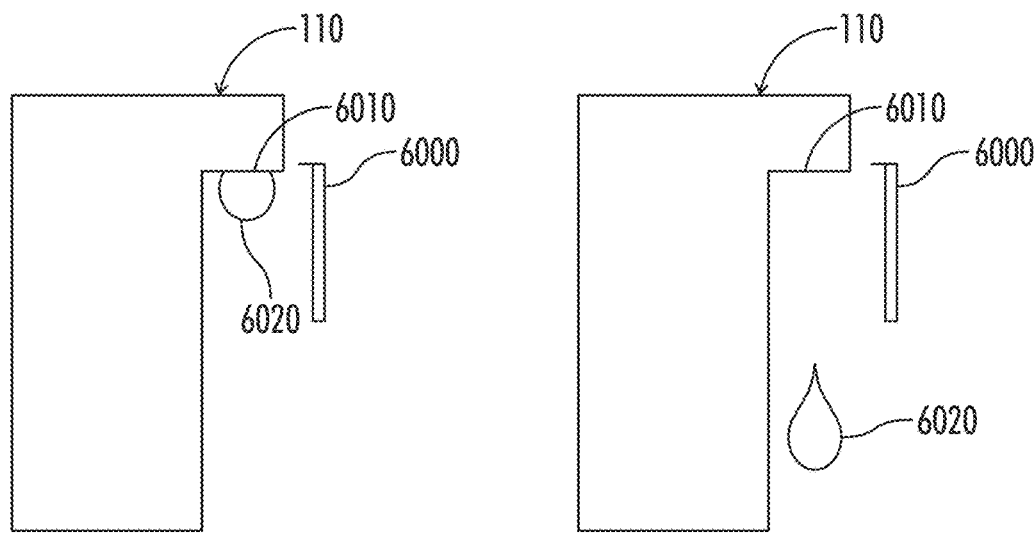
FIGS. 60A-B show a capacitive drop sensor for use in the device of FIG. 1.
Figure 60C:
FIG. 60C shows an example of data collected from the capacitive drop sensor shown in FIGS. 60A-B.

FIGS. 60A-B show an implementation of a capacitive sensor for use in the device 100 with the cartridge 110. FIG. 60C shows a signal extracted from the capacitive sensor during use. As shown, instead of a sensing wire 5810 incorporated into the cartridge 110, a capacitive sensor 6000 is located adjacent a dispensing location 6010 of the cartridge 110. As shown, as a fluid droplet 6020 forms at the dispensing location 6010, the capacitance in the sensor 6000 increases from a baseline. This can be seen in the signal shown in FIG. 60C.

When the droplet 6020 falls away from the dispensing location 6010, as shown in FIG. 60B, the droplet falls out of a detection range of the electrode of the sensor 6000. This is represented as a sudden dropoff visible in FIG. 60C returning the signal to its baseline. Accordingly, each spike in FIG. 60C represents a droplet 6020 building within the detection zone and then falling away from the dispensing location 6010.

Figure 61A:
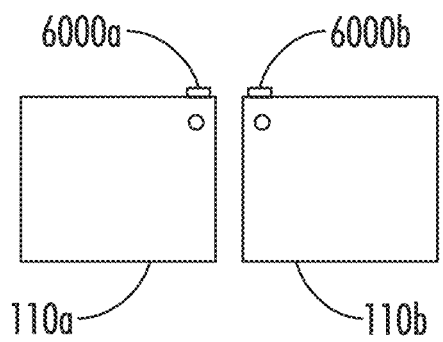
FIGS. 61A-B show two implementations of the capacitive drop sensor of FIGS. 60A-B into the device of FIG. 1.
Figure 61B:
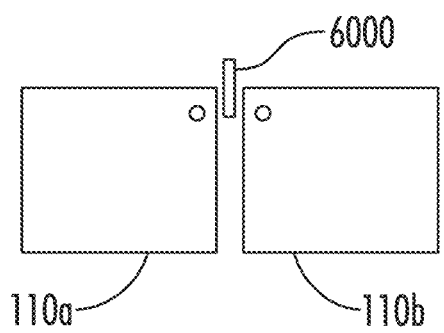

FIG. 61A shows a first implementation of a capacitive sensor 6000 for use with multiple cartridges 110a, b. As shown, separate capacitive sensors 6000a, b may be provided for use with each cartridge. In this way, a device 100 may be provided with docking location for several cartridges, and each cartridge may be provided with an independent sensor. FIG. 61B shows an alternative in which a single capacitive sensor 6000 is provided for use with multiple cartridges 110a, b by placing such a sensor between the cartridges being monitored.

To use a non-contact capacitive electrode 6000 for detecting droplets 6020 as they are dispensed from the cartridge 110, it helps to have the cartridge's dispensing location 6010 positioned immediately above the top edge of the capacitive sensor 6000, such that as the droplet 6020 forms at the dispensing location 6010, before the droplet has detached from the pod, the capacitance sensed by the electrode increases, as shown in FIG. 60C. Then, once the droplet 6020 reaches a large enough size such that gravity detaches the droplet from the cartridge 110, the droplet quickly falls out of the capacitive sensor's 6000 range, thereby causing it to detect a very sudden drop in capacitance. This sudden drop can be used to indicate that a droplet 6020 has just been dispensed into the user's vessel.

Such a capacitive electrode can also be used to detect when the user has attached or detached a CO2 tank from the device 100, since CO2 tanks are made of metal. Accordingly, when connecting the tank, the tank could contact a capacitive electrode, thereby changing the capacitance sensed by the electrodce. This could be achieved in a non-contact way, since the large amount of metal involved would cause a significant change in the capacitance detected by a nearby capacitive electrode.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

The invention claimed is:

1. A beverage creation system for dispensing fluid comprising:
   a fluid cartridge comprising a fluid outlet spout; and
   a non-contact drop sensor disposed behind the fluid outlet spout for detecting a number of drops dispensed from the fluid outlet spout, wherein the fluid cartridge is electrically isolated from the non-contact drop sensor.

2. The system of claim 1, wherein the fluid cartridge comprises a cap and a main body having a reservoir, and the cap is selectively detachable from the reservoir.

3. The system of claim 2, wherein the cap has a substantially square cross-section.

4. The system of claim 1, wherein the fluid outlet spout is fluidly connected to a reservoir tube within an additive reservoir of the fluid cartridge by a connecting tube, the connecting tube being shaped in a downward U-shape.

5. The system of claim 1 further comprising an air pump, wherein a reservoir of the fluid cartridge is in fluid communication with the air pump.

6. The system of claim 5, wherein the air pump is configured to pressurize the reservoir to dispense fluid out of the fluid outlet spout.

7. The system of claim 1, wherein coupling the fluid cartridge to a fluid cartridge dock places a reservoir of the fluid cartridge in fluid communication with an air pump.

8. The system of claim 7, wherein the system detects a signal from the non-contact drop sensor during drop dispensation to provide feedback to the air pump.

9. A system for dispensing fluid comprising:
   a fluid cartridge comprising a fluid outlet spout;
   a carbonated fluid outlet;
   a still water outlet; and
   a non-contact drop sensor for detecting a number of drops dispensed from the fluid outlet spout,
   wherein the fluid outlet spout, the carbonated fluid outlet, and the still water outlet are configured to dispense fluid into a beverage vessel and the system tracks an amount of fluid remaining within the fluid cartridge via signals provided by the non-contact drop sensor.

10. The system of claim 9, wherein the non-contact drop sensor is one of a capacitive sensor, an infrared emitter sensor, laser emitter sensor, or a reflective object sensor.

11. The system of claim 9, wherein the system is configured to dispense a first number of drops based on a first type of cartridge being installed in the system and a second number of drops based on a second type of cartridge being installed in the system.

12. The system of claim 11, wherein the first type of cartridge contains a first liquid type and the second type of cartridge contains a second liquid type, and the first liquid type and the second liquid type are both dispensed simultaneously at least during a time period.

13. The system of claim 9, wherein the number of drops dispensed is controlled based on an amount of carbonated fluid dispensed from the carbonated fluid outlet.

14. The system of claim 9, wherein the system detects whether the fluid cartridge contains one of a first type of liquid or a second type of liquid, and the number of drops dispensed is based on the type of liquid detected.

15. A system for dispensing fluid comprising:
   a plurality of fluid cartridges, each of the plurality of fluid cartridges comprising a fluid outlet spout being configured to dispense fluid droplets at a dispensing location; and
   a non-contact drop sensor for detecting a presence of each of the plurality of fluid cartridges installed into the system and detecting a number of drops dispensed from the fluid outlet spouts, the non-contact drop sensor located adjacent the dispensing location to detect droplets formed at, and dispensed from, any of the fluid outlet spouts of the plurality of fluid cartridges.

16. The system of claim 15, wherein the fluid outlet spouts of the plurality of fluid cartridges are adjacent each other and adjacent the non-contact drop sensor.

17. The system of claim 15, wherein a number of non-contact drop sensors is equal to a number of fluid cartridges, and each of the plurality of fluid cartridges is provided with one non-contact drop sensor.

18. The system of claim 15, wherein the system tracks an amount of fluid remaining within each of the plurality of fluid cartridges via signals provided by the non-contact drop sensor.

19. The system of claim 15, wherein the non-contact drop sensor is positioned behind each of the fluid outlet spouts and is mounted within a housing of the system.

\* \* \* \* \*